United States Patent
Ishii

(10) Patent No.: US 9,544,827 B2
(45) Date of Patent: *Jan. 10, 2017

(54) ENHANCED LOCAL ACCESS IN MOBILE COMMUNICATIONS WITH FDD RESOURCE ALLOCATION

(75) Inventor: Hiroyuki Ishii, Palo Alto, CA (US)

(73) Assignee: NTT DOCOMO, INC., Tokyo (JP)

( * ) Notice: Subject to any disclaimer, the term of this patent is extended or adjusted under 35 U.S.C. 154(b) by 106 days.

This patent is subject to a terminal disclaimer.

(21) Appl. No.: 14/344,492

(22) PCT Filed: Sep. 12, 2012

(86) PCT No.: PCT/US2012/054856
§ 371 (c)(1),
(2), (4) Date: Jul. 15, 2014

(87) PCT Pub. No.: WO2013/040028
PCT Pub. Date: Mar. 21, 2013

(65) Prior Publication Data
US 2014/0342738 A1 Nov. 20, 2014

Related U.S. Application Data

(60) Provisional application No. 61/534,709, filed on Sep. 14, 2011, provisional application No. 61/533,382, filed on Sep. 12, 2011.

(51) Int. Cl.
*H04W 72/00* (2009.01)
*H04W 36/22* (2009.01)
(Continued)

(52) U.S. Cl.
CPC ............. *H04W 36/22* (2013.01); *H04W 28/08* (2013.01); *H04W 84/045* (2013.01)

(58) Field of Classification Search
CPC ........ H04W 8/00; H04W 16/00; H04W 16/24; H04W 24/02; H04W 24/04; H04W 28/00; H04W 28/02; H04W 28/16; H04W 52/143; H04W 52/242; H04W 52/243; H04W 72/085; H04W 84/045; H04W 36/04; H04W 36/22; H04W 28/0289
(Continued)

(56) References Cited

U.S. PATENT DOCUMENTS 6,829,479 B1 12/2004 Chang et al.
8,493,887 B2 7/2013 Palanki et al.
(Continued)

FOREIGN PATENT DOCUMENTS

JP 8-307934 A 11/1996
JP 2006-094388 A 4/2006
(Continued)

OTHER PUBLICATIONS

3GPP TSG-RAN WG4 Meeting #58, R4-111298, Taipei, Taiwan, Feb. 21-25, 2011, "Handling of 3.4-3.6 GHz FDD Duplex Gap," 4 pages.
(Continued)

*Primary Examiner* — Jean Gelin
(74) *Attorney, Agent, or Firm* — Osha Liang LLP

(57) ABSTRACT

A hybrid user equipment and small-node device data offloading architecture is provided. In this hybrid architecture, the small-node device includes a backhaul link to a telecommunication network and/or the Internet. The user equipment can send and receive data through the small-node device using the backhaul link according to a half-duplex FDD radio resource assignment in a wireless link between the user equipment and the small-node device.

23 Claims, 33 Drawing Sheets

(51) Int. Cl.
*H04W 28/08* (2009.01)
*H04W 84/04* (2009.01)

(58) Field of Classification Search
USPC ... 455/414.1, 417, 422.1, 432.1, 435.1, 443, 455/444, 445, 446, 447, 450, 452.2, 453, 455/552.1, 448
See application file for complete search history.

(56) References Cited

U.S. PATENT DOCUMENTS

| | | | |
|---|---|---|---|
| 2002/0089949 | A1 | 7/2002 | Bjelland et al. |
| 2009/0059790 | A1 | 3/2009 | Calvert et al. |
| 2009/0232019 | A1 | 9/2009 | Gupta et al. |
| 2009/0310554 | A1 | 12/2009 | Sun et al. |
| 2009/0310561 | A1 | 12/2009 | Grob et al. |
| 2010/0056160 | A1 | 3/2010 | Kim et al. |
| 2010/0128697 | A1* | 5/2010 | Choi-Grogan .... H04W 36/0044 370/332 |
| 2010/0135251 | A1 | 6/2010 | Sambhwani et al. |
| 2010/0149347 | A1* | 6/2010 | Kim ............ G06F 17/30047 348/207.1 |
| 2010/0265867 | A1 | 10/2010 | Becker et al. |
| 2010/0322146 | A1 | 12/2010 | Liu et al. |
| 2010/0323745 | A1 | 12/2010 | Chen et al. |
| 2011/0003597 | A1 | 1/2011 | Budic et al. |
| 2011/0019634 | A1 | 1/2011 | Fujii et al. |
| 2011/0044244 | A1 | 2/2011 | Etemad |
| 2011/0075557 | A1 | 3/2011 | Chowdhury et al. |
| 2011/0075675 | A1* | 3/2011 | Koodli ............... H04L 12/14 370/401 |
| 2011/0076985 | A1 | 3/2011 | Chami et al. |
| 2011/0188481 | A1* | 8/2011 | Damnjanovic ....... H04W 72/04 370/336 |
| 2011/0237231 | A1 | 9/2011 | Horneman et al. |
| 2012/0015660 | A1* | 1/2012 | Kawaguchi ....... H04W 36/0061 455/438 |
| 2014/0079026 | A1* | 3/2014 | Dimou .............. H04W 36/20 370/332 |
| 2014/0161055 | A1* | 6/2014 | Chitrapu ............ H04W 72/12 370/329 |

FOREIGN PATENT DOCUMENTS

| | | |
|---|---|---|
| JP | 2007-096862 A | 4/2007 |
| JP | 2009-218638 A | 9/2009 |
| JP | 2011-523329 A | 8/2011 |
| WO | 2009/151871 A2 | 12/2009 |
| WO | 2010/002100 A2 | 1/2010 |
| WO | 2010/013150 A2 | 2/2010 |
| WO | 2010/027308 A1 | 3/2010 |
| WO | 2011/041623 A1 | 4/2011 |
| WO | 2012/134567 A1 | 10/2012 |
| WO | 2012/166975 A1 | 12/2012 |
| WO | 2013/055430 A2 | 4/2013 |

OTHER PUBLICATIONS

International Search Report issued in corresponding International Application No. PCT/US2012/054856, mailed on Feb. 11, 2013 (4 pages).
Written Opinion issued in corresponding International Application No. PCT/US2012/054856, mailed on Feb. 11, 2013 (8 pages).
Extended European Search Report issued in corresponding EP Application No. 12831801.1, mailed on Jun. 17, 2015 (8 pages).
3GPP TR 23.829 V10.0.0, Mar. 2011, "Local IP Access and Selected IP Traffic Offload," 43 pages.
International Search Report issued in corresponding International Application No. PCT/US2012/054912, mailed on Jan. 11, 2013 (3 pages).
Written Opinion issued in corresponding International Application No. PCT/US2012/054912, mailed on Jan. 11, 2013 (11 pages).
Extended European Search Report issued in corresponding EP Applicaiton No. 12831966.2, mailed on Jun. 15, 2015 (9 pages).
International Search Report for corresponding International Application No. PCT/US2012/040279, mailed Aug. 27, 2012 (2 pages).
Written Opinion for corresponding International Application No. PCT/US2012/040279, mailed Aug. 27, 2012 (12 pages).
Extended European Search Report in counterpart European Application No. 12 79 451 issued Apr. 22, 2015 (9 pages).
International Search Report for corresponding International Application No. PCT/US2012/040288, mailed Sep. 7, 2012 (2 pages).
Written Opinion for corresponding International Application No. PCT/US2012/040288, mailed Sep. 7, 2012 (6 pages).
Extended European Search Report in counterpart European Application No. 12 79 2917 issued Apr. 29, 2015 (9 pages).
LG Electronics Inc.; "Measurement Restriction for Macro-Pico Scenario"; 3GPP TSG-RAN2 Meeting #72, R2-106579; Jacksonville, Florida; Nov. 5-19, 2010 (3 pages).
3GPP TS 36.331 V10.1.0, Mar. 2011, "Protocol specification," (290 pages).
3GPP TS 36.101 V10.2.0, Mar. 2011, "User Equipment (UE) radio transmission and reception," (225 pages).
3GPP TS 36.211 V10.1.0, Mar. 2011, "Physical Channels and Modulation," (103 pages).
3GPP TS 36.213 V11.1.0, Dec. 2012, "Physical layer procedures," (160 pages).
Extended European Seach Report in counterpart European Application No. 12 83 1966.2 issued Oct. 12, 2015 (24 pages).
3GPP TS 25.331 v10.4.0; "3rd Generation Partnership Project; Technical Specification Group Radio Access Network; Radio Resource Control (RRC); Protocol specification (Release 10)"; Jun. 2011 (1879 pages).
Final Office Action issued in corresponding U.S. Appl. No. 14/118,473, mailed on Feb. 1, 2016 (63 pages).
Office Action in counterpart Japanese Patent Application No. 2014-513711 issued on Mar. 8, 2016 (3 pages).
Notice of Reasons for Refusal in counterpart Japanese Patent Application No. 2014-530752 issued on Aug. 9, 2016 (9 pages).

* cited by examiner

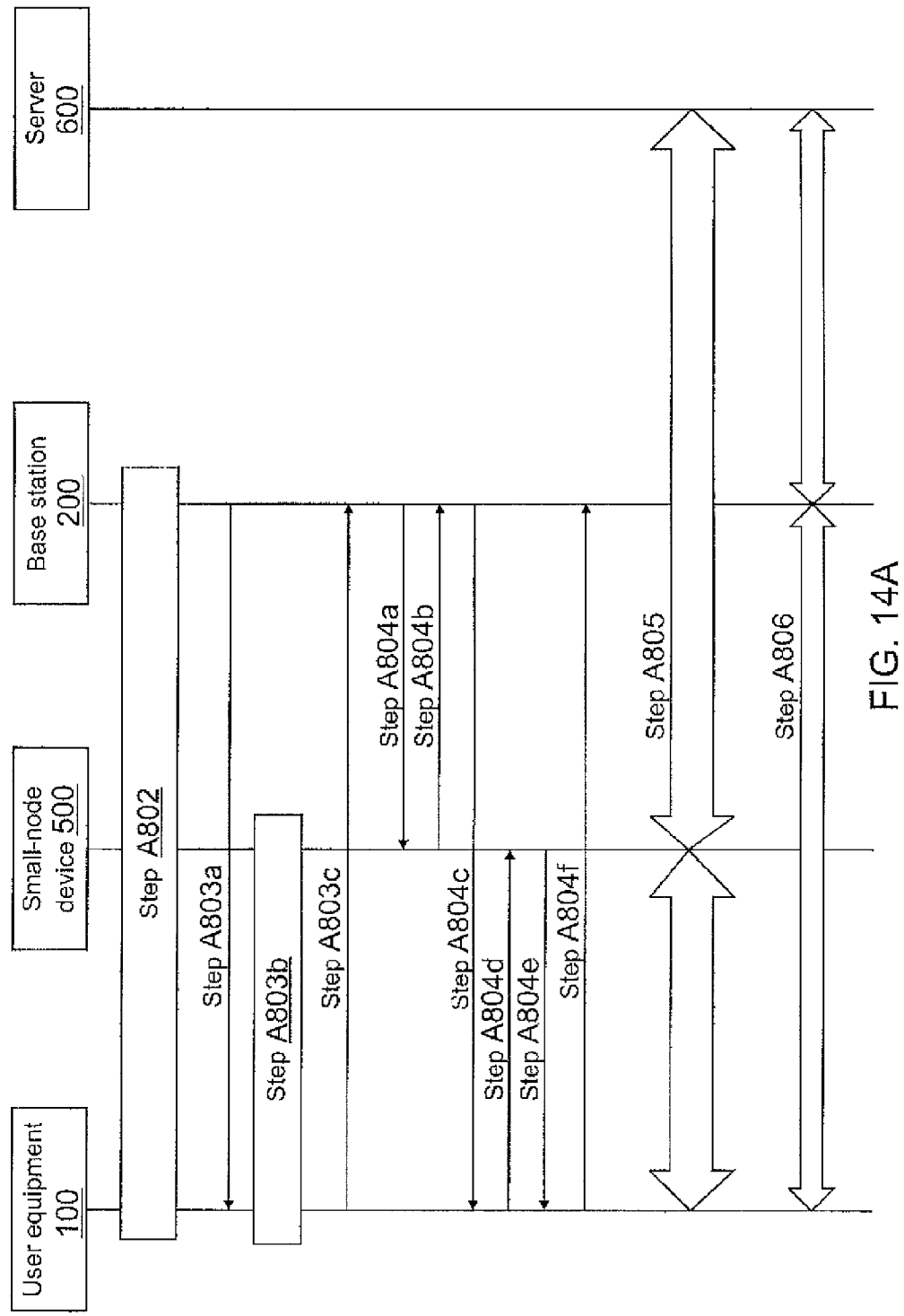

ENHANCED LOCAL ACCESS IN MOBILE COMMUNICATIONS WITH FDD RESOURCE ALLOCATION

RELATED APPLICATION

This application claims the benefit of U.S. Provisional Application No. 61/533,382, filed Sep. 12, 2011 and also claims the benefit of U.S. Provisional Application No. 61/534,709, filed Sep. 14, 2012. The contents of both of these applications are hereby incorporated by reference in their entirety.

TECHNICAL FIELD

This application is directed to the operation of the Physical and Link Layers in mobile communication protocols.

BACKGROUND

One option to increase capacity in a wireless network is to increase the density (number of devices per unit area) of deployed base stations or remote antenna units. If the density of the deployed base stations or remote antenna units increases, cell capacity increases due to frequency reuse effects. However, there are some difficulties that come with increasing the deployment density, especially if such deployed units must be able to operate as conventional base stations on their own. These difficulties include:

1) As the deployment density increases, the number of handovers increases because the user equipment changes its serving unit (base station) quite frequently. As a result, quality of connectivity/mobility is expected to be degraded. Thus, the deployed unit for increasing cellular capacity should have high-quality interworking with the macro base station.
2) The conventional macro base stations transmit some required signals, such as pilot signals, synchronization signals, broadcast signals, paging signals, and so on, all of which have the potential to cause interference problems. Such interference limits the number of deployed base stations and thus lowers cellular capacity.
3) Furthermore, radio resources for the required conventional macro base station signals are typically static. Thus, dynamic and efficient interference coordination through dynamic allocation of the radio resources is difficult, which also limits the number of the deployed base stations and associated cellular capacity.
4) Network operators need to assign cell ID or other cell-specific parameter to each cell. For example, the root sequences for random access channels in LTE uplink (UL) are an example of such cell-specific parameters. Such cell planning for the cell ID, the root sequences and the like is cumbersome, which also limits the number of the deployed base stations and associated cellular density.
5) The required cell capacity is region-specific. For example, a significantly large capacity is required in urban areas whereas a relatively small enhancement of cell capacity may be sufficient in suburban or rural areas. To efficiently satisfy such divergent density needs, the deployed unit should be easily installed with low cost/complexity
6) If the cost of each deployed unit is high, the total system cost is quite high as the deployment density increases. Thus, the deployed unit cost should be relatively low to feasibly increase cell capacity.

Various architectures have thus been proposed to increase wireless network capacity. For example, distributed base stations using the Remote Radio Head (RRH) technology communicate with a base station server using optical fiber. Because the base station server performs the baseband processing, each RRH distributed base station thus acts as a power amplifier with regard to its base station server. As the density of the RRH distributed base stations is increased, the baseband processing complexity is increased at the base station server. Thus, the number of RRH cells corresponding to each distributed RRH base stations is limited due to this baseband complexity.

Another alternative for increasing wireless network capacity involves the use of picocells or femtocells. Unlike the RRH approach, baseband processing is distributed across the pico/femtocells. But there is no high-quality interworking between picocells/femto cells and macrocell base stations. Thus, connectivity and mobility may not be sufficient because conventional intra-frequency or inter-frequency handover between picocells/femtocells and macrocell base stations is required. Furthermore, the picocells/femtocells are indeed base stations and thus they transmit the signals mentioned above such as pilot signals, synchronization signals, broadcast signals, paging signals, and so on. As a result, as the deployment density for pico/femtocells is increased, interference problems, difficulties in dynamic and efficient interference coordination, cell planning problems, and related issues cannot be solved.

Yet another alternative for increasing wireless network capacity is the use of conventional WiFi. But there is no interworking between WiFi nodes and macrocell base stations. Thus, connectivity and mobility is limited for a dual macrocell and WiFi user. Moreover, the use of WiFi in macrocell networks introduces the complications of multiple IP addresses being assigned to a single user.

Accordingly, there is a need in the art for improved architectures and techniques for increasing wireless network capacity.

SUMMARY

The invention focuses on the Physical (PHY) and Link Layer design of systems such as 3GPP's Long Term Evolution (LTE). The design uses a Device to UE (D2UE) and Macro to UE (BS2UE) architecture wherein some functions are maintained by the BS2UE link and others are supported by the D2UE link. Therefore, according to the invention, it is possible to provide a radio communication system for enabling high capacity, high connectivity, low costs and low planning complexity.

In accordance with a first aspect of the disclosure, a small-node device for offloading data traffic in a cellular telecommunications system is provided that includes: a base-station-to-the-small-node-device (BS2D) communication section configured to receive a first control-plane message from the base station over a BS2D link; a small-node-device-to-user-equipment (D2UE) communication section configured to transmit downlink (DL) user-plane data in a first set of time slots over a first frequency resource to a user equipment using a wireless D2UE link established responsive to the first control-plane message, wherein the D2UE communication section is further configured to receive uplink (UL) user-plane data from the user equipment over the D2UE link in a second set of time slots over a second frequency resource group, and wherein the time slots in the second set alternate with the time slots in the first set such that the UL and DL transmissions over the D2UE link do not occur simultaneously; and a backhaul communication section configured to receive the user-plane traffic data from a server over a backhaul link.

In accordance with a second aspect of the disclosure, a user equipment (UE) configured to receive offloaded data from a small-node device in a cellular telecommunication system is provided that includes: a macro-base-station-to-the-user-equipment (BS2UE) communication section configured to receive a first control-plane message and user-plane data from the base station over a wireless BS2UE link; and a small-node-device-to-the-user-equipment (D2UE) communication section configured to configured to transmit uplink (UL) user-plane data in a first set of time slots and in a first frequency resource to a small-node device using a wireless D2UE link established responsive to the first control-plane message, wherein the D2UE communication section is further configured to receive downlink (DL) user-plane data from the small-node device over the D2UE link in a second set of time slots and in a second frequency resource group, and wherein the time slots in the second set alternate with the time slots in the first set such that the UL and DL transmissions over the D2UE link do not occur simultaneously.

In accordance with a third aspect of the disclosure, a base station for controlling a user equipment (UE) and a small-node device in a cellular telecommunications network is provided that includes a base-station-to-the-UE (BS2UE) communication section configured to exchange user-plane and control-plane data with the UE using a wireless BS2UE link; a base-station-to-the-small-node-device (BS2D) communication section configured to exchange control-plane data with the small-node device using a BS2D link; and a D2UE control unit configured to control an establishment and also a release/reconfiguration/handover of a small-node-device-to-the-UE (D2UE) link through a first control-plane message transmitted to at least one of the UE and the small-node device using a respective one of the BS2UE and BS2D links, wherein the D2UE control unit is further configured to control a half-duplex FDD radio resource allocation within the D2UE link.

BRIEF DESCRIPTION OF THE DRAWINGS

FIG. 14A is a flow diagram for the steps shown in FIG. 14.

FIG. 22(*b*) illustrates a network having the inter-carrier interference discussed with regard to FIG. 21.

FIG. 27(*b*) illustrates the power control for the UL and DL frequency resources of FIG. 27(*a*).

DETAILED DESCRIPTION

Figure 1A:
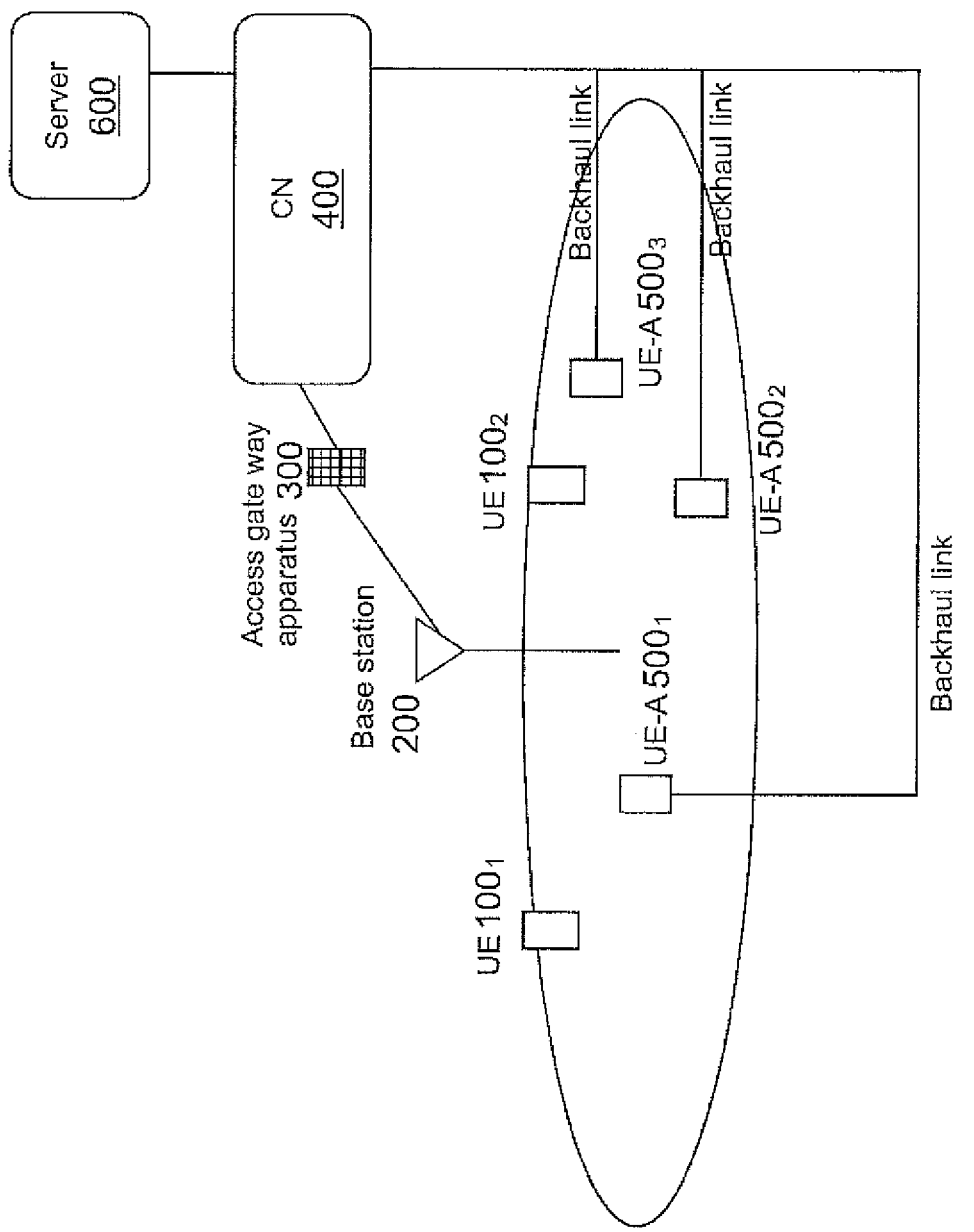
FIG. 1*a* is an example architecture for an enhanced local area radio access system using advanced user equipment.

To address the prior art drawbacks discussed above, the applicant has developed two innovative network architectures. These architectures are described in International Application No. PCT/US12/48690, filed May 31, 2012 and in International Application No. PCT/US12/40288, also filed May 31, 2012. The contents of both of these applications are hereby incorporated by reference in their entirety. The first architecture uses a novel network device denoted as an advanced user equipment (UE-A). The UE-A shares a number of features in common with conventional user equipment (UE). The common structural elements and function thus conveniently lower the manufacturing costs associated with a UE-A. Although a UE-E has assorted features in common with a user equipment (UE), it will be appreciated that, with respect to a UE, a UE-A may be a network-side device analogous to a base station or other network-side node. Alternatively, the UE-A may be a UE-side device. In contrast to a conventional UE, the UE-A of the first architecture allows offloading of data traffic that would otherwise have to be carried by the link between the macrocell base station and the UE. The UE-A has a backhaul link to the core network and/or the Internet to accommodate the offloaded data. In turn, a UE-A-to-UE link carries the offloaded data between the UE-A and the UE in both the uplink (UL) and downlink (DL) directions. This UE-A-to-UE link may be denoted as a D2UE link whereas a base-station-to-UE link may be denoted as a Macro2UE link. A link between the base station and the UE-A may be denoted as a Macro2D link. In one embodiment, both the Macro2UE and Macro2D links may be LTE links. The base station controls the establishment of the D2UE link through the base-station-to-UE-A link and/or through the Macro2UE link.

In an LTE embodiment, the LTE links (the Macro2UE and Macro2D) links may operate at 2 GHz whereas the D2UE link operates at a different frequency such as, for example, 3.5 GHz. In this fashion, the UE utilizes carrier aggregation. Such an embodiment has the advantage of the combined bandwidth from the carrier aggregation and the associated inter-carrier interference mitigation. Alternatively, the Macro2D, Macro2UE, and D2UE links may all operate in the same frequency band. Regardless of the particular embodiment, a network according to the first architecture has the advantage that the establishment, reconfiguration, release, or handoff of the D2UE link is under the control of the base station (or a higher-level network node). Thus, the UE-A construction and operation is greatly simplified. To better appreciate the advantages of the data offloading provided by a UE-A, it is useful to compare the resulting data offloading to that achieved in the prior art.

For example, a remote radio head (RRH) is a conventional network node that offloads data that would otherwise have to be carried by the base station to (and from) the UE. But an RRH is effectively just a power amplifier such that it has no baseband processing. The base station must then perform the RRH baseband processing, which burdens the base station operation and hinders the use of a plurality of RRHs throughout the corresponding macrocell. In contrast, the UE-A performs its own baseband processing. Thus, the first network architecture enables a macrocell to include a plurality of UE-As, which greatly increases the data-offloading coverage within the macrocell.

Another conventional network node that enables data offloading is a picocell or femtocell base station. But such pico or femtocell base stations are indeed base stations. Thus, a UE cannot obtain data plane traffic simultaneously from both a pico/femtocell base station and also a macrocell base station. Instead, a call must be handed off between the two different types of cells. Good connectivity and mobility is thus difficult with pico/femtocells, particularly if the pico or femtocells are on different carriers as opposed to the macrocell (requiring an inter-frequency handover). In addition, a pico/femto base station transmits the conventional synchronization and reference signals (PSS/SSS, CRS, and so on). Thus, pico and femtocells suffer from inter-cell interference with their associated macrocell and with other pico or femtocell base stations. In addition, high power consumption will result in the UE from the necessary receipt and processing of the various pico and femtocell synchronization and reference signals. As will be explained further herein, a UE-A need not generate these conventional synchronization and reference signals. Thus, the first network architecture has considerably better connectivity/mobility and more flexible operation as compared to the conventional pico/femtocell alternative.

Yet another conventional network node that enables data offloading is a WiFi access point (AP). A UE can thus receive data from both its base station and from the AP. But there is no support for interworking between the AP and base station such that good connectivity/mobility is also not supported. Moreover, a UE having both a WiFi and a base station connection will receive two separate IP addresses, which further complicates operation. Because of the lack of interworking, the AP manages the establishment of its link to the UE. Similarly, the base station manages the establishment of its link to the UE. In contrast, the D2UE ink establishment is controlled by the base station, not the UE-A. As a result, better connectivity and mobility is achieved using the architectures disclosed herein.

Turning now to the drawings, FIG. 1a shows an example cellular network arranged according to the first architecture. This network includes a base station 200 as well as user equipment (UE) $100_1$ and $100_2$. As used herein, components having the same base element number (e.g., $100_1$ and $100_2$) have the same configuration, function, and state unless otherwise specified. Evolved Universal Terrestrial Radio Access (E-UTRA)/Universal Terrestrial Radio Access Network (UTRAN) (also denoted as Long Term Evolution (LTE)) is applied in the system of FIG. 1a but it will be appreciated that a wide variety of other wireless protocols such as WiMAX, WiFi, or LTE Advanced may also be implemented in the system.

Base station 200 is connected to a higher layer station, for example, an access gateway apparatus 300. In turn, access gateway 300 is connected to a core network (CN) 400. Access gateway 300 may also be referred to as MME/SGW (Mobility Management Entity/Serving Gateway). A server 600 may also be connected to the core network 400.

In one embodiment, user equipment $100_1$ and $100_2$ communicate with an advanced user equipment (UE-A) 500 by Device-to-Device (D2D) communication, which may also be referred to as peer-to-peer (P2P) communication. In other words, D2UE communication may supported by the D2D connection from a physical layer point of view. The D2UE communication between the user equipment and UE-A 500 may be provided in a Time Division Multiplexing manner (TDD). Alternatively, the D2UE communication between the user equipment and the advanced user equipment 500 may be provided in a Frequency Division Multiplexing (FDD) manner. A particularly advantageous FDD scheme will be discussed further herein.

Figure 1B:
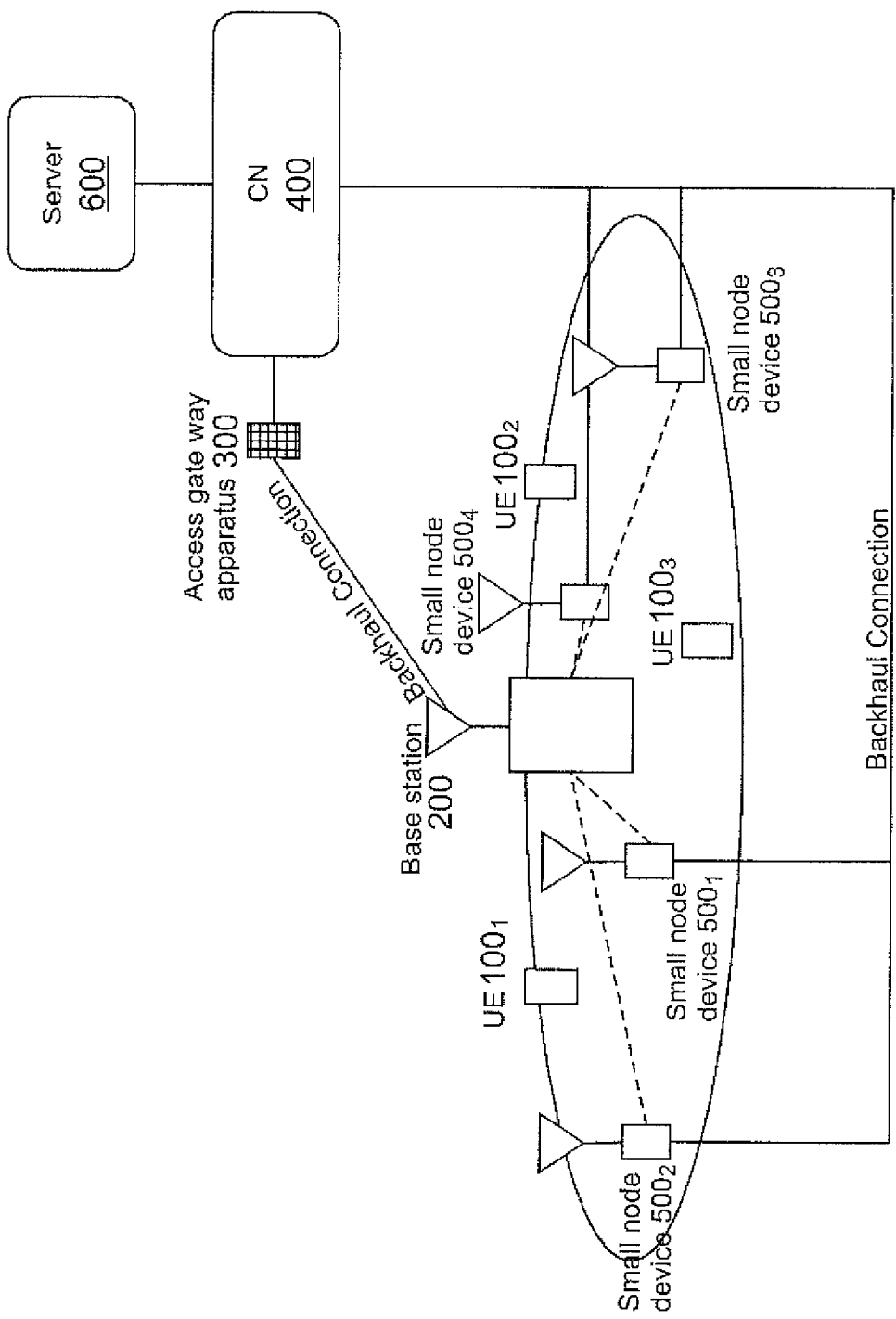
FIG. 1*b* is an example architecture for an enhanced local area radio access system using small-node devices.

A second architecture is shown in FIG. 1b. In an analogous fashion to the UE-A of the first architecture, the second architecture uses a cellular network device that enables a user to offload traffic from a macrocell base station without the prior art drawbacks discussed earlier. The cellular network devices of the second architecture opportunistically offload traffic from the macro base stations and are denoted as small-node devices hereinafter. The small-node devices allow offloading of data traffic that would ordinarily have to be carried by the link between the macrocell base station and the UE (which may be denoted as a Macro2UE or a BS2UE link). When a small-node device is deployed, the offloaded data may then be carried over a small-node device to UE link (which may be denoted as a D2UE link).

The small-node device is analogous to a femto or pico base station in that the small-node device may control the radio resource allocation and transport format selection for the D2UE link. However, a mobile station receives both user-plane and control-plane signaling from a femto/pico base station, which conducts RRC procedures for a link between the mobile station and the femto/pico base station. As already discussed, a femto/pico base station is indeed acting as a conventional base station to the user equipment. Thus, a mobile station needs to make conventional handover from a femto/pico base station to another femto/pico base station or from a macro base station to a femto/pico base station and vice versa. If there are numerous such handovers, the quality of connectivity/mobility is degraded because it is impossible for the user equipment to communicate with a conventional femto/pico base station simultaneously with the macro base station. Thus, intra-frequency or inter-frequency handover is needed. In contrast, a mobile station can transfer data with the small-node device disclosed herein while simultaneously transferring data with a macro base station. A macro-base-station-to-mobile-station connection is maintained while the data offloading is conducted in a small-node-device-to-mobile-station connection. As a result, high quality connectivity/mobility can be maintained even if the density of deployment is increased.

Furthermore, a femto/pico base station must transmit a cell-specific reference signal (CRS), a primary synchronization signal (PSS), a secondary synchronization signal (SSS), and broadcast signals. The transmission of the CRS/PSS/SSS/broadcast signals is problematic as density of deployment is increased due to the resulting inter-cell interference. In contrast, the small-node device disclosed herein need not transmit CRS/PSS/SSS/broadcast signals. The small-node device is thus exchanging user-plane data with the mobile station and does not suffer from inter-cell interference as density of deployment is increased.

To perform this offloading of data traffic, the small-node devices have a backhaul link, which is connected to the Internet or the core network so as to communicate with a server in the Internet or the core network. The backhaul link to the small-node device is not limited to a wired connection to the Internet, but may be a wireless connection to the Internet, such as a WiFi or cellular connection. The server transfers some of data to the user equipment (which would otherwise be transferred using the base station) utilizing the backhaul link and the D2UE connections. The D2UE connections are controlled by the macro base station (which will be referred to merely as a "base station" hereinafter). More specifically, basic radio resource control, such as connection establishment, handover, connection release, call admission control and the like, for the D2UE connections are all controlled by the base station. Furthermore, the BS2UE connections between UE and the base station are maintained while the D2UE connections are configured. As a result, high quality interworking between base-station-to-UE (BS2UE) and D2UE connections is readily achieved. Moreover, a number of functions that are essential in conventional base stations may be omitted in the small-node devices. For example, the small-node devices need only support functions for D2UE connections. Therefore the cost and complexity of the small-node devices can be kept low. For example, the operation of complicated functions such as the Radio Resource Control (RRC) connection state control and Non-Access Stratum (NAS) control is performed by the base station. Thus, some or most of the functions for conventional base-station-to-UE links such as transmitting broadcast channels, transmitting pilot and synchronization signals, controlling connections and the like, may be omitted in the D2UE connection.

A small-node device is configured to support small-node-device-to-user-equipment (D2UE) transfer of data. The small-node device supports a base-station-to-small-node-device link (a BS2D link) and the establishment of the D2UE link is controlled by the base station via the BS2D link. A UE as disclosed herein also supports a base-station-to-user-equipment link (a BS2UE link) and a D2EU link. Its D2UE link is controlled by the base station via the BS2UE link as well. Control signaling for the D2UE connections can be transmitted to the UE via the BS2UE connection. In an analogous fashion, control signaling for the D2UE connections can be transmitted to the small-node device via the BS2D connection. In some embodiments, a D2UE connection may be similar to a D2D (UE-to-UE or small-node-device-to-small-node-device) connection.

To achieve high quality connectivity, more important functions such as the RRC connection state control and also NAS control are maintained by the base station using the BS2UE association. More specifically, control for the radio interface in the D2UE connections is conducted by the BS2D and the macrocell-base-station-to-user device (BS2UE) associations. The control includes at least one of connection establishment, connection management, connection reconfiguration, handover, connection release, radio resource selection management, power control, link adaptation, call admission control, radio bearer assignment, traffic measurement, radio measurement control, bearer management, security association and so on.

In some embodiments, the radio resource allocation in the D2UE connections is implemented by a time domain duplex (TDD) physical layer design. In such embodiments, the user equipment and the small-node device time-share the use of radio resources in the frequency band(s) used for D2UE transmissions. In alternative embodiments, the radio resource allocation in the D2UE connections may be maintained by a frequency domain duplex (FDD) physical layer resource sharing instead of or in conjunction with TDD. D2UE and BS2UE transmissions can operate in different bands exploiting carrier aggregation functions. The carrier aggregation functions correspond to functions in which the transmitter can transmit signals and the receiver can receive signals in more than one carrier simultaneously. In this fashion, D2UE transmissions can operate in one band, and BS2UE transmissions can operate in another band, simultaneously in time.

Alternatively, D2UE and BS2UE transmissions can operate in different bands exploiting time division multiplexing functions, wherein the D2UE transmission occur only at selected times and the BS2UE transmissions occur at the remaining time. In yet another alternative, the D2UE and BS2UE transmission may share the same frequency resource.

The System Architecture

Various small-node device embodiments will now be discussed in further detail. Referring again to FIG. 1b, a plurality of small-node devices or units $500_1$ through $500_3$ are arrayed within a cellular communication system. This system also includes a base station 200 as well as user equipment (UE) $100_1$, $100_2$, and $100_3$. As used herein, components having the same base element number (e.g., $100_1$ and $100_2$) have the same configuration, function, and state unless otherwise specified. Evolved Universal Terrestrial Radio Access (E-UTRA)/Universal Terrestrial Radio Access Network (UTRAN) (also denoted as Long Term Evolution (LTE)) is applied in the system of FIG. 1b but it will be appreciated that a wide variety of other wireless protocols such as WiMAX, WiFi, or LTE Advanced may also be implemented in the system.

Base station 200 is connected to a higher layer station, for example, an access gateway apparatus 300. In turn, access gateway 300 is connected to a core network (CN) 400. Access gateway 300 may also be referred to as MME/SGW (Mobility Management Entity/Serving Gateway). A server 600 may also be connected to the core network 400.

User equipment 100 communicates with small-node devices 500 by a device-to-user-equipment (D2UE) communication. The D2UE communication between user equipment 100 and small-node devices 500 may be provided in a Time Division Multiplexing manner (TDD). Alternatively, the D2UE communication between the user equipment and the small-node devices 500 may be provided in a Frequency Division Multiplexing (FDD) manner. The D2UE link may be an LTE link or a simplified LTE link. However, it will be appreciated that other protocols besides LTE such as LTE Advanced, WiMax, WiFi, or other suitable protocols may be used to implement the D2UE links.

Figure 2:
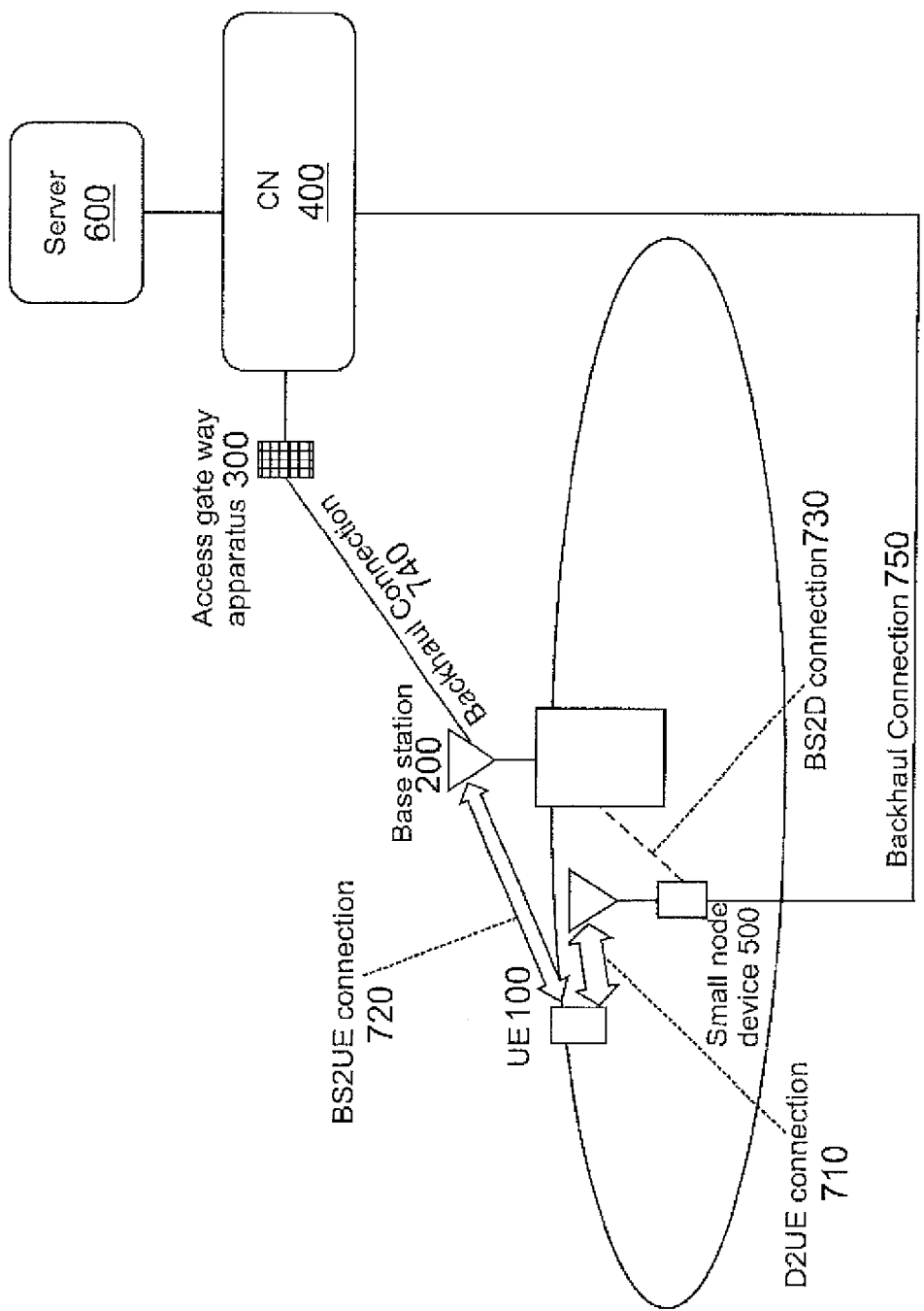
FIG. 2 annotates the data paths in the system of FIG. 1*b* for a given one of the small-node devices.

Small-node devices 500 communicate with base station 200 using a base-station-to-small-node-device (BS2D) link. For example, the BS2D link may comprise a wired X2 interface link. Alternatively, the BS2D link may be a wired or wireless link that is different from an X2 link. Alternatively, the BS2D link may be an enhancement of an X2 interface. The enhancement of the X2 interface link accommodates a master-slave relationship between the base station 200 and small-node device 500. To provide greater capacity, small-node devices 500 are connected to the core network 400 through backhaul links in some embodiments. Each of these backhaul links may be an Ethernet link, a WiFi link, a cellular network link, and may be wired or wireless. Data plane traffic can thus flow between core network 400 and small-node device 500 without burdening base station 200. In this fashion, the user equipment can access data from server 600 without the data passing through base station 200. In other words, small-node device 500 communicates with the user equipment 100 utilizing the D2UE communication for data off load purposes. In other embodiments, small-node devices 500 may be connected to base station 200, instead of the core network 400. In this case, data plane traffic flows in base station 200, but data processing in the base station 200 can be minimized, because data processing in lower layers such as physical layer or MAC layer is handled by small-node device 500. In contrast, control plane information as well as data plane traffic (e.g., real time data such as VoIP) can continue to flow to UE 100 via base station 200, access gateway 300, core network 400, and server 600. FIG. 2 is an annotated version of the system of FIG. 1b to show a BS2UE connection or link 720, a D2UE connection 710, a backhaul connection 750, a BS2D connection 730, and a backhaul connection 740.

Figure 3:
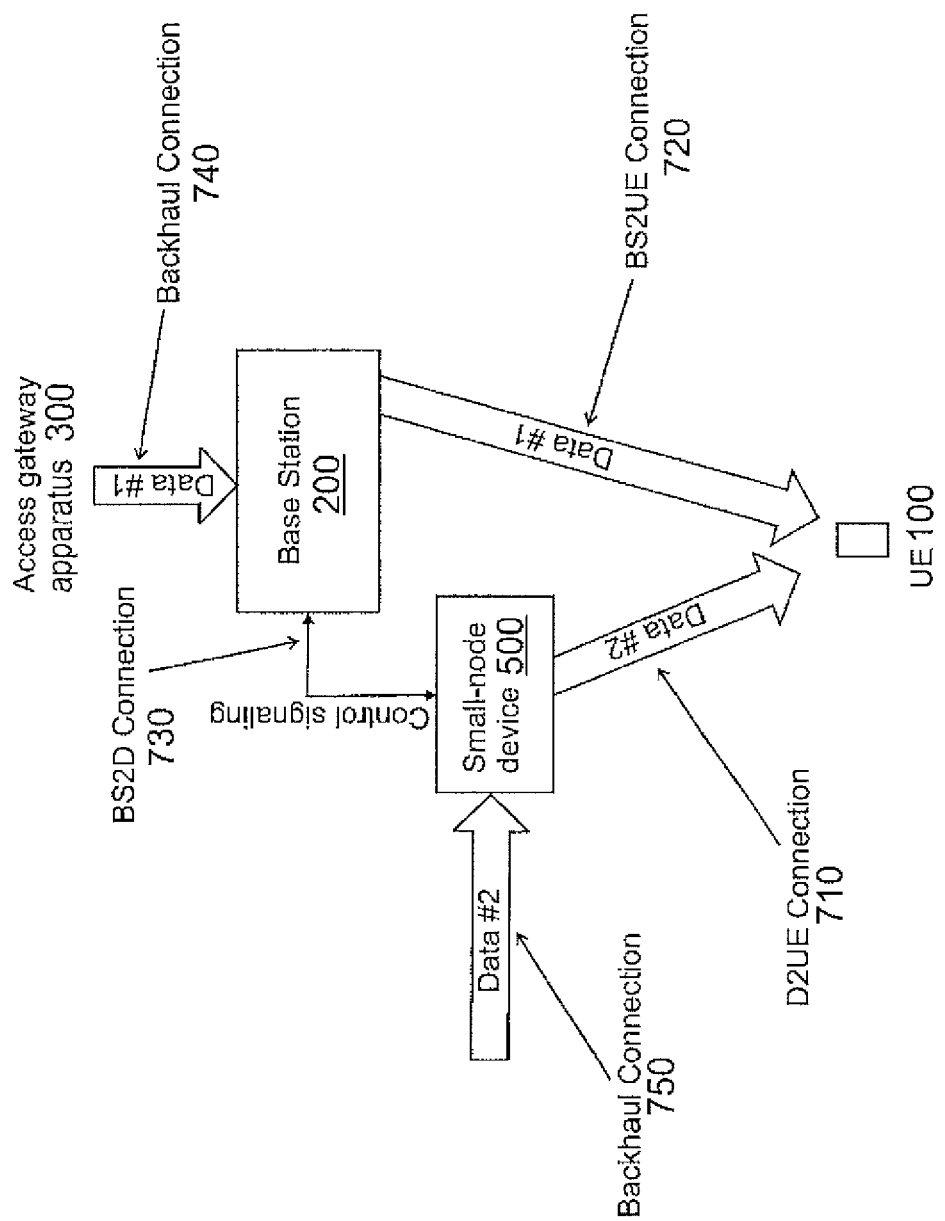
FIG. 3 illustrates the control-plane and user-plane data flows for small-node device of FIG. 2.

FIG. 3 illustrates data flow in the communication system of FIG. 2. In that regard, there must be an entity that decides what data will be offloaded through the small-node devices as opposed to a conventional exchange between the user equipment and the base station. Because the base station receives radio link quality reports from the user equipment and/or the small-node devices, the base station is a natural choice for the data partition decision (i.e., deciding what data should be offloaded). However, other network nodes can also make this decision. With regard to FIG. 3, a decision has been made to offload some data but also have other data not be offloaded. The non-offloaded data is designated as Data #1, which is transferred from the access gateway apparatus 300 to the base station 200 in backhaul connection 740 and then transmitted to user equipment 100 in BS2UE connection 720 in downlink (DL), and vice versa in uplink (UL). The flow for Data #1 is thus be transmitted in a conventional fashion. In addition to Data #1, offloaded Data #2 is transferred from core network 400 to small-node device 500 in backhaul connection 750 and then transmitted to user equipment 100 in D2UE connection 710 in DL, and vice versa in UL. Control-plane signaling is transmitted in BS2D connection 730 so that base station 200 can control the establishment, reconfiguration, release, and handoff of D2UE connection 710. Control signaling is transmitted also in BS2UE connection 720 so that base station 200 can perform these functions for D2UE connection 710. The control signaling in BS2UE connection 720 may be radio resource control (RRC) signaling. More specifically, Data #1 may include RRC signaling, NAS signaling, voice packets and the like, and Data #2 may be best effort packets, FTP data, Web browsing packets and the like. That is, it may be determined by data bearers what kinds of data are transferred as Data #1 or Data #2. As a result, connectivity can be maintained by BS2UE connection 720, and U-plane data offload can be simultaneously achieved in D2UE connection 710.

Figure 4:
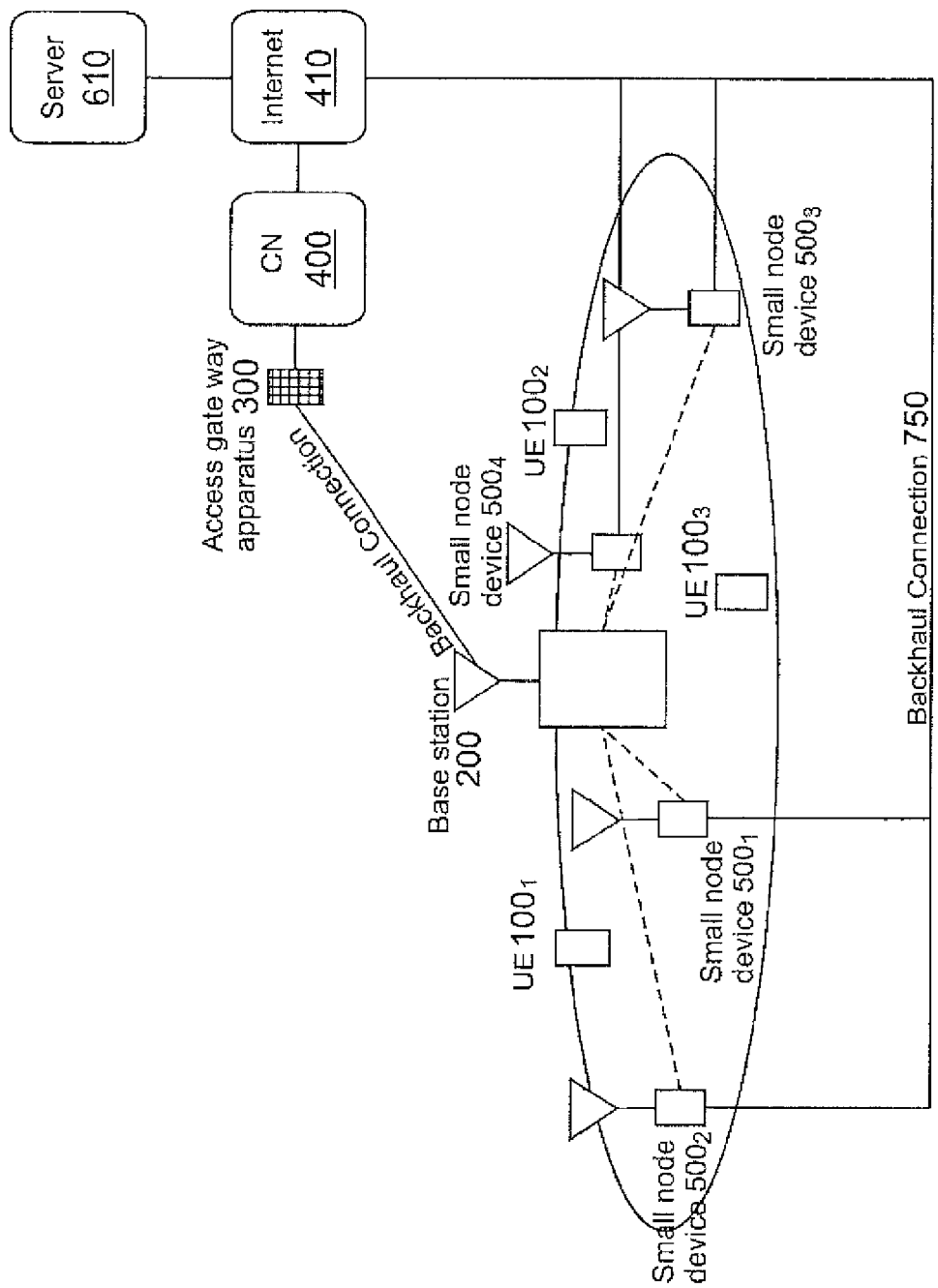
FIG. 4 illustrates a modification of the architecture of FIG. 2 in which the backhaul links from the small-node devices route through the Internet.

The backhaul link connection to higher-level network nodes may take numerous alternative embodiments. For example, FIG. 4 illustrates an alternative embodiment in which small-node devices 500 may be connected to a server 610 via Internet 410. In this case, core network 400 may be regarded as a network controlled by a network operator. Core network 400 may include MME, S/P-GW, a node for billing system, HLS (database for customers) and the like.

Figure 5:
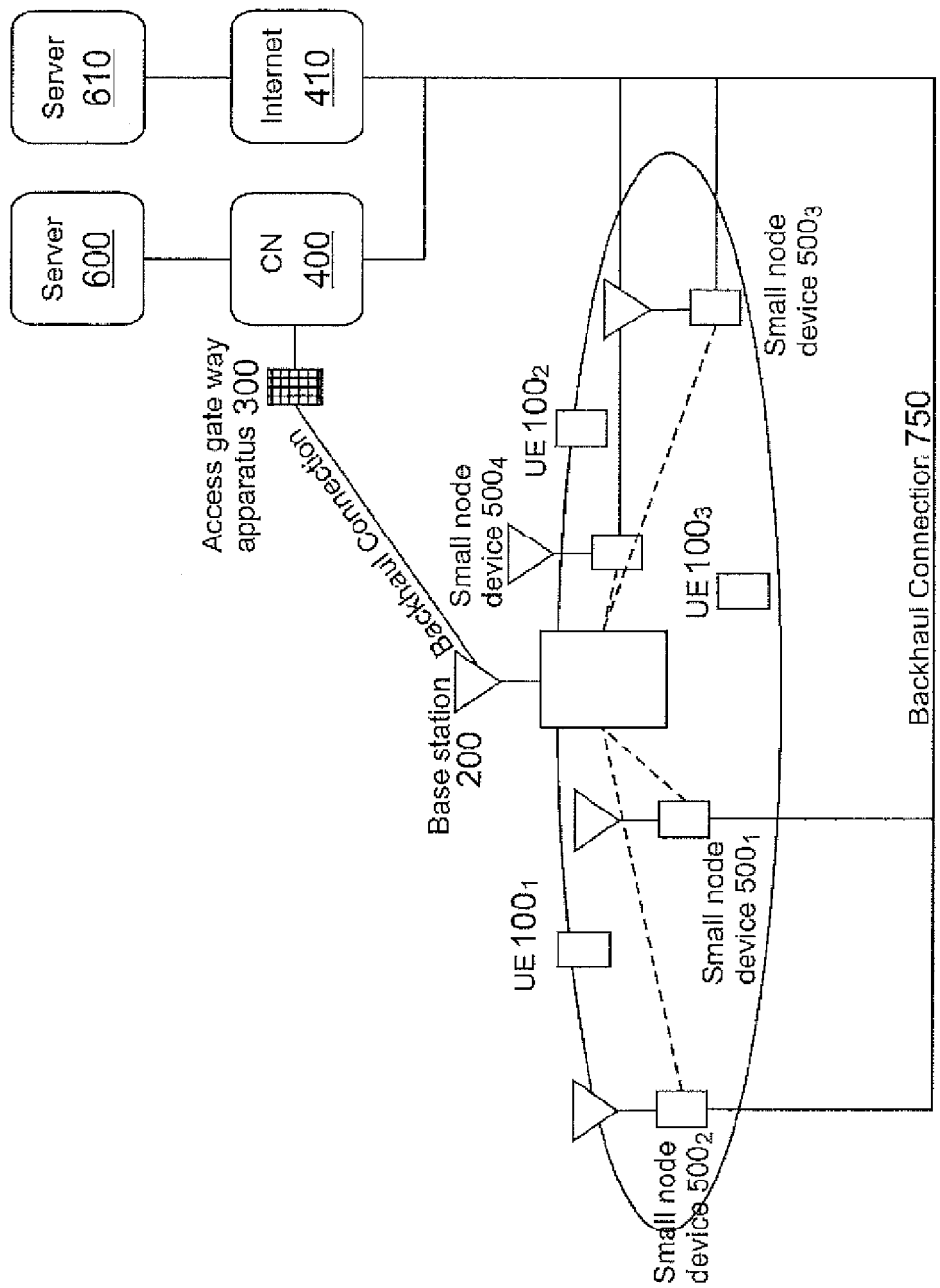
FIG. 5 illustrates an architecture that combines the features shown for the embodiments in FIGS. 1 and 4.
Figure 6:
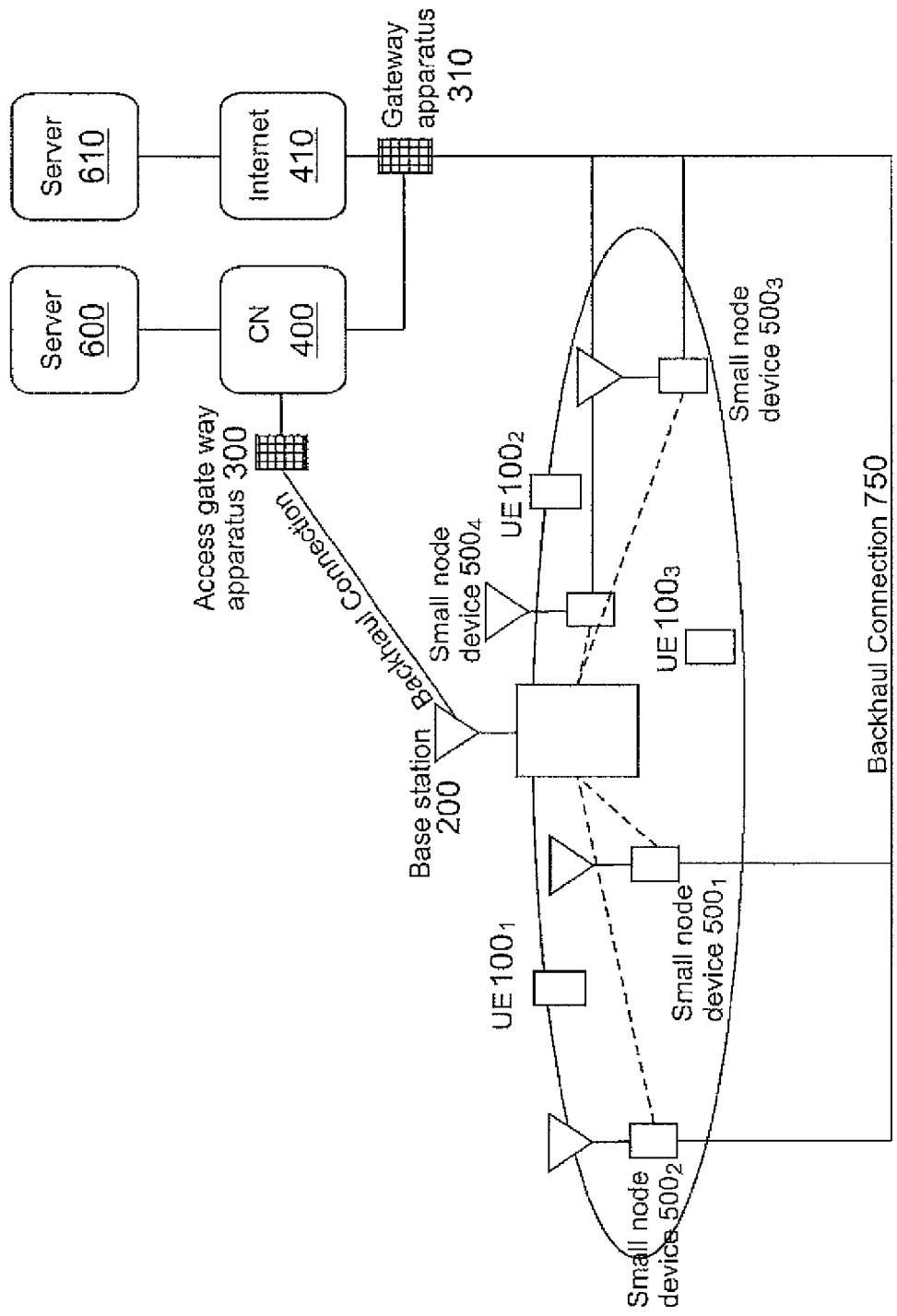
FIG. 6 illustrates a modification of the architecture of FIG. 5 to include a gateway between the small-node devices and the core network/Internet.

FIG. 5 illustrates another alternative embodiment that may be considered as a mixture of the FIG. 1a and FIG. 4 embodiments. In this embodiment, small-node devices 500 may be connected to server 600 via core network 400 or server 610 via the Internet. Small-node device 500 may be connected to network equipment, which in turn is connected to server 600 via core network 400 or server 610 via the internet. The network equipment may be an S-GW or a P-GW or other nodes in the core network. Alternatively, the network equipment may be a node in the internet. In yet another alternative embodiment, a gateway 310 is provided between core network 400/Internet 410 and small-node devices 500 as shown in FIG. 6.

Figure 7:
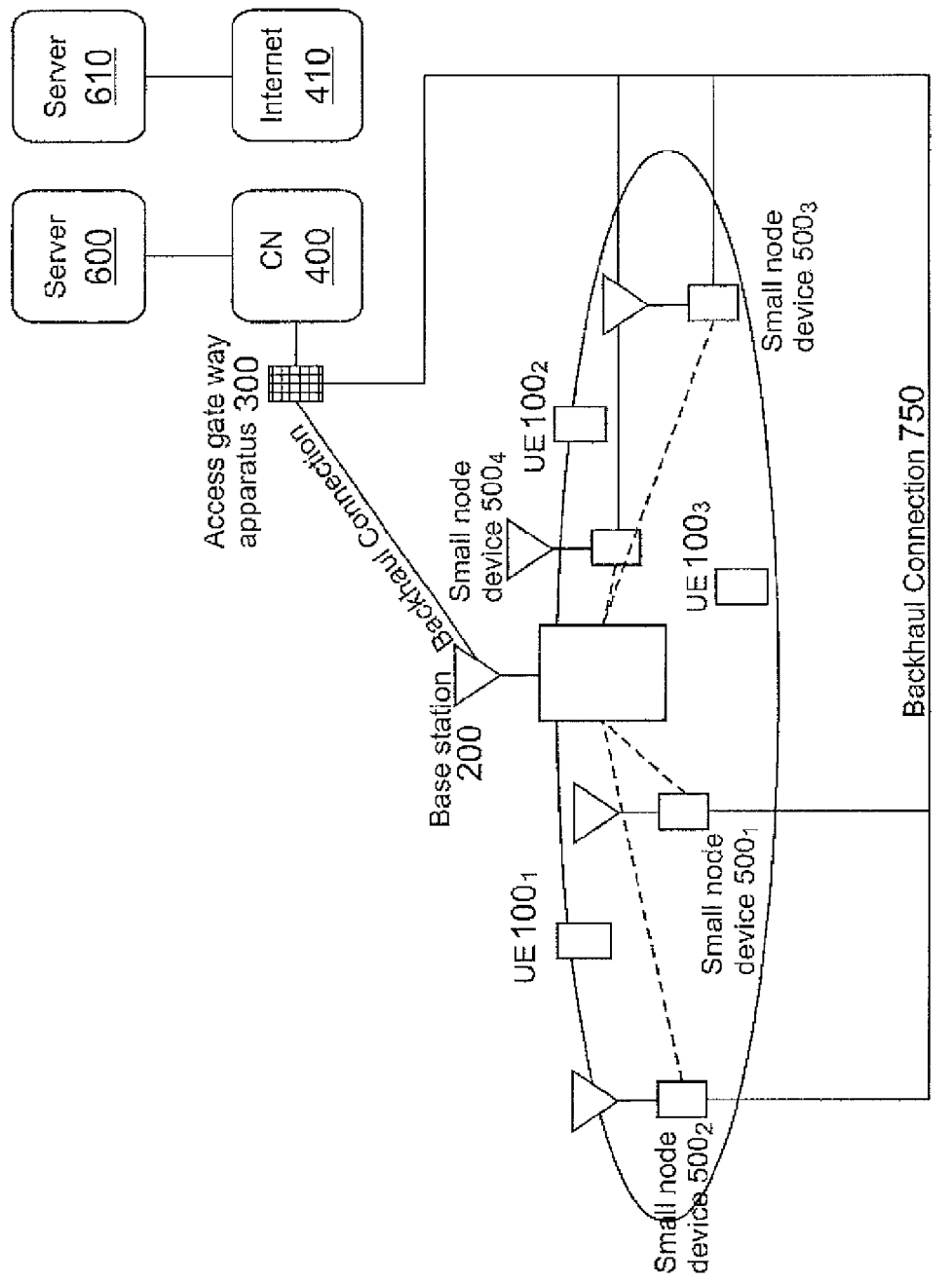
FIG. 7 illustrates a modification of the architecture of FIG. 5 in which the backhaul links from the small-node devices route through a network access gateway.
Figure 8:
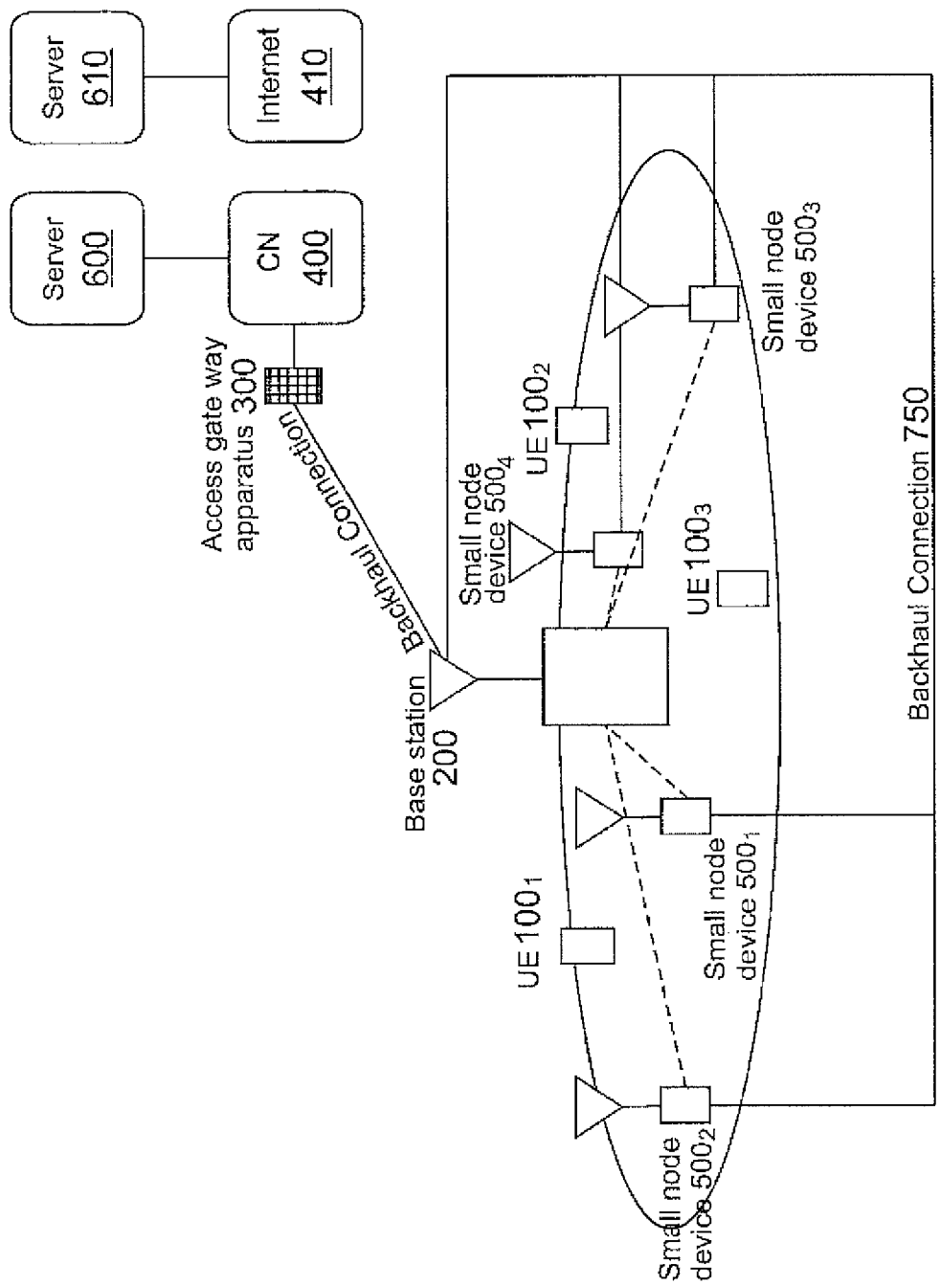
FIG. 8 illustrates a modification of the architecture of FIG. 5 in which the backhaul links from the small-node devices route through the base station.
Figure 9:
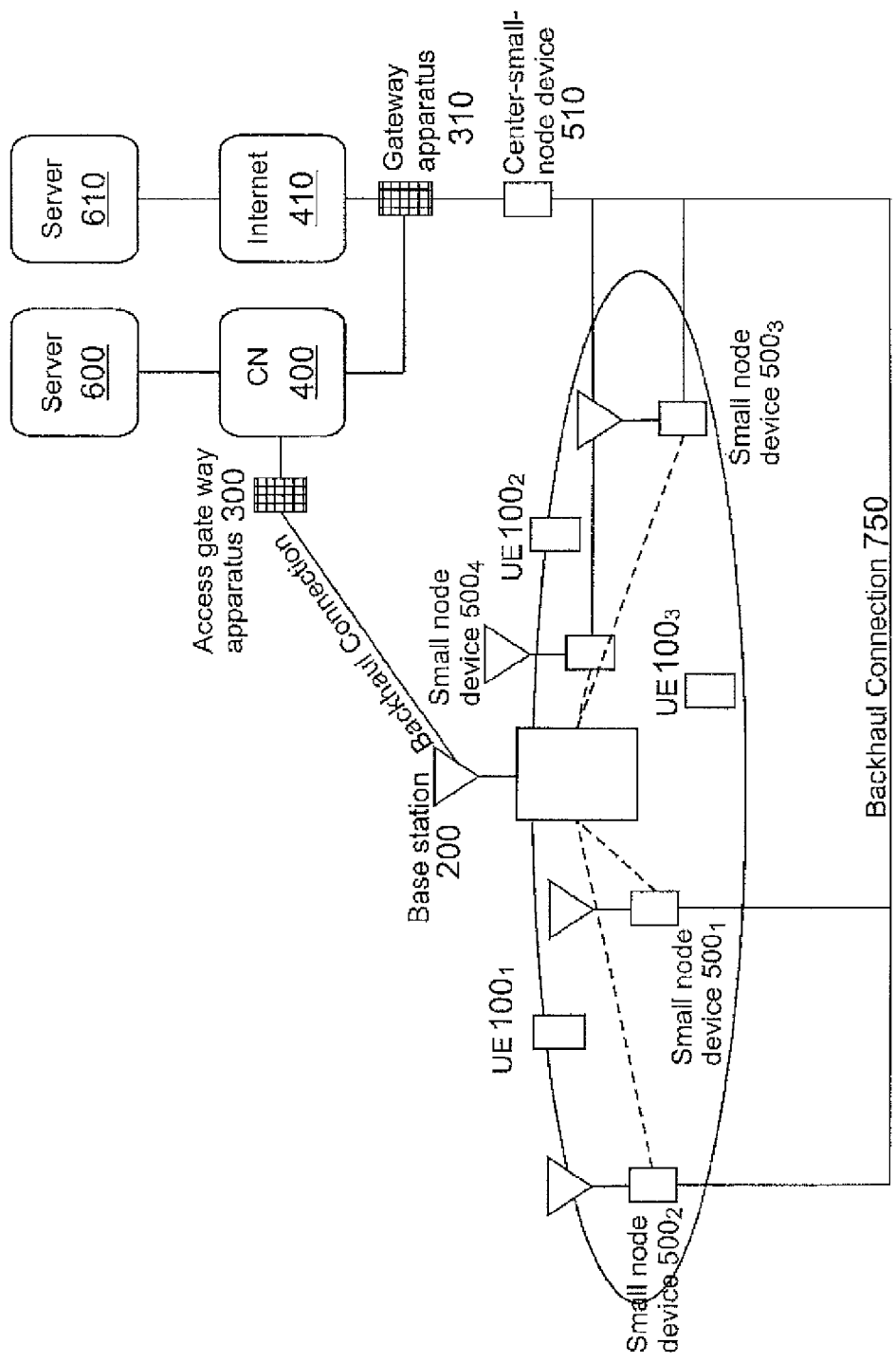
FIG. 9 illustrates a modification of the architecture of FIG. 6 in which the backhaul links from the small-node devices route through a center small-node device.

Backhaul connection 750 may be varied as shown in FIG. 7 such that it couples between access gateway 300 and small-node devices 500. Alternatively, backhaul connection 750 may couple between base station 200 and small-node devices 500 as shown in FIG. 8. In yet another alternative embodiment, backhaul connection 750 may couple between a center-node small-node device 510 and small-node devices 500 as shown in FIG. 9. Center-node small-node device 510 in turn couples to Internet 410 and core network 400 through a gateway 310 (which is optional) or directly to these networks. Should center node small-node device 510 be included, a layer sharing protocol may be implemented in which center node small-node device 510 implements the RLC/PDCP layer whereas the remaining small-node devices handle the Physical/MAC layers. Other layer sharing methods may be implemented. For example, center node small-node device 510 may implement the PDCP layer whereas the remaining small-node devices implement the Physical/MAC/RLC layers. It may be determined by data bearers whether data should be offloaded through the small-node devices. It may also be determined by data bearers whether data should flow via the small-node devices and the Internet 410, or via the small-node devices and core network 400, or via the small-node devices and base station 200. Data bearers may be logical channels or logical channel types.

The carrier frequency in D2UE connection 710 may be different from that in BS2UE connection 720. Alternatively, the carrier frequency in D2UE connection 710 may be the same as that in BS2UE connection 720.

The control of the establishment, re-configuration, and release and/or handoff of the D2UE link will now be examined in greater detail. In some of the following examples, it is assumed without loss of generality that the carrier frequency in the D2UE connection is 3.5 GHz and that TDD is applied to the D2UE connection. Furthermore, it is also assumed in these examples that the carrier frequency in the BS2UE connection between base station 200 and user equipment 100 is 2 GHz, and that the carrier frequency in the BS2D connection between base station 200 and small-node device 500 is 2 GHz. To begin the configuration, user equipment 100 may transmit an RRC connection request to base station 200. In response, base station configures BS2UE connection 720. Alternatively, base station 200 may send a paging signal to user equipment 100 such that user equipment 100 sends an RRC connection request corresponding to the paging signal to base station 200. In response, base station 200 configures BS2UE connection 720 as well as a connection between user equipment 100 and server 600 via base station 200, access gateway 300, and core network 400.

Similarly, base station 200 configures BS2D connection 730 between base station 200 and small-node devices 500. This configuration can be permanent or established analogously to the BS2UE connection. In some embodiments, a small-node device 500 has the ability to power-down or enter a sleep state when not in use. In such embodiments base station 200 is configured to send small-node device 500 a wakeup signal using BS2D connection 730 as supported by an X2 or other suitable protocol. In some other embodiments, the protocol design may be an LTE interface. Furthermore, the small-node device may be able to use power-saving modes, such as stand-by modes, equivalent to user equipment. In this case, exiting such power-saving modes may be done in the same fashion as the user equipment 100 and possibly in response to signals expected or sent by the base-station 200. The signals may be a paging signal or a control signaling such as MAC control signaling or physical layer signaling.

As discussed above, BS2D connection 730 may be permanently configured between base station 200 and small-node device 500. In such a permanently-configured embodiment, small-node device 500 may be in a discontinuous reception mode in BS2D connection 730 when D2UE connection 710 is not configured between small-node device 500 and user equipment 100. In this case, small-node device 100 may not transmit signals or may transmit signals extremely infrequently when D2UE connection 710 is not configured between small-node device 500 and user equipment 100. For example, even when D2UE connection 710 is not configured between small-node device 500 and user equipment 100, small-node device 500 may transmit only pilot signals infrequently so that user equipment 100 can detect small-node device 500. The periodicity of the pilot signals may be for example 100 ms or 1 second or 10 seconds. Alternatively, even when D2UE connection 710 is not configured between small-node device 500 and user equipment 100, small-node device 500 may transmit pilot signals based on a request from base station 200 so that user equipment 100 can detect small-node device 500.

After establishment of links 720 and 730, base station 200 may use control signaling in BS2UE connection 720 to command user equipment 100 to configure D2UE connection 710. Furthermore, base station 200 may use control signaling in BS2D connection 730 to command small-node device 500 to configure D2UE connection 710. Configuring the D2UE connection 710 may also be denoted as establishing the D2UE connection 710.

Furthermore, base station 200 controls D2UE connection 710. For example, base station 200 may order for user equipment 100 and small-node device 500 to re-configure or re-establish D2UE connection 710. Similarly, base station 200 may command equipment 100 and small-node device 500 to release the D2UE connection 710. Moreover, base station 200 may command user equipment 100 to handover the D2UE connection to another small-node device. More specifically, base station 200 may command user equipment 100 to conduct the handover to another small-node device in a carrier in which communication in D2UE connection 710 is conducted. The base station 200 may control the above procedures utilizing RRC signaling in BS2UE connection 720 and/or in BS2D connection 730.

Base station 200 may maintain the connections between user equipment 100 and server 600 utilizing BS2UE connection 720 if the D2UE connection is dropped.

Base station 200 may also control the radio resource allocation for D2UE connection 710. The details of the radio resource allocation for D2UE connection 710 are discussed further below. Alternatively, small-node device 500 may control the radio resource allocation for the D2UE link. In yet another alternative embodiment, both base station 200 and small-node device 500 may control the radio resource allocation for the D2UE link. The following discussion will assume without loss of generality that base station 200 performs this radio resource management.

Base station 200 may also configure one or more radio bearers for the communications such as in BS2UE link 720 and D2UE link 710. Control signaling for configuring the radio bearers is transmitted to user equipment 100 in BS2UE connection 720. Similarly, control signaling for configuring the radio bearers is transmitted to small-node device 500 in BS2D connection 730.

The radio bearers for BS2UE connection 720 may be the same or different from the ones for the D2UE connection 710. For example, radio bearers for packets of non-real-time services, such as web browsing, e-mail, and FTP, may be configured in D2UE connection 710. Conversely, radio bearers for packets of real-time services, such as VoIP and streaming, may be configured for BS2UE connection 720. Alternatively, the radio bearers for packets of non-real-time services are configured for both D2UE connection 710 and in BS2UE connection 720 such that packets of non-real-time services may be transmitted preferentially in D2UE connection 710. In yet another alternative, the radio bearers for the packets of real-time services are configured both in D2UE connection 710 and in BS2UE connection 720 such that the real-time services packets may be transmitted preferentially in BS2UE connection 720. Such prioritization or priority for the packets may be configured by base station 200. In that regard, base station 200 may select the appropriate connection (D2UE connection 710 or BS2UE connection 720) that should be preferentially utilized in the communications for each radio bearer.

Control plane (C-plane) signaling, such as Non Access Stratum (NAS) signaling and Radio Resource Control (RRC) signaling, may be transmitted in BS2UE connection 720. For example, RRC signaling includes signaling messages for RRC connection establishment, initial security activation, RRC connection reconfiguration, RRC connection release, RRC connection re-establishment, radio resource configuration, measurement reports, handover command, and so on. A radio bearer for C-plane signaling may be denoted as a signaling radio bearer. C-plane signaling may be transmitted also in the D2UE connection 710. Alternatively, one part of a radio bearer data may be transmitted in the D2UE connection 710 and the other part of the radio bearer data may be transmitted in the BS2UE connection 720.

The small-node device may transmit common channels/signals, such as Primary Synchronization signals (PSS), Secondary Synchronization signals (SSS), Common Reference Signals, and Broadcast channels in D2UE connection 710. Alternatively, small-node device 500 may not transmit any common channels/signals or may transmit common channels/signals extremely infrequently. For example, small-node device 500 may transmit pilot signals infrequently so that user equipment 100 can detect the small-node device. The periodicity of the pilot signals may be for example 1 second or 10 seconds. Alternatively, small-node device 500 may transmit pilot signals based on a request from base station 200 so that user equipment 100 can detect small-node device 500.

Figure 10:
FIG. 10 illustrates time slots for the D2UE link and the user equipment's BS2UE link.

User equipment 100 conducts communication in D2UE connection 710 and communication in BS2UE connection 720 simultaneously. In one embodiment, user equipment 100 communicates over D2UE connection 710 and over BS2UE connection 720 simultaneously utilizing carrier aggregation functions. In that regard, user equipment 100 may have two radio frequency (RF) interfaces to conduct communication in D2UE connection 710 and communication in BS2UE connection 720 simultaneously. Alternatively, user equipment 100 may conduct communication in D2UE connection 710 and communication in BS2UE connection 720 in a time division multiplexing manner as shown in FIG. 10. Two sets of time slots, Duration #A and Duration #B, are shown in FIG. 10. User equipment 100 may communicate in BS2UE connection 720 in the time slots corresponding to Duration #A and may communicate in D2UE connection 710 in the time slots corresponding to Duration #B.

The time duration for the D2UE connection may be larger than the one for the BS2UE connection so that the data offload effects can be increased. For example, the length of Duration #A may be 8 msec whereas the length of Duration #B may be 1.28 sec. The time duration for BS2UE connection 720 (Duration #A in FIG. 10) may correspond to an on-duration in a DRX control over BS2UE connection 720. The time duration for D2UE connection 710 may correspond to an off-duration in the DRX control over BS2UE connection 720. The off-duration means a sleep mode in DRX control, in which user equipment 100 does not have to monitor physical control channels transmitted from base station 200 over BS2UE connection 720. In case that user equipment 100 uses time division multiplexing with regard to connections 710 and 720, it does not have to support a capability of simultaneously communicating over these connections, i.e. user equipment 100 can switch the RF interface from BS2UE connection 720 to that for D2UE connection 710 and vice versa. As a result, cost/complexity of user equipment 100 can be reduced.

Base station 200 may control the radio resource allocation for D2UE connection 710. The radio resources may be allocated selectively in the time domain, frequency domain, and code domain resources. For example, base station 200 may configure D2UE connection 710 to use a non-overlapping spectrum with regard to any other D2UE connections such as by controlling a carrier center frequency. As a result, interference problems caused by other D2UE connections can be mitigated. Similarly, base station 200 may configure the time resource in D2UE connection 710 so that it does not overlap with the time resource utilized in other D2UE connections. Alternatively, base station 200 may configure the code resource in D2UE connection 710 so that it does not overlap with the code resource utilized in other D2UE connections. As a result, interference problems caused by other D2UE connections can be mitigated.

In an alternative embodiment, some radio resource parameters for D2UE connection 710 may be configured by base station 200 and the other parameters may be configured by small-node device 500. For example, the frequency domain resource for D2UE connection 710 may be configured by base station 200 and the time domain resource for D2UE connection 710 may be configured by small-node device 500. Alternatively, the center carrier frequency for the D2UE connection 710 may be configured by base station 200 and the other frequency domain resources (such as an identification number of resource blocks or the number of resource blocks) and the time domain resource for D2UE connection 710 may be configured by small-node device 500.

In another alternative embodiment, base station 200 may configure several sets of the radio resources for D2UE connection 710, and small-node device 500 may select one out of the several sets of the radio resources for D2UE connection 710.

Base station 200 transmits control signaling to user equipment 100 in BS2UE connection 720 so that it configures the radio resources for D2UE connection 710 as described above. Furthermore, base station 200 transmits control signaling to small-node device 500 in BS2D connection 730 so that it configures the radio resources for the D2UE connection 710 as described above.

In addition, base station 200 may control the transmission power for DL in D2UE connection 710. More specifically, base station 200 may configure the maximum transmission power for DL in D2UE connection 710. Furthermore, base station 200 may control the transmission power for UL in D2UE connection 710. More specifically, base station 200 may configure the maximum transmission power for UL in D2UE connection 710.

Base station 200 may set the maximum transmission power for DL or UL in D2UE connection 710 based on the number of the user equipment in the cell where the small-node device provide radio communication service. For example, the base station sets the maximum transmission power to be higher in case that the number of the user equipment in the cell is relatively small. Conversely, the base station will set the maximum transmission power to be lower if the number of the user equipment in the cell is large. As a result, an interference level in the carrier used in D2UE connection 710 can be reduced by making the maximum transmission power low in a high density deployment. In case that there are relatively few user equipment, coverage area of D2UE connection 710 can be increased by making the maximum transmission power relatively high. Another power selection scheme is discussed further below with regard to an FDD enhancement for the D2UE link.

Alternatively, base station 200 may set the maximum transmission power in D2UE connection 710 based on the frequency in which communications in the D2UE connection are conducted. More specifically, if the communication frequency in the D2UE connection is relatively close to a frequency utilized by another system; interference level with the other system can be reduced by making the maximum transmission power low. Conversely, should the other system use different frequencies as compared to the D2UE connection, the coverage area for the D2UE link may be increased by making the maximum transmission power relatively high.

To assist in the optimization of the D2UE link, user equipment 100 may make measurements and detect the nearest small-node device so that the data throughput in the D2UE connection can be maximized and the interference caused by the D2UE connection can be minimized. Furthermore, the user equipment may report results of the measurements and the detected nearest small-node device to the base station. In turn, the base station controls the D2UE connection based on the results and the detected nearest small-node device as reported by the user equipment. For example, when the identity of the nearest small-node device changes, the base station may order for the user equipment to stop communications with the currently serving small-node device and start new communication with the newly-detected nearest small-node device. In other words, as the UE moves from one small-node device to another, the base station commands the UE to handoff the other small-node device accordingly.

Figure 11:
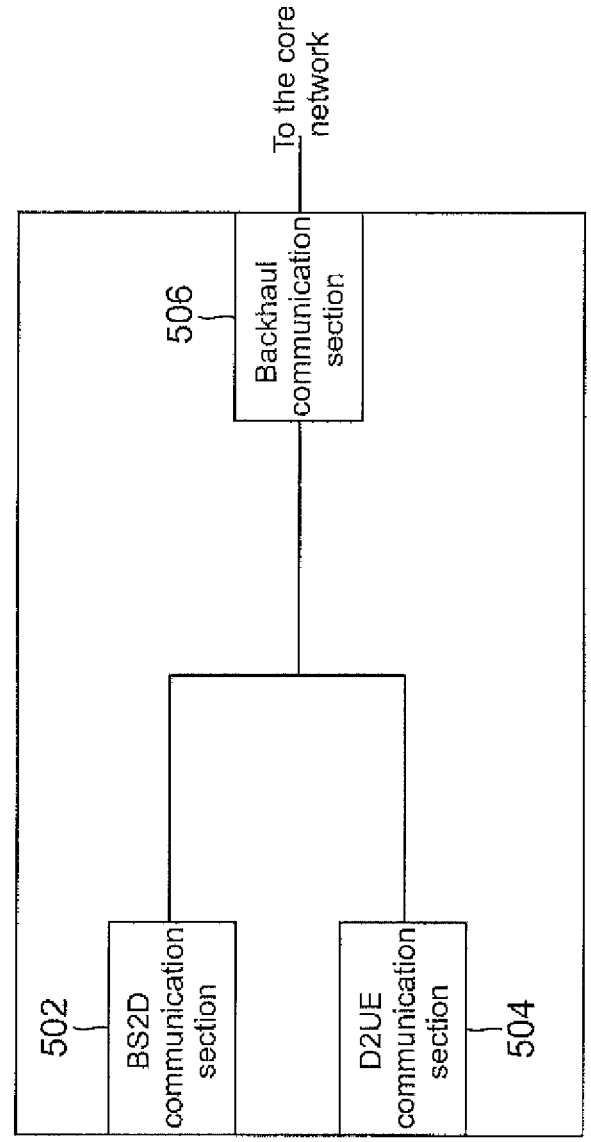
FIG. 11 is a block diagram for an example small-node device.

A block diagram of an example small-node device 500 is shown in FIG. 11. In this embodiment, small-node device 500 includes a BS2D communication section 502, a D2UE communication section 504, and a backhaul communication section 506. BS2D communication section 502, D2UE communication section 504, and backhaul communication section 506 are all connected to each other.

BS2D communication section 502 communicates with base station 200 utilizing BS2D connection 730. More specifically, BS2D communication section 502 receives control signaling for D2UE connection 710 from base station 200 and transmits control signaling for D2UE connection 710 to base station 200. The control signaling includes signaling for establishing/configuring/re-configuring/re-establishing/and releasing D2UE connection 710. Signaling for D2UE connection handover may also be included in the control signaling. In some embodiments, the control signaling may be an RRC layer signaling in LTE. The control signaling is transmitted to the D2UE communication section 504. The control signaling may include parameters for at least one of physical layer, MAC layer, RLC layer, PDCP layer, or RRC layer for D2UE connection 710. The control signaling may include information for the radio bearers.

Furthermore, the control signaling may include radio resource control information for D2UE connection 710. As described above, the radio resource control information for D2UE connection 710 may include radio resource information that can be utilized by D2UE connection 710 or may include radio resource information that cannot be utilized by the D2UE connection. The radio resource may include at least one of a time domain resource, a frequency domain resource, and a code domain resource. The radio resource control information may also be transmitted to the D2UE connection.

Furthermore, the control signaling may include link adaptation information for the D2UE connection. More specifically, the link adaptation may be one of power control and adaptive modulation and coding. The power control information may include information on the maximum transmission output power in the D2UE connection.

In some embodiments, the control signaling may include measurement results for D2UE connection 710. More specifically, BS2D communication section 502 may transmit measurement results, which are obtained by D2UE communication section 504. The measurement results include radio link quality in UL for the D2UE link such as path loss between the small-node device and the user equipment, received signal-to-interference ratio (SIR) in UL for the D2UE link, UL interference power, and so on. The measurements for user equipment may concern the currently-connected user equipment over the D2UE connection or may concern a UE that is not currently connected to the small-node device using the D2UE connection. Alternatively, the measurement results include a radio link quality between the reporting small-node device and other small-node devices.

D2UE communication section 504 communicates with user equipment 100 utilizing D2UE connection 710. More specifically, D2UE communication section 504 establishes/configures/re-configures/re-establishes/and releases D2UE connection 710 between small-node device 500 and user equipment 100. This management of D2UE connection 710 may be based on the control signaling transmitted by base station 200.

D2UE communication section 504 may conduct a link adaptation for D2UE connection 710, such as power control and adaptive modulation and coding. Furthermore, D2UE communication section 504 transmits data to user equipment 100 and receives data from user equipment 100 utilizing the D2UE connection 710. As described above, data for some of the radio bearers may be transmitted in D2UE connection 710.

Hereinafter, data transferred from the user equipment 100 to server 600 (or server 610) is called "uplink data" and data transferred from the server 600 (or server 610) to user equipment 100 is called "downlink data." D2UE communication section 504 transmits the downlink data to user equipment 100 using D2UE connection 710. The downlink data is transferred from server 600 via core network 400 and backhaul communication section 506. D2UE communication section 504 receives the uplink data from user equipment 100 over D2UE connection 710. The uplink data is then transferred to server 600 via backhaul communication section 506 and core network 400. D2UE communication section 504 also conducts measurements for D2UE connection 710. More specifically, D2UE communication section 504 make measurements of the radio link quality for D2UE connection 710 between small-node device 500 and user equipment 100. The radio link quality may be at least one of pilot signal received power, path loss, signal-to-interference ratio, channel state information, channel quality indicator, and received signal strength indicator for UL in D2UE connection 710. The radio link quality may be calculated using the pilot signal transmitted by the currently-connected user equipment. The path loss is between small-node device 500 and the user equipment. The measurements may include the interference power level in the frequency band over which the D2UE communication operates. In some embodiments, D2UE communication section 504 may make measurements of the radio link quality between small-node device 500 and other small-node devices. D2UE communication section 504 reports the measurement results to base station 200 via BS2D communication section 502 and BS2D connection 730.

Backhaul communication section 506 is connected to core network 400 via a backhaul link. The backhaul link may be a wired connection or a wireless connection or a mixture of a wired connection and a wireless connection. The wireless connection may be a connection provided by a WiFi (Wireless LAN) or cellular system.

Backhaul communication section 506 transmits to D2UE communication section 504 the downlink data, which is transferred via the backhaul link from core network 400. Backhaul communication section 506 transmits to the core network the uplink data (which is transferred from the D2UE communication section 504) via the backhaul link.

Figure 11A:
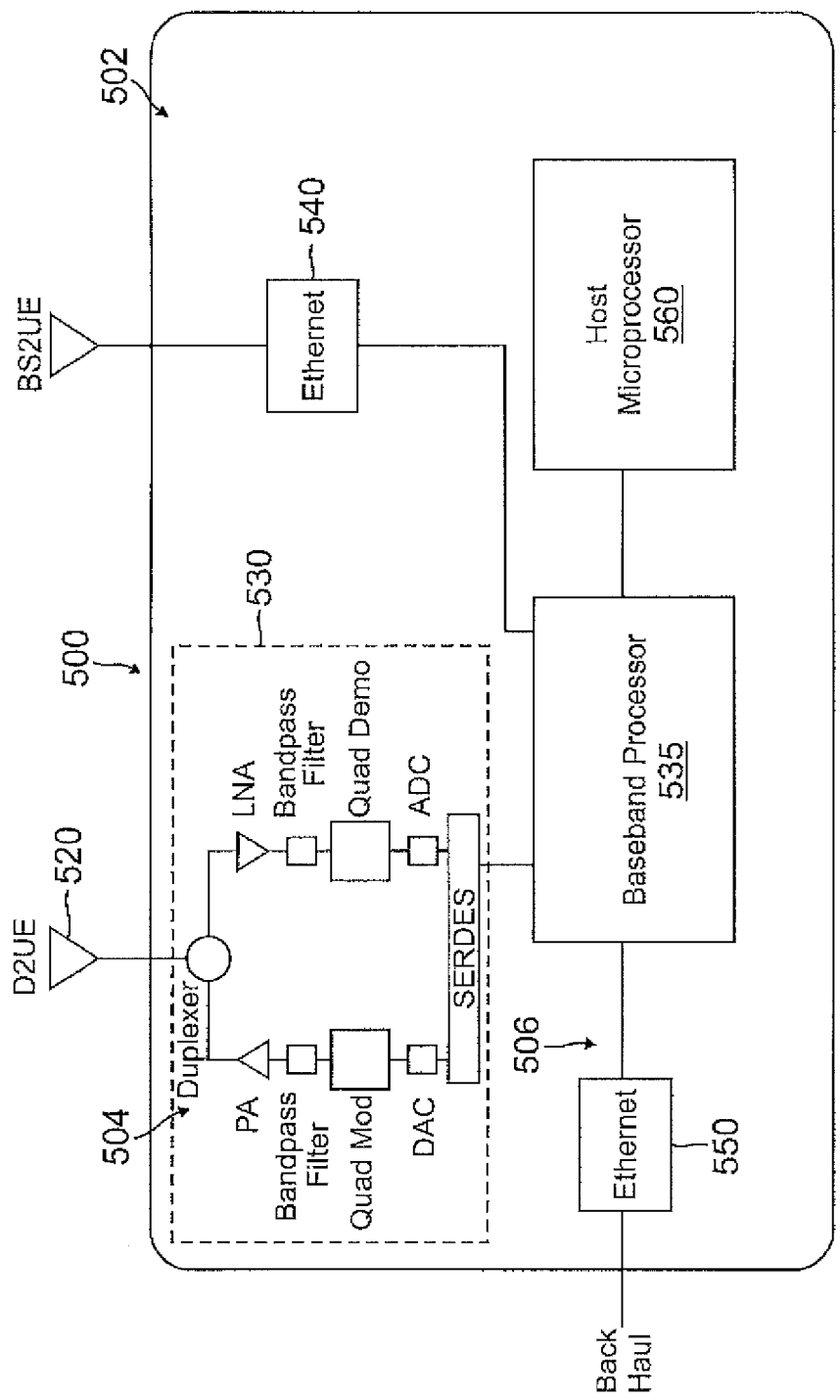
FIG. 11A is a more-detailed block diagram for a small-node device embodiment.

One of ordinary skill in the art will readily appreciate that the functional blocks shown in FIG. 11 would comprise appropriate hardware and software. For example, FIG. 11A shows an example instantiation of these blocks. As seen in FIG. 11A, small-node device 500 includes an RF interface 530 for the D2UE link. Data from the UE would be received over the D2UE link at an antenna 520 that couples to RF interface 530. RF interface 530 includes a duplexer to enable both receive and transmit functionality at antenna 520. However, as will be explained further herein, the duplexer may be omitted in certain embodiments. Baseband data to be transmitted to the UE is received at RF interface 530 from a baseband processor 535. A SERDES serializes the baseband data followed by a conversion to analog form in a digital-to-analog converter (DAC). The resulting analog signal is then processed by a quadrature modulator to modulate the desired carrier frequency. After passing through a bandpass filter and a power amplifier (PA), the resulting RF signal is then ready for transmission to the UE. Reception of data from the UE is similar except that the PA is replaced by a low noise amplifier (LNA) and the quadrature modulator is replaced by a quadrature demodulator. The resulting analog baseband data is then converted to digital form in an analog-to-digital converter (ADC) before being de-serialized in the SERDES.

In embodiments in which the BS2D link is a wireless link, small-node device 500 may include another RF interface analogous to RF interface 530 to service the BS2D link. The embodiment of FIG. 11A, however, uses a wired BS2D link. To service such a link, small-node device 500 includes a suitable interface card or circuit such as an Ethernet interface 540. Control signaling exchanged between the small-node device and the base station passes couples through Ethernet interface 540 to baseband processor 535.

In FIG. 11A, the backhaul link is also a wired Ethernet link that is received by an Ethernet interface 550. Downlink data from the backhaul link thus passes from Ethernet interface 550 to the baseband processor, which in turn is controlled by a host microprocessor 560. Backhaul communication section 506 of FIG. 11 thus maps to Ethernet interface 550 as well as the supporting functions carried out by baseband processor 535 and host microprocessor 560. Similarly, BS2D communication section 502 maps to Ethernet interface 540 and the supporting functions performed by baseband processor 535 and host microprocessor 560. Finally, D2UE communication section 504 maps to antenna 520, RF interface 530, and the supporting functions performed by baseband processor 535 and host microprocessor 560.

Figure 12:
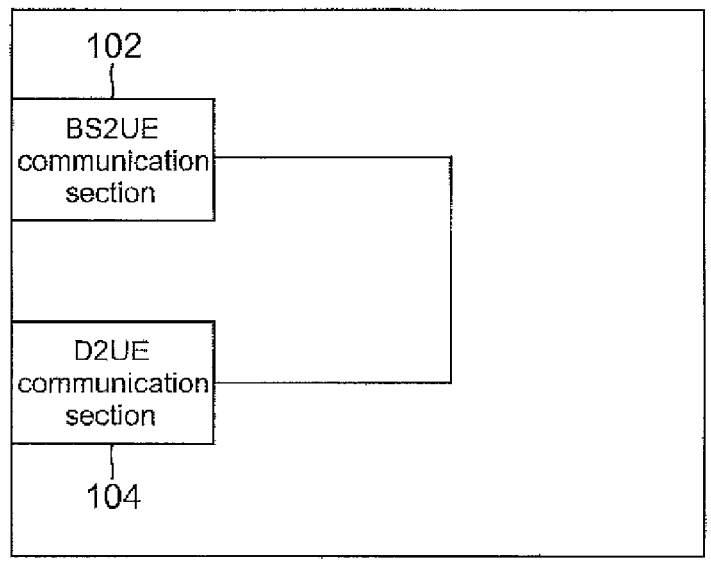
FIG. 12 is a block diagram for an example user equipment.

A block diagram for an example user equipment 100 embodiment is shown in FIG. 12. User equipment 100 includes a BS2UE communication section 102 and a D2UE communication section 104, which are connected to each other. BS2UE communication section 102 communicates with base station 200 utilizing BS2UE connection 720. As described above, data for some of radio bearers may be transmitted in BS2UE connection 720. For example, control signaling such as RRC signaling, NAS signaling, and MAC layer signaling may be transmitted in BS2UE connection 720. Furthermore, packets for Voice over IP (VoIP) may also be transmitted in BS2UE connection 720. BS2UE communication section 102 may transmit/receive data for all radio bearers to and from the base station 200 if D2UE connection 710 is dropped or not available. Furthermore, BS2UE communication section 102 receives control signaling for D2UE connection 710 from base station 200 and transmits control signaling for D2UE connection 710 to base station 200. Such control signaling is the same or analogous to that described above for small-node device 500 of FIG. 11.

The control signaling is analogous because it includes signaling for establishing/configuring/re-configuring/re-establishing/and releasing D2UE connection 710. Signaling for D2UE connection handover may also be included in the control signaling. The control signaling may be an RRC layer signaling in LTE. Alternatively, the control signaling may be a MAC layer signaling in LTE. In yet another alternative embodiment, some of the control signaling may be an RRC signaling and others may be a MAC layer signaling. The control signaling is transmitted to D2UE communication section 104. The control signaling may include parameters for at least one of physical layer, MAC layer, RLC layer, PDCP layer, or RRC layer for D2UE connection 710. The control signaling may include information for the radio bearers.

In addition, the control signaling may include radio resource control information for D2UE connection 710. As described above, the radio resource control information for D2UE connection 710 may include radio resource information that can be utilized by D2UE connection 710 or may include radio resource information that cannot be utilized by the D2UE connection. The radio resource may include at least one of a time domain resource, a frequency domain resource, and a code domain resource. The radio resource control information may also be transmitted to the D2UE connection.

Furthermore, the control signaling may include link adaptation information for the D2UE connection. More specifically, the link adaptation may be one of power control and adaptive modulation and coding. The power control information may include information on the maximum transmission output power in the D2UE connection.

Finally, the control signaling may include measurement results for D2UE connection 710. More specifically, BS2UE communication section 102 may transmit measurement results, which are obtained by D2UE communication section 104. The measurement results include radio link quality in DL for the D2UE link such as path loss between the small-node device and the user equipment, received signal-to-interference ratio (SIR) in DL for the D2UE link, DL interference power, and so on. The measurements for small-node device may concern the currently-connected small-node device or may concern neighbor small-node devices.

The currently-connected small-node device may be denoted as a serving small-node device. Details of the radio link quality in DL will be described further below.

D2UE communication section 104 communicates with small-node device 500 over D2UE connection 710. More specifically, D2UE communication section 104 establishes/configures/re-configures/re-establishes/releases D2UE connection 710 between small-node device 500 and user equipment 100. The management of D2UE connection 710 may be based on the control signaling transmitted by base station 200. D2UE communication section 104 may conduct a link adaptation for D2UE connection 710, such as power control and adaptive modulation and coding. Furthermore, D2UE communication section 104 transmits data to small-node device 500 in UL and receives data from the small-node device in DL utilizing D2UE connection 710. As described above, data for some of the radio bearers may be transmitted in D2UE connection 710.

D2UE communication section 104 also conducts measurements for D2UE connection 710. More specifically, D2UE communication section 104 makes measurements of the DL radio link quality for the D2UE connection between user equipment 100 and the currently-connected small-node device or a neighbor small-node device. The DL radio link quality may be at least one of pilot signal received power, path loss, signal-to-interference ratio, channel state information, channel quality indicator, and received signal strength indicator. The radio link quality may be calculated by the pilot signal transmitted by the serving small-node device or a neighbor small node device. The path loss is the one between user equipment 100 and the serving small-node device or a neighbor small node device. D2UE communication section 104 reports the measurement results to base station 200 via BS2UE communication section 102 and BS2UE connection 720.

Figure 13:
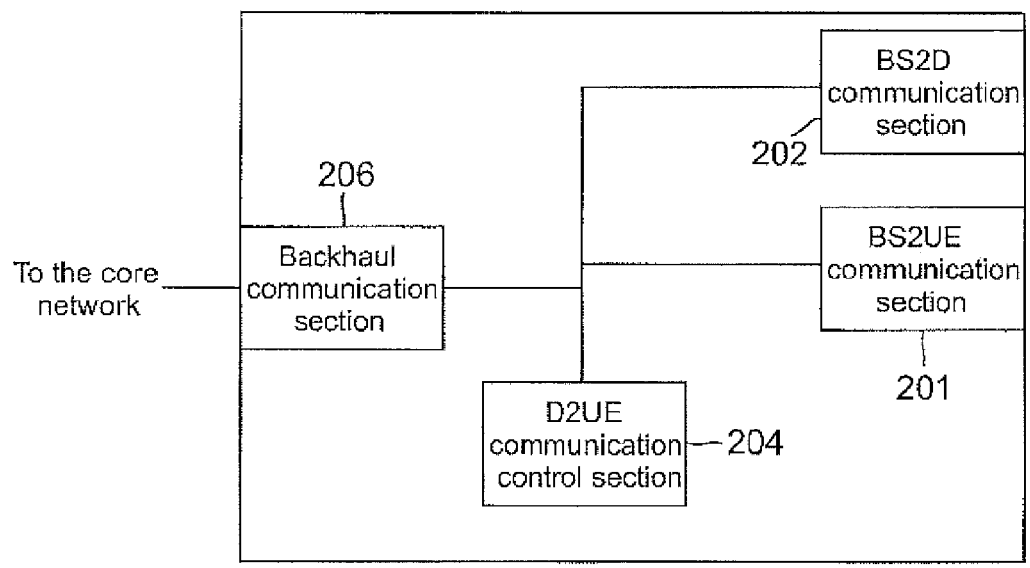
FIG. 13 is a block diagram for an example base station.

A block diagram for an example base station 200 is shown in FIG. 13. Base station 200 includes a BS2UE communication section 201, a BS2D communication section 202, a D2UE communication control section 204, and a backhaul communication section 206, which are all connected to each other.

BS2UE communication section 201 communicates with the user equipment utilizing BS2UE connection 720. As described above, data for some of radio bearers are transmitted in BS2UE connection 720. For example, control signaling such as RRC signaling and NAS signaling and MAC layer signaling may be transmitted in BS2UE connection 720. Furthermore, packets for Voice over IP (VoIP) may also be transmitted in BS2UE connection 720. Data for some other data bearers may also be transmitted in the BS2UE connection 720.

As also described above, BS2UE communication section 201 may transmit/receive data for all radio bearers to and from user equipment 100, when D2UE connection 710 is dropped or not available. Some parts of data, such as U-plane data, transmitted from user equipment 100 are transferred to core network 400 via BS2UE communication section 201 and backhaul communication section 206. Some parts of data, such as U-plane data, transmitted from server 400 are transferred to user equipment 100 via backhaul communication section 206 and the BS2UE communication section 201.

Furthermore, BS2UE communication section 201 receives control signaling for D2UE connection 710 from user equipment 100 and transmits control signaling for D2UE connection 710 to user equipment 100. This control signaling is the same as that for user equipment 100 and thus its description will not be repeated.

BS2D communication section 202 communicates with small-node device 500 utilizing BS2D connection 730. BS2D communication section 202 receives control signaling for D2UE connection 710 from small-node device 500 and transmits control signaling for D2UE connection 710 to small-node device 500. This control signaling is the same as that discussed for small-node device 500 and thus its description will not be repeated.

The control signaling for D2UE connection 710 is produced by the D2UE communication control section 204 as described below and is transferred to the user equipment 100 via the BS2UE communication section 201. The control signaling is also transmitted to the small-node device via the BS2D communication section 202.

D2UE communication control section 204 conducts radio link connection control for D2UE connection 710. The radio link connection control includes at least one of establishing/configuring/re-configuring/re-configuring/re-establishing/releasing D2UE connection 710. The parameters for the radio link connection control are transmitted to user equipment 100 via BS2UE communication section 201 and to small-node device 500 via BS2D communication section 202. These parameters may include at least one of physical layer, MAC layer, RLC layer, PDCP layer, and RRC layer parameters. The parameters may include the information for the radio bearers. The radio link connection control may be denoted herein as radio resource control.

More specifically, D2UE communication control section 204 may determine that D2UE connection 710 should be released when the path loss between user equipment 100 and small-node device 500 is larger than a threshold. For example, D2UE communication control section 204 may send control signaling to release D2UE connection 710. The D2UE communication control section may conduct such determination based on the measurement reports which are transmitted by at least one of user equipment 100 and small-node device 500. More specifically, at least one of user equipment 100 and small-node device 500 may detect whether or not the path loss is larger than the threshold and send the measurement reports in case that the path loss is larger than the threshold. D2UE communication control section 204 may send the control signaling to at least one of the user equipment 100 and the small-node device 500 after it receives the measurement reports. In the above examples, DL transmission power or UL transmission power in D2UE connection 710 may be utilized instead of the path loss.

D2UE communication control section 204 also controls handover of the D2UE connection between the user equipment 100 and small-node device 500. More specifically, D2UE communication control section 204 receives the measurement reports from user equipment 100 and determines whether or not user equipment 100 should hand over from a serving small-node device to a closer neighboring small-node device. Here, the designation of a "serving small-node device" refers to the small-node device that currently has the D2UE connection with the user equipment.

In addition, D2UE communication control section 204 may control the radio resource for the D2UE connections. More specifically, D2UE communication control section 204 may assign the radio resource for a D2UE connection so that it will not interfere with other D2UE connections and vice versa. In this fashion the radio resource of one D2UE connection will not overlap with remaining D2UE connections. The radio resource may be indicated to the user equipment and the small-node device by radio resource control parameters. The parameters may include at least one of ID of the frequency domain resource, ID of the time domain resource, and ID of the code domain resource. The radio resource, which is assigned to the D2UE connection, may be determined based on the number of user equipment in the cell having the serving small-node device or based on an interference level in the frequency band in which the D2UE communication operates.

Furthermore, D2UE communication control section 204 may control the link adaptation for D2UE connection 710. More specifically, the link adaptation may be one of power control and adaptive modulation and coding. The power control information may include information on the maximum transmission output power for DL or UL in the D2UE connection 710.

The control signaling, which is determined based on the above-described control in D2UE communication control section 204, is transmitted to the user equipment via BS2UE communication section 201. The control signaling is transmitted to the small-node device via BS2D communication section 202.

Backhaul communication section 206 provides the downlink data received from core network 400 to BS2UE communication section 201. Similarly, BS2UE communication section 201 provides uplink data to backhaul communication section 206, which then transmits the uplink data to core network 400.

One of ordinary skill will readily appreciate that the functional blocks shown in FIGS. 12 and 13 for user equipment 100 and base station 200, respectively, would map to analogous components as discussed with regard to user equipment 500. For example, the user equipment would require two analogous RF interfaces for BS2UE communication section 102 and D2UE communication section 104. These RF interfaces would cooperate with appropriate processor such as a baseband processor and a host microprocessor.

Figure 14:
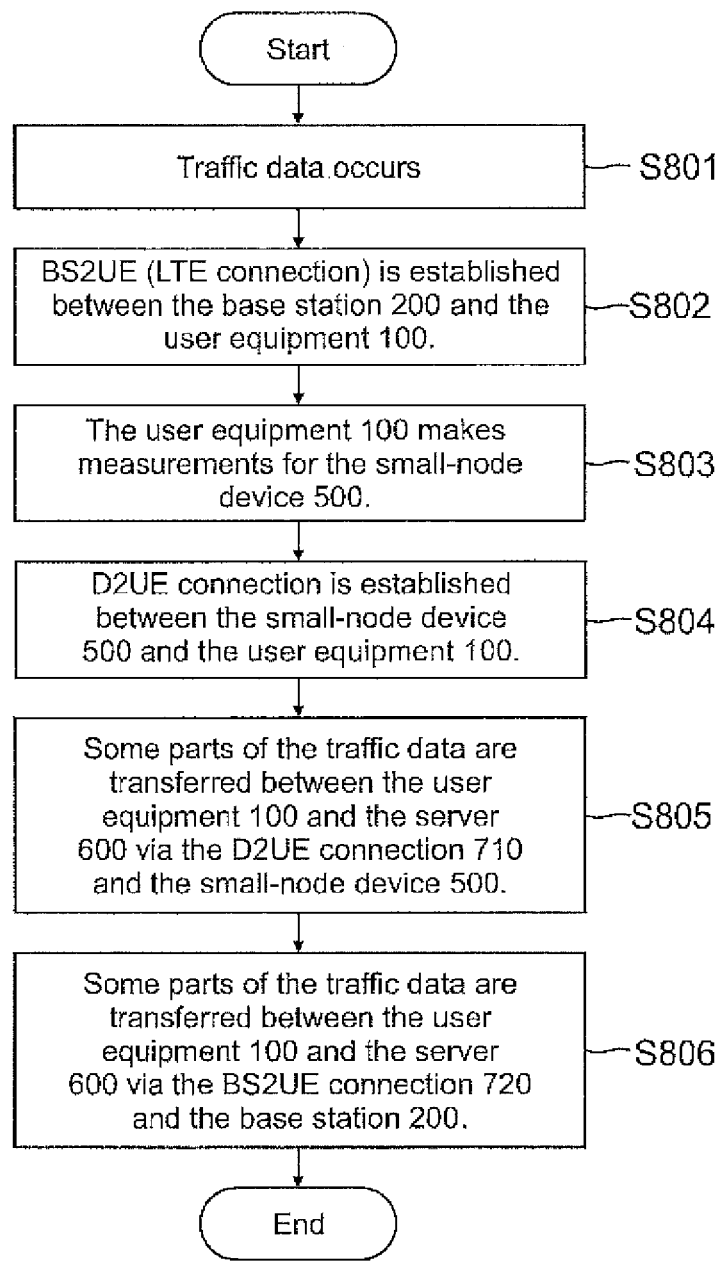
FIG. 14 is a flowchart for a D2UE connection establishment method.

Operation of the mobile communication system described herein may be better understood with reference to the flowchart shown in FIGS. 14 and 14A, which address the establishment of connections in response to the occurrence of traffic data to be transmitted. The flowchart begins with a step S801 with the occurrence of traffic data, either uplink and/or downlink data. For example, the traffic data may correspond to sending/receiving e-mails, browsing web sites, downloading files, or uploading files.

In a step S802, an LTE connection (BS2UE connection 720) between base station 200 and user equipment 100 is established. If the connection is triggered by the user equipment, the user equipment may initiate the connection by random access procedures. If the connection is triggered by server 600, the base station may send a paging message to initiate the connection. Step S802 corresponds to Step A802 in FIG. 14A.

In the embodiments of FIGS. 14 and 14A, it is assumed that BS2D connection 730 is always configured between base station 200 and small-node device 500. In some other embodiments, however, a connection between base station 200 and small-node device 500 (the BS2D connection 730) is established in step S802 or just after step S802. The establishment may be triggered by base station 200 using control signaling. Furthermore, small-node device 500 may start transmitting pilot signals for D2UE connection 710 after it is requested by base station 200 in the above establishment procedures. As a result, it may not cause significant interference with other communications in the frequency band when it does not transmit the pilot signals.

In a step S803, user equipment 100 makes measurements for the D2UE connection. In particular, user equipment 100 makes measurements for the DL radio link quality in the D2UE connection. More specifically, user equipment 100 transmits to the base station a measurement report, which notifies the base station of an identification number for the small-node device having the best DL radio link quality.

In one embodiment, the measurements for the D2UE connection may be conducted as illustrated in the steps A803a, A803b and A803c in FIG. 14A. In a step A803a, the base station transmits control signaling to the user equipment in BS2UE connection 720 and orders for the user equipment to make measurements for the D2UE connection so that the user equipment detects the small-node device with the best radio link quality.

The control signaling may include information for the measurements. For example, the control signaling may include at least one of carrier frequency for the D2UE connection, bandwidth of the D2UE connection, an identification number for the small-node device, information on measurement quantity, information on the pilot signals transmitted by the small-node device and so on. The information on the measurement quantity may be an indicator of Reference Signal Received Power (RSRP) or Reference Signal Received Quality (RSRQ). The information on the pilot signals may concern the radio resource of the pilot signals. More specifically, the pilot signal information may be at least one of the transmission periodicity of the pilot signals, the frequency-domain resource information of the pilot signals, the time-domain resource information of the pilot signals, and the like. As discussed further, a time offset between the D2UE connection and the BS2UE connection may also be included in the information on the pilot signals. Furthermore, transmission power of the pilot signals may be include in the information on the pilot signals.

Furthermore, rules for sending measurement reports to the base station 200 may also be included in the information for the measurements. The rules may include criteria, which are similar to the ones for LTE, such as Event A1, A2, A3, A4, A5 and the like, which is specified in TS 36.331. Threshold value or Layer-3 filtering coefficient, Time-to-trigger may also be included in the information for the measurements. In addition, control signaling for cell selection/reselection may also be included in the information for the measurements. For example, control signaling for idle-mode measurements may also be included in the information for the measurements. Such control signaling may be transmitted in the dedicated control signaling or in the broadcast information.

The control signaling in the step S803 may also include an indicator whether or not the D2UE connection is available in the cell wherein base station 200 provides the radio communication system for user equipment 100. This control signaling may be transmitted in step A802, instead of step A803a.

In a step A803b, user equipment 100 makes measurements for the DL radio link quality in the D2UE connection.

In a step A803c, user equipment 100 transmits to base station 200 a measurement report in BS2UE connection 720, which notifies base station 200 of an identification number of the small-node device having the best DL radio link quality.

In a step S804, the D2UE connection between the user equipment and the small-node device (D2UE connection 710) is established. The base station orders for the user equipment and the small-node device to configure D2UE connection 710. The parameters for D2UE connection 710 are transmitted from base station 200 to user equipment 100 and small-node device 500 in BS2UE connection 720 and in BS2D connection 730, respectively. Furthermore, the establishment of D2UE connection 710 may be reported to base station 200 by user equipment 100 and/or the small-node device. Step S804 corresponds to steps A804a to A804f in FIG. 14A. In other words, the establishment of D2UE connection 710 may be conducted as illustrated in steps A804a, A804b, A804c, A804d, A804e, and A804f in FIG. 14A.

In a step A804a, base station 200 transmits control signaling to small-node device 500 in BS2D connection 730 and orders small-node device 500 to establish D2UE connection 710 with user equipment 100. In general, this small-node device is the one which has the best DL radio link quality based on the measurement report. In a step A804b, small-node device 500 may transmit acknowledgement of the received control signaling from step A804a. The control signaling may include at least one of an identification number of user equipment 100, capability information of user equipment 100, and the like.

In a step A804c, base station 200 transmits control signaling to user equipment 100 in BS2UE connection 720 and orders user equipment 100 to establish D2UE connection 710 with small-node device 500. For example, the control signaling of step A804c may include at least one of the following parameters:

Radio bearer information for D2UE connection 710
Carrier frequency information of D2UE connection 710
Frequency band indicator of D2UE connection 710
System bandwidth (Channel bandwidth) of D2UE connection 710
Cell barred information on D2UE connection 710
Identification number of small-node device 500
UL Maximum transmission power in D2UE connection 710
Information for the DL and UL slots in D2UE connection 710 (in case of TDD)
Information for the random access channel for D2UE connection 710
Information for the uplink physical control channels, such as PUCCH for D2UE connection 710
Information for the downlink physical control channels, such as PDCCH, PHICH for D2UE connection 710
Information for the uplink physical shared channel for D2UE connection 710
Information for the downlink physical shared channel for D2UE connection 710
Information for the uplink sounding reference signal for D2UE connection 710
Information for the uplink power control information for D2UE connection 710
Information for the downlink or uplink cyclic prefix information for D2UE connection 710
Information for the time alignment control in uplink for D2UE connection 710
Information for the RLC or PDCP configuration for each radio bearer for D2UE connection 710
Information for the MAC configuration for D2UE connection 710
Information for the security implemented in D2UE connection 710

Part or all of the information in step A804c may be transmitted to the small-node device 500 in step A804a.

The radio bearer information may indicate what kind of radio bearers should be configured for D2UE connection 710 or what kind of priority should be specified for each radio bearer. Since the parameters for D2UE connection 710 can be transmitted in step A804c, small-node device 500 may not have to transmit broadcast channels, which reduces small-node device complexity.

In a step A804d, user equipment 100 transmits control signaling to establish a connection between user equipment 100 and small-node device 500 (the D2UE connection 710). The control signaling may be a random access signaling. Alternatively, the control signaling may be a pre-assigned access signaling. Radio resource information of the pre-assigned access signaling may be transmitted to user equipment 100 by base station 200 in step A804c.

The radio resource information of the pre-assigned access signaling may be configured by base station 200. In this case, base station 200 may notify small-node device 500 of the radio resource information in step A804a. Alternatively, the radio resource information of the pre-assigned access signaling may be configured by small-node device 500. In such an embodiment, small-node device 500 may notify the base station 200 of the radio resource information in step A804b.

In a step A804e, small-node device 500 transmits acknowledgement of the control signaling transmitted in step A804d. As a result, D2UE connection 710 can be established.

In a step A804f, user equipment 100 transmits control signaling to base station 200 and notifies base station 200 that D2UE connection 710 has been successfully established.

In a step S805, some parts (for example, Data #2 in FIG. 3) of the traffic data are transferred between user equipment 100 and server 600 via D2UE connection 710 and small-node device 500 as discussed above with regard to FIG. 3. The data transmitted in D2UE connection 710 may be data for some parts of radio bearers, which are configured for the communication between user equipment 100 and server 600. More specifically, the data transferred via D2UE connection 710 may be at least one of best effort packets, non-real time service packets, and real time service packets. The data transferred via D2UE connection 710 may be U-plane data, Step S805 corresponds to Step A805 in FIG. 14A.

In a step S806, some parts (e.g., Data #1 in FIG. 3) of the traffic data are transferred between user equipment 100 and server 600 via BS2UE connection 720 and base station 200 as also discussed above with regard to FIG. 3. C-plane data may also be transmitted in BS2UE connection 720 instead of D2UE connection 710. Step S806 corresponds to step A806 in FIG. 14A.

The operations shown in FIG. 14 may be described in terms of the operations in the small-node device 500 as follows. These operations comprise establishing D2UE connection 710 with user equipment 100 (step S804) and transferring some parts of data, which are transferred between user equipment 100 and server 600 using D2UE connection 710 (step S805).

The operations shown in FIG. 14 may be described in terms of the operations in user equipment 100 as follows. These operations comprise establishing the LTE connection (BS2UE connection 720) with base station 200 (step S802), making measurements for small-node device (step S803), establishing D2UE connection 710 with small-node device 500 (step S804), transferring some parts of data (which are transferred between user equipment 100 and server 600) via D2UE connection 710 and small-node device 500 (step S805), and transferring some parts of data (which are transferred between user equipment 100 and server 600) via BS2UE connection 720 and base station 200 (step S806).

The process shown in FIG. 14 may be described in terms of the operations in the base station 200 as follows. The operations comprise establishing the LTE connection (BS2UE connection 720) with user equipment 100 (step S802), transmitting control signaling for establishing D2UE connection 710 (step S804), and transferring some parts of data (which are transferred between user equipment 100 and server 600) using BS2UE connection 720 (step S806). In D2UE connection 710, some parts of data (which are transferred between user equipment 100 and the server 600) are transferred via D2UE connection 710 and the small-node device 500.

Figure 15:
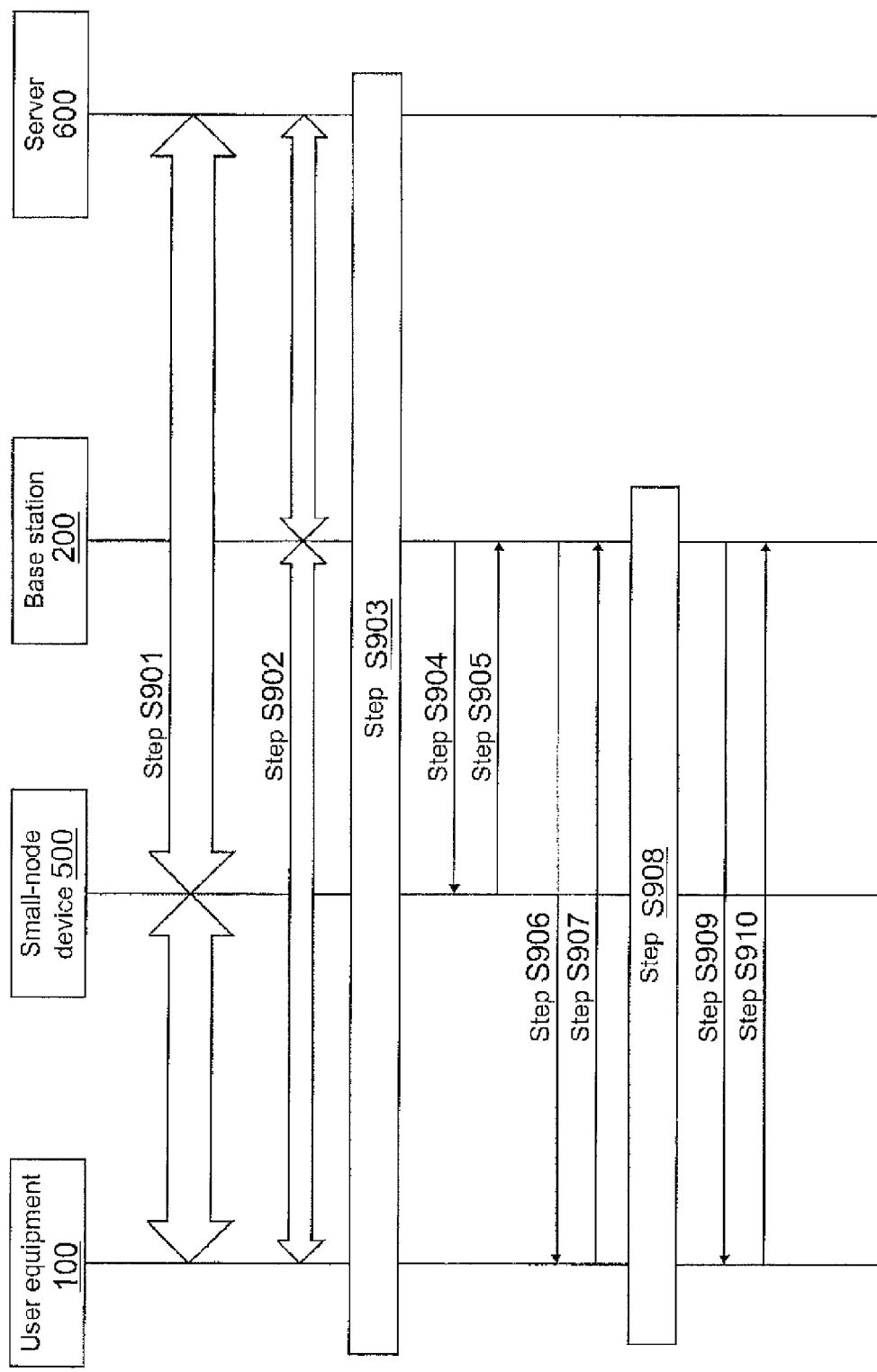
FIG. 15 is a flow diagram for the release of a D2UE connection.

Base station 200 not only controls the establishment of D2UE connection 710, it may also control the release of this link as shown in FIG. 15. In a step S901, some parts of the traffic data are transferred between user equipment 100 and server 600 via D2UE connection 710 and small-node device 500. In a step S902, some parts of the traffic data are transferred between user equipment 100 and server 600 via BS2UE connection 720 and base station 200. Steps S901 and S902 may be the same as steps S805 and S806, respectively, i.e. steps S901 and S902 may be a continuation of steps S805 and S806.

In a step S903, there is no more traffic data to be transferred between the user equipment 100 and the server 600. More specifically, step S903 may correspond to the end of sending/receiving e-mails, browsing web sites, downloading files, uploading files and the like.

In a step S904, base station 200 transmits control signaling to small-node device 500 and notifies small-node device 500 that D2UE connection 710 should be released. In a step S905, small-node device 500 transmits acknowledgement of the notification of step S904.

In a step S906, base station 200 transmits control signaling to user equipment 100 and notifies user equipment 100 that D2UE connection 710 should be released. In a step S907, user equipment 100 transmits acknowledgement of the notification of step S906. Steps S906 and S907 may be conducted before steps S904 and S905. Alternatively, steps S906 and S907 may be conducted simultaneously with steps S904 and S905.

Responsive to the control signaling in steps S904 and S906, D2UE connection 710 is released in a step S908. Steps S905 and S907 may be conducted after step S908 so that user equipment 100 or small-node device 500 can report that D2UE connection 710 is released.

In a step S909, base station 200 transmits control signaling to user equipment 100 and notifies user equipment 100 that BS2UE connection 720 is released. In a step S910, user equipment 100 transmits acknowledgement of the control signaling of step S909 to base station 200. Steps S909 and S910 correspond to normal procedures to release an LTE connection.

In the embodiment described in FIG. 15, base station 200 transmits control signaling to command a release of D2UE connection 710. However, in alternative embodiments, user equipment 100 or small-node device 500 may transmit the control signaling.

The process shown in FIG. 15 may be described in terms of the operations performed by small-node device 500 as follows. These operations comprise transferring some parts of data (which are transferred between user equipment 100 and server 600) using D2UE connection 710 (step S901), receiving the control signaling transmitted by base station 200 (step S904), transmitting the acknowledgement of the control signaling to base station 200 (step S905) and releasing D2UE connection 710 with user equipment 100 (step S908).

The process shown in FIG. 15 may be described in terms of the operations performed by user equipment 100 as follows. These operations comprise transferring some parts of data (which are transferred between user equipment 100 and server 600) via D2UE connection 710 and small-node device 500 (step S901), transferring some parts of data (which are transferred between user equipment 100 and server 600) via BS2UE connection 720 and base station 200 (step S902), receiving the control signaling transmitted by base station 200 (step S906), transmitting the acknowledgement of the control signaling to base station 200 (step S907), releasing the D2UE connection 710 with user equipment 100 (step S908), and releasing the LTE connection (BS2UE connection 720) in steps S909 and S910.

The process shown in FIG. 15 may be described in terms of the operations performed by base station 200 as follows. These operations comprise transmitting to small-node device 500 control signaling for releasing D2UE connection 710 (step S904), transmitting to user equipment 100 control signaling for releasing D2UE connection 710 (step S906), and releasing BS2UE connection 720 (steps S909 and S910).

Figure 16:
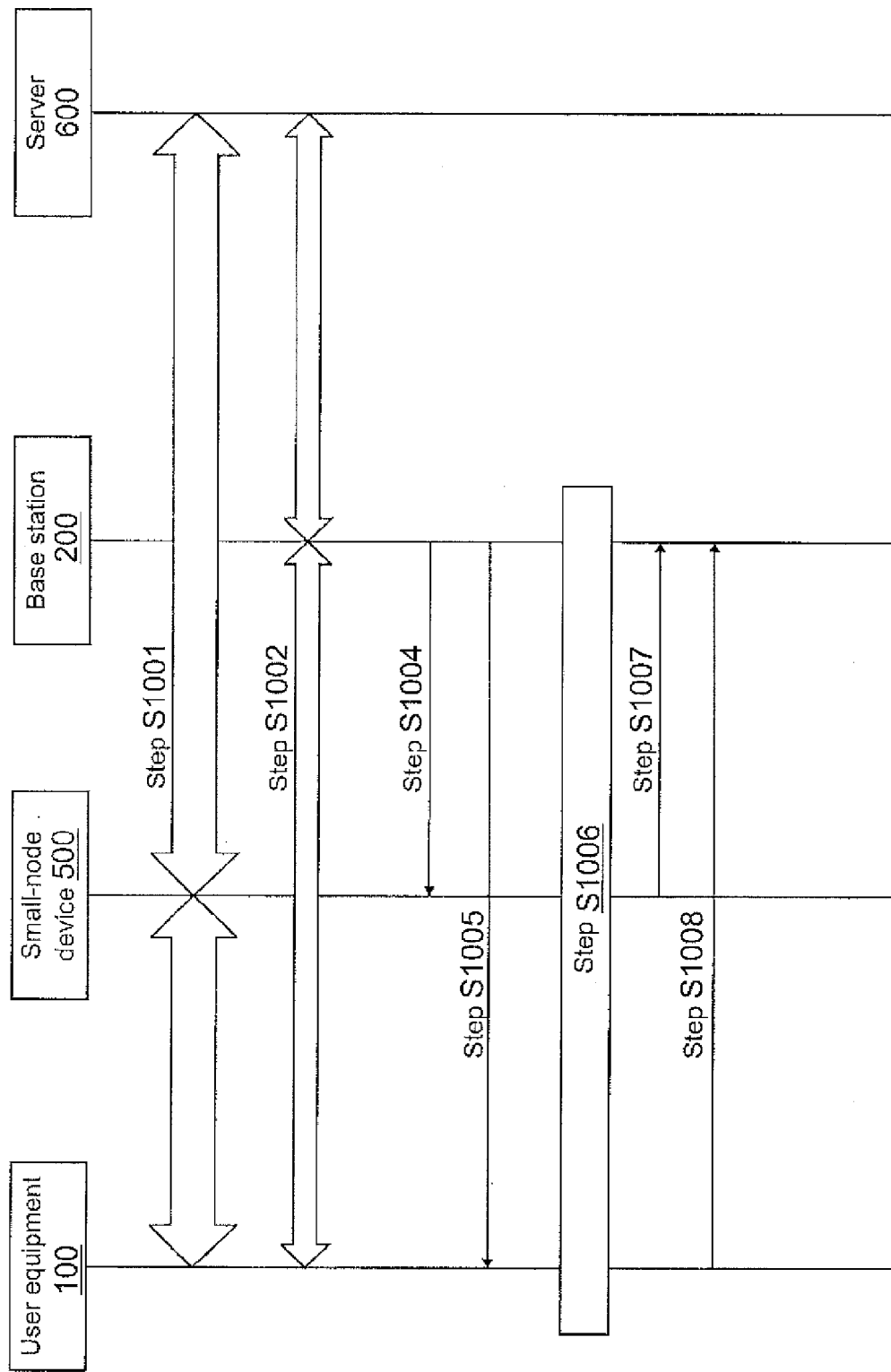
FIG. 16 is a flow diagram for the reconfiguration of a D2UE link.

In addition to controlling the establishment and release of the D2UE link, the base station may also control its reconfiguration as shown in FIG. 16. In a step S1001, some parts of the traffic data are transferred between user equipment 100 and server 600 via D2UE connection 710 and small-node device 500. In a step S1002, some parts of the traffic data are transferred between user equipment 100 and server 600 via BS2UE connection 720 and base station 200. Steps S1001 and S1002 may be the same as steps S805 and S806, respectively, i.e. steps S1001 and S1002 may be a continuation of steps S805 and S806.

In a step S1004, base station 200 transmits control signaling to small-node device 500 and notifies small-node device 500 that D2UE connection 710 should be reconfigured. In a step S1005, base station 200 transmits control signaling to user equipment 100 and notifies user equipment 100 that D2UE connection 710 should be reconfigured. More specifically, the parameters described for the A804c may be included in the control signaling for step 1004 or step S1005.

In a step S1006, D2UE connection 710 is re-configured. More specifically, some of the parameters for D2UE connection 710 are changed. The parameters may include at least one of parameters for a frequency domain resource, parameters for a time domain resource, parameters for a code domain resource, parameters for pilot signals for D2UE connection 710, parameters for initial access for D2UE connection 710, parameters for the radio bearers, and parameters for the power control for D2UE connection 710. The parameters for the power control include the information on the maximum transmission output power for DL or UL in D2UE connection 710.

In a step S1007, small-node device 500 transmits control signaling to base station 200 and notifies base station 200 that D2UE connection 710 has successfully been reconfigured. In a step S1008, user equipment 100 transmits control signaling to base station 200 and notifies base station 200 that D2UE connection 710 has successfully been reconfigured.

The process shown in FIG. 16 may be described in terms of the operations in small-node device 500 as follows. These operations comprise transferring some parts of data, which are transferred between user equipment 100 and server 600, using D2UE connection 710 (step S1001), receiving control signaling to reconfigure D2UE connection 710 (step S1004), reconfiguring D2UE connection 710 (step S1006), and transmitting control signaling to report that D2UE connection 710 has been reconfigured (step S1008).

The process shown in FIG. 16 may be described in terms of the operations in user equipment 100 as follows. These operations comprise transferring some parts of data, which are transferred between user equipment 100 and server 600, using D2UE connection 710 (step S1001), transferring some parts of data, which are transferred between user equipment 100 and server 600, using BS2UE connection 720 (step S1002), receiving control signaling to reconfigure D2UE connection 710 (step S1005), reconfiguring D2UE connection 710 (step S1006), and transmitting control signaling to report that D2UE connection 710 has been reconfigured (step S1008).

The process shown in FIG. 16 may be described in terms of the operations in base station 200 as follows. These operations comprise transferring some parts of data, which are transferred between user equipment 100 and server 600, using BS2UE connection 720 (step S1002), transmitting to small-node device 500 control signaling to reconfigure D2UE connection 710 (step S1003), transmitting to user equipment 100 control signaling to reconfigure D2UE connection 710 (step S1004), receiving control signaling to report that D2UE connection 710 has been reconfigured (step S1007), and receiving control signaling to report that D2UE connection 710 has been reconfigured (step S1008).

Figure 17:
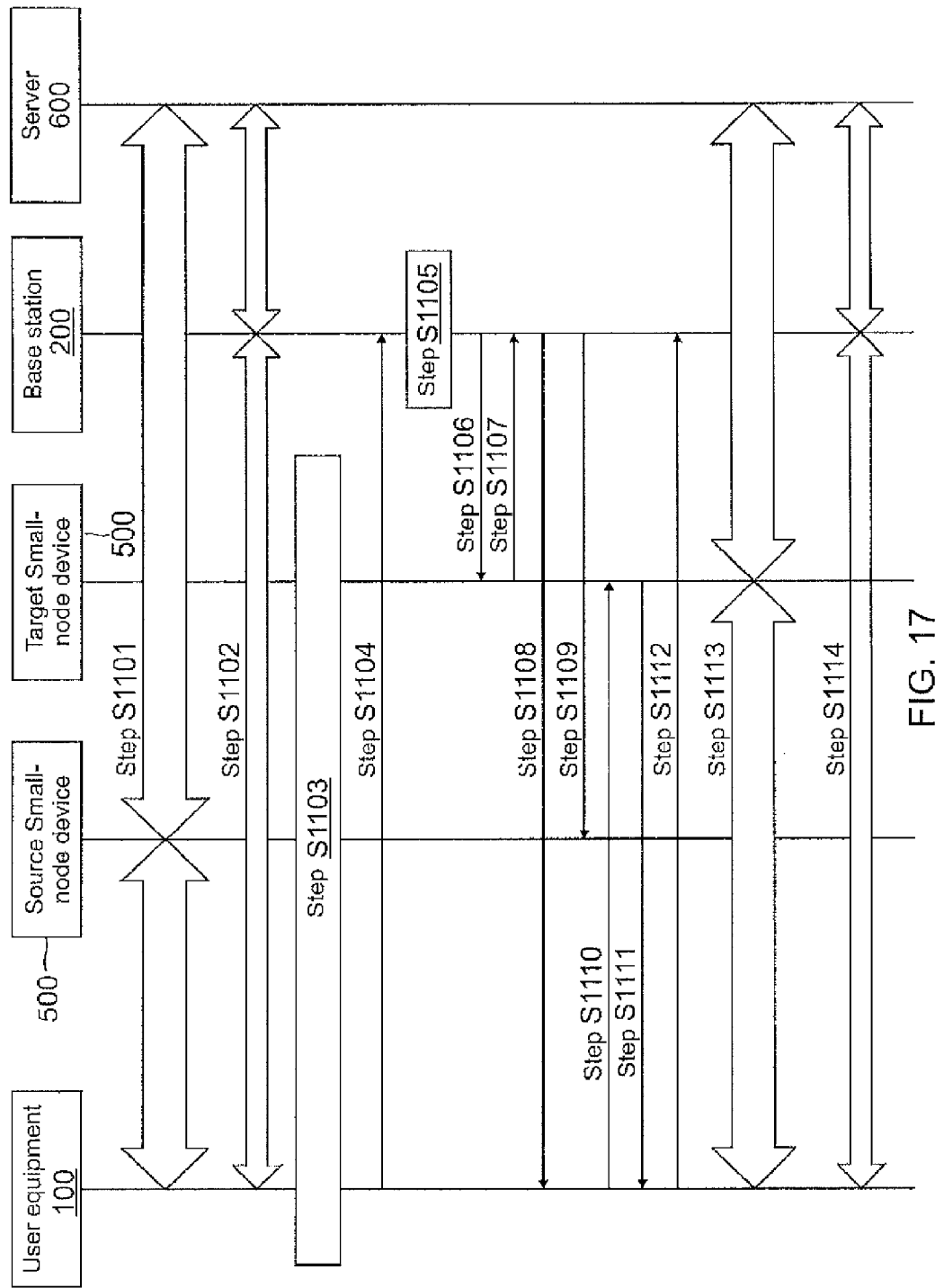
FIG. 17 is a flow diagram for a D2UE link handover.
Figure 17A:
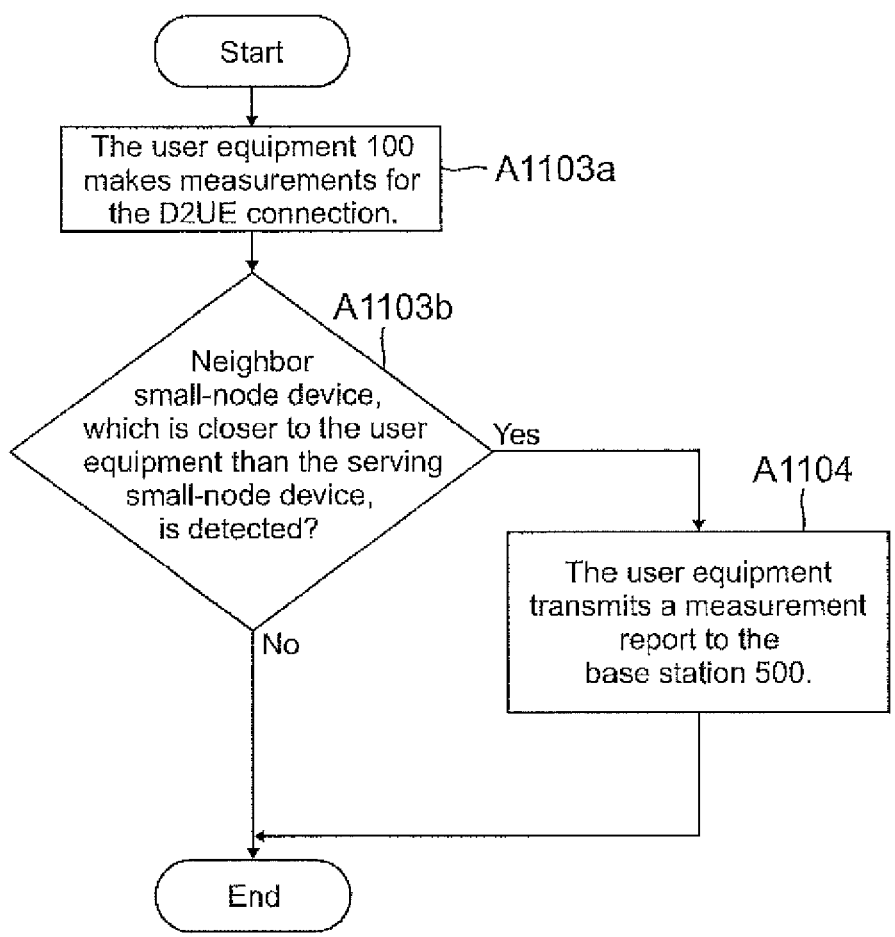
FIG. 17A is a flowchart for a user equipment measurement technique to detect the presence of closer neighbor small-node devices.

In addition to controlling the establishment, release, and reconfiguration of a D2UE link, the base station may also control the handoff of the D2UE link from the currently-serving small-node device to a closer small-node device as shown in FIGS. 17 and 17A. In a step S1101 of FIG. 17, some parts of the traffic data are transferred between user equipment 100 and server 600 via D2UE connection 710 and source small-node device 500. In a step S1102, some parts of the traffic data are transferred between user equipment 100 and server 600 via BS2UE connection 720 and base station 200. Steps S1101 and S1102 may be the same as steps S805 and S806, respectively, i.e. steps S1101 and S1102 may be a continuation of steps S805 and S806.

In a step S1103, user equipment 100 makes measurements for the D2UE connection, as discussed herein. That is, user equipment 100 makes measurements for the DL radio link quality of the serving small-node device and the neighbor small-node device. The DL radio link quality may be at least one of pilot signal received power, path loss, signal-to-interference ratio (SIR), channel state information, channel quality indicator, received signal strength indicator, and the like.

More specifically, user equipment 100 determines whether or not a neighbor small-node device, which is closer to the user equipment 100 than the serving small-node device, is detected and transmits to the base station a measurement report if the neighbor small-node device is detected as illustrated in the flowchart of FIG. 17A. User equipment 100 makes measurements for the D2UE connection in a step A1103a.

In a step A1103b, user equipment 100 determines whether or not a neighbor small-node device, which is closer to the user equipment than the serving small-node device, is detected. The serving small-node device means the small-node device (a source small-node device), which is currently communicating with the user equipment. More specifically, if the radio link quality of the neighbor small-node device is higher than that of the serving small-node device, it may be determined that the neighbor small-node device is closer to the user equipment than the serving small-node device.

If the neighbor small-node device is closer to the user equipment than the serving small-node device (step A1103b: YES), the user equipment transmits a measurement report to the base station so as to notify the base station that the neighbor small-node device is detected in a step A1104. Step A1104 of FIG. 17A thus corresponds to step S1104 in FIG. 17.

If the neighbor small-node device is not closer to the user equipment than the serving small-node device (step A1103b: NO), the user equipment does not transmits the measurement report to the base station. Steps A1103a and A1103b of FIG. 17A correspond to step S1103 in FIG. 17.

Referring again to FIG. 17, the user equipment transmits a measurement report to the base station in a step S1104 so as to notify it that a closer neighbor small-node device is detected. Hereinafter, the serving small-node device is denoted as a "Source small-node device" and the neighbor small-node device is denoted as a "Target small-node device."

The base station makes a decision that the user equipment should handover to the neighbor small-node device (the target small-node device) in a step S1105.

In a step S1106, the base station transmits control signaling to the target small-node device for handover preparation. The control signaling may be called "handover request for D2UE connection." More specifically, the base station notifies the target small-node device of parameters for it to establish the D2UE connection with the user equipment. The parameters discussed with regard to step A804a (FIG. 14A) may be included in the control signaling of step S1106.

In a step S1107, the target small-node device transmits acknowledgement of the control signaling of step S1106.

In a step S1108, the base station 200 transmits control signaling to the user equipment and orders for the user equipment to make handover to the target small-node device. The control signaling may include connection information for D2UE connection 710. More specifically, the connection information may include at least one of information on measurement configuration for D2UE connection 710, information on mobility control for D2UE connection 710, radio resource control information for D2UE connection 710, and the like.

Furthermore, the radio resource control information for D2UE connection 710 may include at least one of radio bearer information for D2UE connection 710, information for PDCP layer configuration in D2UE connection 710, information for RLC layer configuration in D2UE connection 710, information for MAC layer configuration in D2UE connection 710, information for physical layer configuration in D2UE connection 710, and the like. More specifically, the parameters described for step A804c (FIG. 14A) may be included in the radio resource control information for D2UE connection 710.

In a step S1109, base station 200 transmits control signaling to the source small-node device 500 and notifies it that user equipment 100 should make handover to the target small-node device. Source small-node device 500 ends the communications with user equipment 100 based on the control signaling, i.e. the source small-node device releases D2UE connection 710.

In a step S1110, the user equipment transmits control signaling to establish a connection between the user equipment and the target small-node device. The control signaling may be a random access signaling and may be the same as the one in step A804c.

In a step S1111, the target small-node device 500 transmits acknowledgement of the control signaling transmitted in step S1110. As a result, the D2UE connection can be established between user equipment 100 and the target small-node device.

In a step S1112, the user equipment transmits control signaling to the base station and notifies the base station that the handover to the target small-node device has been successfully conducted.

In the steps S1113, some parts of the traffic data are transferred between user equipment 100 and server 600 via D2UE connection 710 and target small-node device 500.

In a step S1114, some parts of the traffic data are transferred between user equipment 100 and server 600 via BS2UE connection 720 and base station 200. Step S1114 is the same as step S1102. That is, step (S1102 and S1114) may be continuously conducted during the procedures described in FIG. 17.

The process shown in FIG. 17 may be described in terms of the operations in source small-node device 500 as follows. These operations comprise transferring some parts of data, which are transferred between user equipment 100 and server 600, using D2UE connection 710 (step S1101), receiving control signaling to notify source small-node device 500 that the user equipment should make handover to the target small-node device, and ending D2UE connection 710 with user equipment 100 (step S1109).

The process shown in FIG. 17 may be described in terms of the operations in target source small-node device 500 as follows. These operations comprise receiving control signaling for handover preparation, which is transmitted by the base station (step S1106), transmitting acknowledgement of the control signaling (step S1107), receiving control signaling to establish a connection between the user equipment and the target small-node device (step S1110), transmitting acknowledgement of the control signaling (step S1111), and transferring some parts of data, which are transferred between the user equipment and the server, using D2UE connection 710 (step S1113).

The process shown in FIG. 17 may be described in terms of the operations in user equipment 100 as follows. These operations comprise transferring some parts of data, which are transferred between the user equipment and server 600, using D2UE connection 710 with the source small-node device (step S1101), transferring some parts of data, which are transferred between the user equipment and server 600, using BS2UE connection 720 (step 1102), making measurements for the D2UE connection (step S1103), transmitting a measurement report to the base station (step S1104), receiving control signaling which orders the user equipment to make handover to the target small-node device (step S1108), transmitting control signaling to establish a connection between the user equipment and the target small-node device (step S1110), receiving acknowledgement of the control signaling (step S1111), transmitting control signaling to the base station to notify the base station that the handover to the target small-node device has been successfully conducted (step S1112), transferring some parts of data, which are transferred between the user equipment and server 600, using D2UE connection 710 with the target small-node device (step S1113), and transferring some parts of data, which are transferred between the user equipment and server 600, using BS2UE connection 720 (step S1114). It is noted that step S1102 is the same as step S1114, and this procedure may be continuously conducted during all the steps.

The process shown in FIG. 17 may be described in terms of the operations in base station 200 as follows. These operations comprise transferring some parts of data, which are transferred between the user equipment and server 600, using BS2UE connection 720 (step S1002), receiving a measurement report transmitted by the user equipment 100 (step S1104), making a decision that the user equipment should handover to the target small-node device (step S1105), transmitting control signaling to the target small-node device for handover preparation (step S1106), receiving acknowledgement of the control signaling (step S1107), transmitting control signaling to the user equipment to order for the user equipment to make handover to the target small-node device (step S1108), transmitting control signaling to the source small-node device to notify it that the user equipment should make handover to the target small-node device (step S1109), receiving control signaling to notify the base station that the handover to the target small-node device has been successfully conducted (step S1112), and transferring some parts of data, which are transferred between the user equipment and server 600, using BS2UE connection 720 (step S1114).

Additional details for both Architecture 1 and Architecture 2 are discussed in the PCT applications incorporated by reference herein. It can be seen from the preceding discussion that the principal difference between the two architectures lies solely in the link that the small-node device has with the base station. In Architecture 2, this link is a modified X2 interface. Note that a conventional LTE X2 interface is a peer-to-peer interface. Thus, the modification for the X2 interface discussed herein is that of a master-slave relationship between the base station and the small-node device. In contrast, if this link is changed such as to an LTE link, then the network becomes an Architecture 1 network. But the D2UE link is the same in both architectures. Similarly, a Macro2UE link (Architecture 1) is the same as a BS2UE link (Architecture 2). Thus, as used herein, a "small-node device" is synonymous with an "advanced user equipment" unless the BS2D link is a modified X2 interface.

A Half-Duplex FDD Radio Resource Allocation for the D2UE Link

Figure 18:
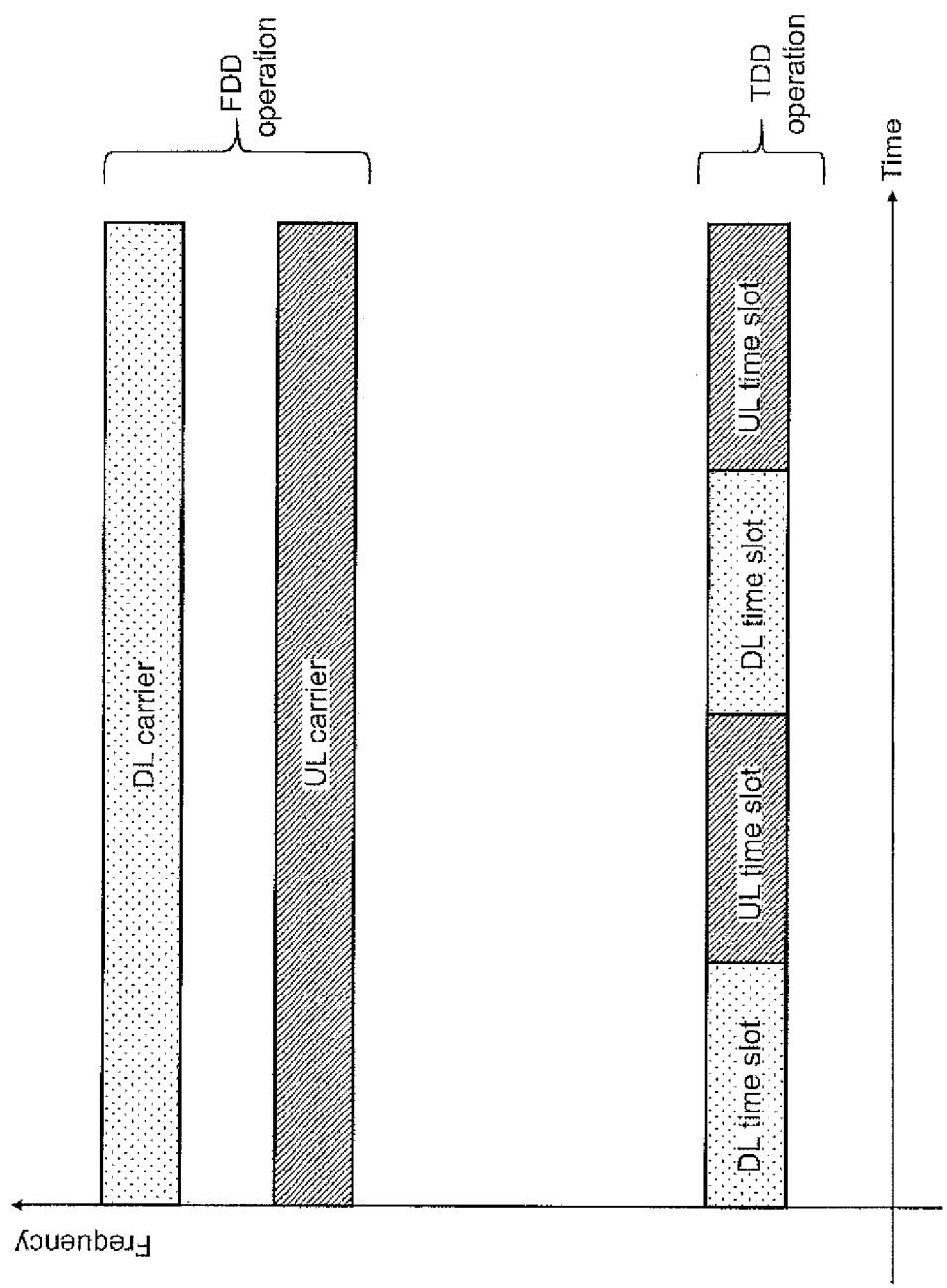
FIG. 18 illustrates the spectrum for TDD and FDD signals.

Regardless of whether Architecture 1 or 2 is implemented, the following discussion will focus on a particularly advantageous radio resource assignment or allocation for the D2UE link. The advantages of this radio resource assignment may be enjoyed by either an Architecture 1 or Architecture 2 network. Some background discussion is helpful to better appreciate this advantageous resource assignment. In that regard, there are two kinds of duplex modes that are utilized in conventional cellular networks. FIG. 18 illustrates these two duplex modes. One is Frequency Division Duplex (FDD) and the other is Time Division Duplex (TDD. In FDD, two carriers of different frequency are used. One carrier is used for DL and the other is used for UL. In TDD, however, both UL and DL share the same carrier but in different time slots. One set of time slots is used for DL (DL time slots), and a remaining set is used for UL (UL time slots).

Figure 19:
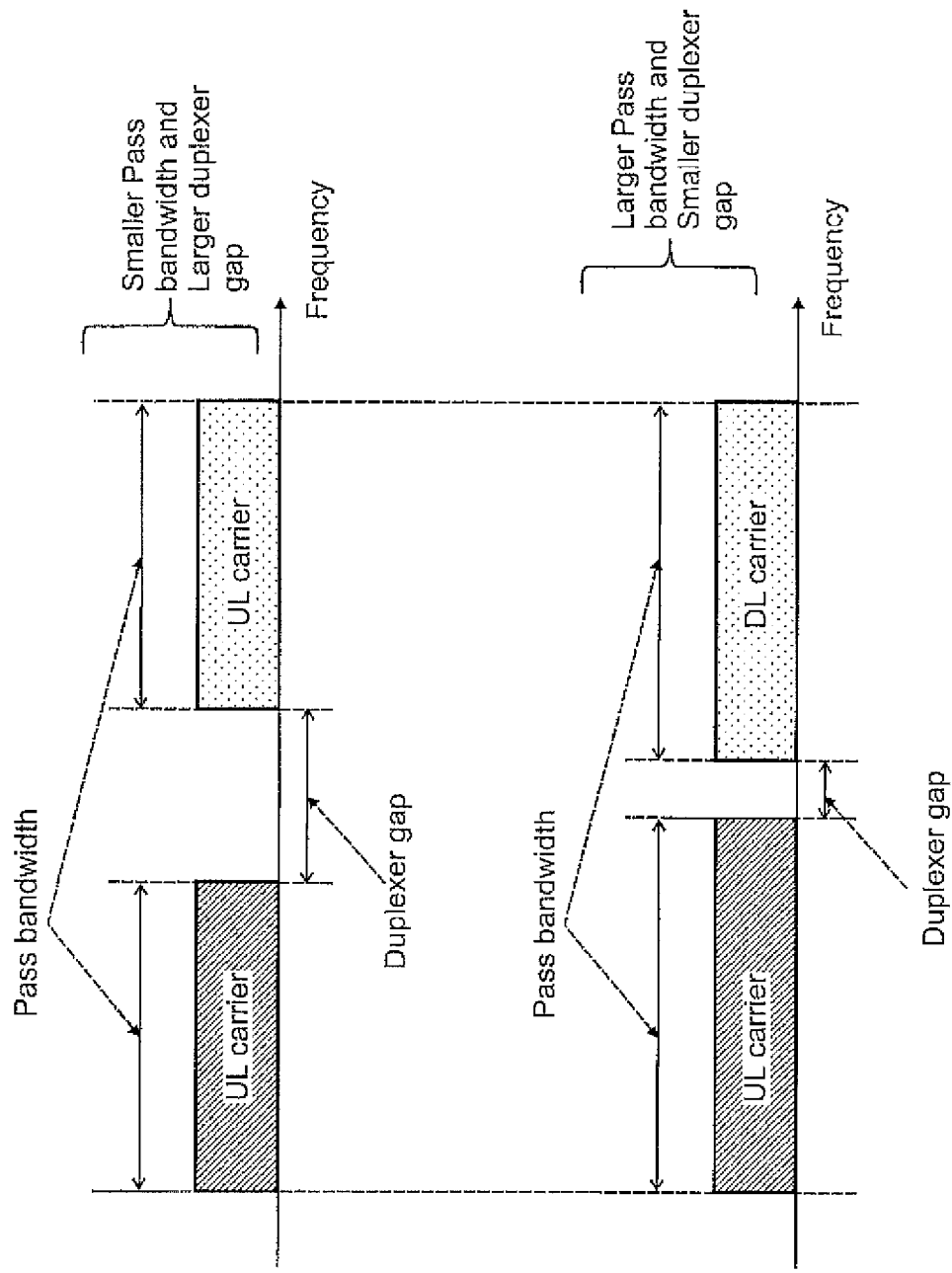
FIG. 19 illustrates the spectrums for D2UE links each having an FDD radio resource allocation but having different pass bandwidths and guard bands.

Should the radio resource assignment in the D2UE link be an FDD assignment, the small-node device may require a duplexer. But if D2UE carriers are in high frequency bands, such as 3.5 GHz, the duplexer design becomes challenging. These challenges are heightened if the duplexer must realize a large pass bandwidth and a small duplexer gap such as described in R4-111298. As the pass bandwidth is increased and the duplexer gap (the gap between UL and DL) is decreased, the frequency range which the duplexer supports increases. Thus, a duplexer with a large pass bandwidth but a small duplexer gap can be utilized in more regions and/or countries, as illustrated in FIG. 19. In general, if a duplexer may be globally used, the cost of the duplexer is reduced due to mass production. In other words, if a duplexer is used only in some specific regions/countries, the number of duplexers needed to be produced is not large, and therefore the duplexer cost increases. Since frequency carrier assignments highly depend on the duplexer in FDD, there is a possibility that frequency carrier assignment flexibility may be degraded when such a common duplexer in FDD is used in order to reduce the duplexer cost. In other words, since one common duplexer needs to be used in all the areas and/or countries, the flexibility of frequency carrier assignments may decrease in FDD operations. In short, it is problematic if a design requires a common duplexer which can provide good frequency carrier assignment flexibility for many regions/countries.

Figure 20:
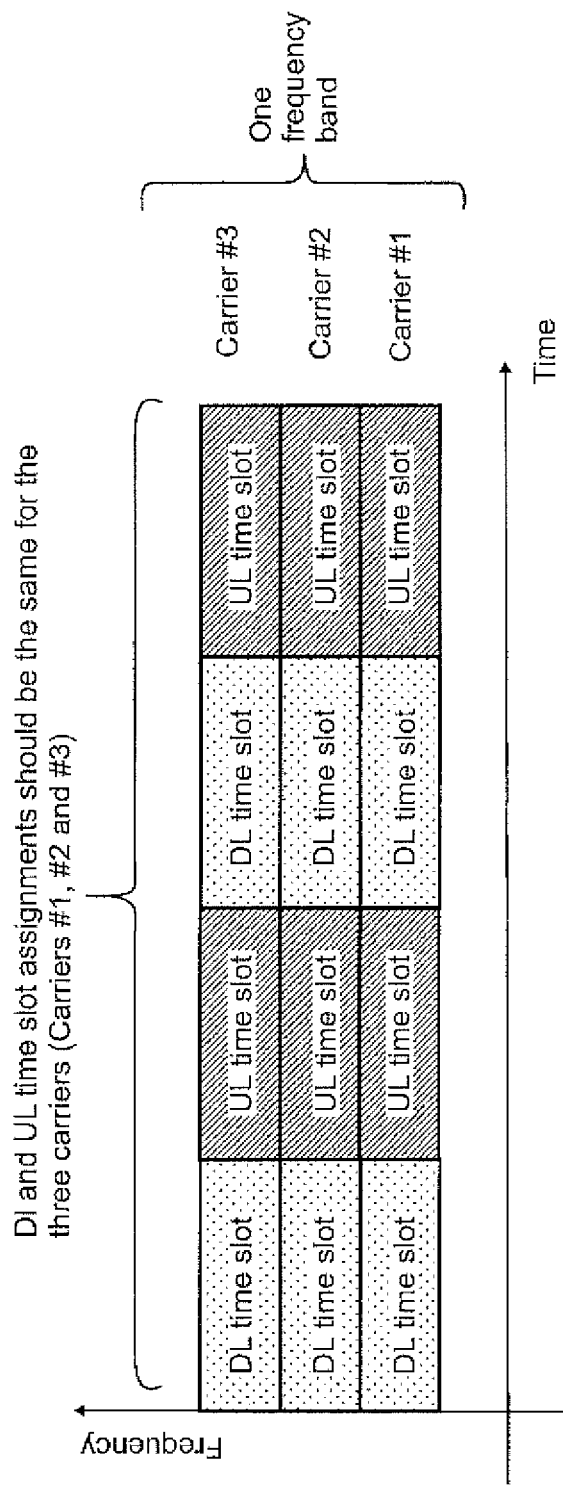
FIG. 20 illustrates alternating DL and UL transmissions in D2UE links having a TDD radio resource allocation with regard to several carriers so as to minimize inter-carrier interference.
Figure 21:
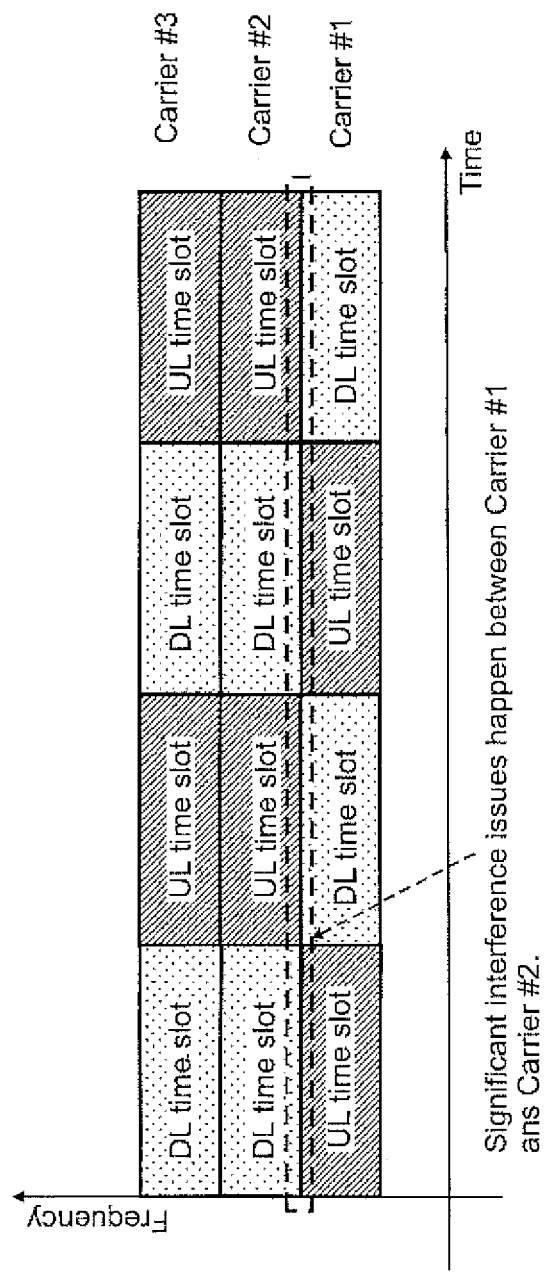
FIG. 21 illustrates conflicting DL and UL transmissions in D2UE links with TDD radio resource allocation over several carriers.

In contrast to FDD operation, a duplexer may not be required if the radio resource assignment for the D2UE link is TDD. Therefore, globally-common radio frequency components can be readily achieved in a TDD design. In particular, flexible frequency carrier assignments can be achieved using TDD, because TDD does not need pair bands (pair carriers). But TDD requires time synchronization as shown in FIG. 20. The DL and UL time slot assignments should be synchronized for all the carriers in one frequency band and in one geographical area. If DL and UL time slots assignments are not synchronized, significant interference issues may occur when the UL and DL carriers are close in frequency as illustrated in FIG. 21.

Figure 22:
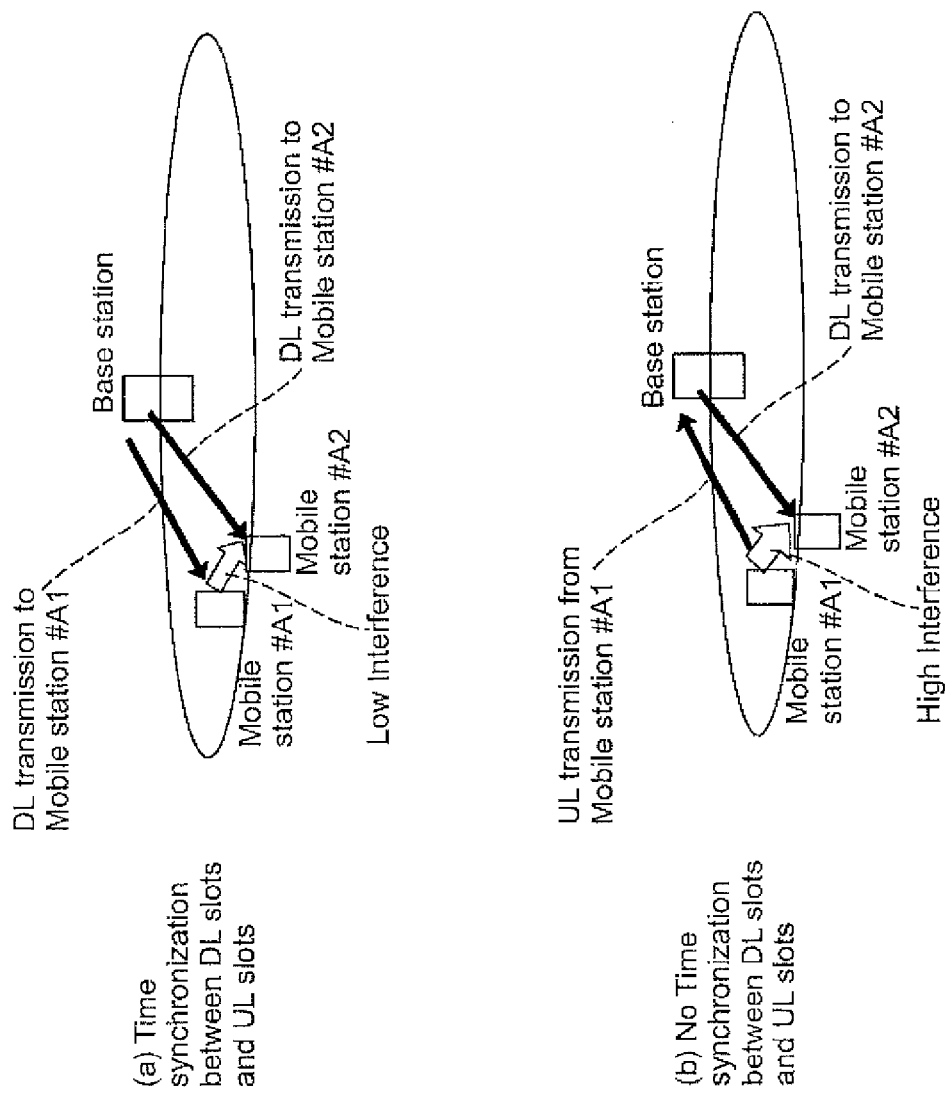
FIG. 22(*a*) illustrates a network having the minimized inter-carrier interference discussed with regard to FIG. 20.

The TDD interference issues are explained further with reference to FIGS. 22a and 22b. In FIG. 22 (a), time synchronization is achieved between the DL time slots and the UL time slots. The UL carriers are close in frequency and as discussed with regard to FIG. 21. Similarly, the DL carriers are also close in frequency. In this example, the received DL power for mobile station #A1 is −100 dBm whereas the received DL power for mobile station #A2 is −102 dBm. Since adjacent channel interference power is reduced by approximately 30 dB, the DL interference power received by mobile station #A2 is −130 dBm. Thus, the signals in the DL transmission to mobile station #A1 do not interfere with signals in the DL transmission to mobile station #A2. Similarly, there is no significant interference to mobile station #A1 from the DL transmissions to mobile station #A2.

In FIG. 22 (b), however, time synchronization is not achieved between the DL time slots and the UL time slots. The DL and UL carriers are also close in frequency as discussed with regard to FIG. 21. Thus, a DL transmission to mobile station #A2 occurs in the same time slot for an UL transmission from mobile station #A1. In this example, the transmitted power for mobile station #A1 is 0 dBm, and the received power for mobile station #A2 is −102 dBm. If the adjacent channel interference power is reduced by approximately 30 dB, the interference power at mobile station #A2 from mobile station #A1's UL transmission is −30 dBm, which is much higher than −102 dBm. Even if additional path loss is taken into account for the interference calculation, the interference power is still high. Thus, if time synchronization is not achieved in the D2DUE link using TDD, significant interference may result.

Time synchronization in a TDD embodiment is thus critical. But such time synchronization increases network costs because some additional technique, such as the use of the accurate clock from a GPS receiver and the like, is required for each network node. Furthermore, the DL and UL time slot assignments are not flexible because the time slot assignments need to be aligned for all the frequency carriers in one frequency band as discussed with regard to FIGS. 20 and 21. For example, suppose that there are two network operators having adjacent frequency carriers. In this case, one operator cannot change the DL and UL time slot assignments if the other does not change them.

To avoid the time synchronization problems associated with a TDD embodiment as well as to avoid the duplexer costs in an FDD embodiment, an advantageous half-duplex FDD radio resource assignment for the D2UE link will now be discussed in greater detail. This half-duplex FDD scheme may be better understood with reference to the example embodiment shown in FIG. 23. In this scheme, the user equipment need not include a duplexer, which advantageously lowers manufacturing cost and complexity. In this half-duplex FDD resource assignment, the UL and DL transmissions must be specified. In other words, a group of frequency resources or subcarriers is reserved for DL whereas a remaining group of frequency resources is reserved for UL.

Figure 23:
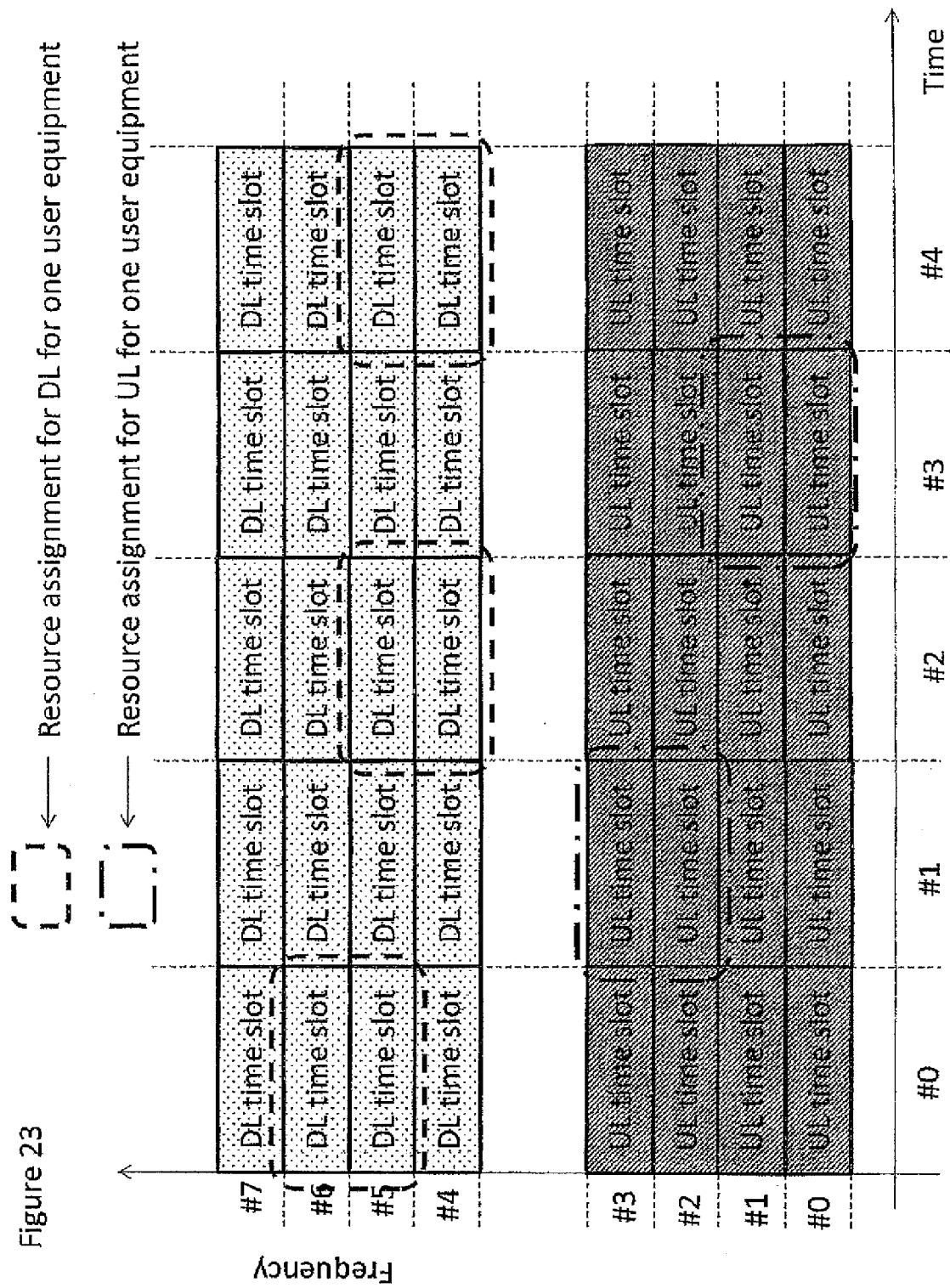
FIG. 23 illustrates the time slot and frequency resource allocation for an example D2UE link with half-duplex FDD radio resource allocation.

In the example of FIG. 23, frequency resources #4, #5, #6, and #7 are reserved for UL whereas frequency resources #0, #1, #2, and #3 are reserved for DL. For any given time slot, a DL transmission is assigned to certain frequency resources with the DL resource group. Similarly, an UL transmission in a given time slot is assigned to particular resources of the UL frequency group. For example, in time slot #0, the DL transmission is carried over frequency resources #5 and #6. But in time slot #2, the Dl transmission is carried over frequency resources #4 and #5. An analogous frequency resource selection occurs for the UL transmissions.

But regardless of the particular resource assignment for a given time slot, the transmissions are always half-duplex. Thus, with regard to a given UE, a time slot is assigned to either DL or UL but not to both. In the example embodiment illustrated in FIG. 23, DL transmissions are assigned to time slots #0, #2 and #4 whereas UL transmissions are assigned to alternating time slots #1 and #3 (the UL and DL assignments corresponding to one user equipment). But such half-duplex assignment is only with regard to a given user equipment. In other words, the DL transmission for one user equipment may occur simultaneously with the UL transmission for another user equipment. In this fashion, network synchronization is not required.

With regard to this FDD assignment, note that the D2UE connection is different from a conventional BS2UE connection, i.e. no common signals/channels, such as channel reference signals, primary synchronization signals, secondary synchronization signals, broadcast channels and the like, may exist in the D2UE connection. Therefore, the radio resource assignments illustrated in FIG. 23 can be easily accommodated by the UE. As a result, the user equipment 100 does not have to have a duplexer. A duplexer is necessary in a full-duplex FDD scheme so as to isolate the transmitter and receiver. But in the half-duplex assignment shown in FIG. 23, no such isolation is necessary. Thus, no duplexer is necessary to isolate the transmitter and receiver. Furthermore, network synchronization is not required due to the presence of a guard band between the DL frequency resource group and the UL frequency resource group as illustrated in FIG. 23.

Not only is there no need for a duplexer but the size and/or position of the guard band between the DL frequency resource group and the UL frequency resource group may be adjusted very flexibly. For example, this gap may be adjusted area by area, country by country, with respect to time, and so on. As a result, the radio communication system can realize more flexible radio resource assignment. For example, if interference has to be mitigated strictly in one region, the guard band size can be set relatively large to eliminate the interference between DL transmissions and UL transmissions. On one hand, if the interference needs to be mitigated to just some lesser extent in other regions, a smaller guard band may be used as compared to the former region. In this way, flexible carrier assignment can be achieved based on the FDD resource assignment in the D2UE link. In contrast, such a flexible change of the guard band size is impossible in a conventional system requiring a duplexer.

The FDD radio resource assignment for the D2UE link will now be discussed in more detail. This radio resource assignment is applicable to both Architecture 1 and Architecture 2 network. Indeed, the D2UE link is the same in both architectures. Thus, the following discussion addresses both an Architecture 2 network (in which the BS2D connection is a modified X2 interface) as well as an Architecture 1 embodiment (such as wherein the BS2D connection is an LTE link). In the following examples, it is assumed that the carrier frequency in the D2UE connection is 3.5 GHz, and that the carrier frequency in the LTE connection (BS2UE connection 720) between the base station and the user equipment is 2 GHz. It is noted that such frequency band assignments are just examples, and other frequency bands can be applicable in other embodiments. It is further noted that the assumption of LTE links should not be considered limiting in that other protocols may be used as discussed above.

Figure 24:
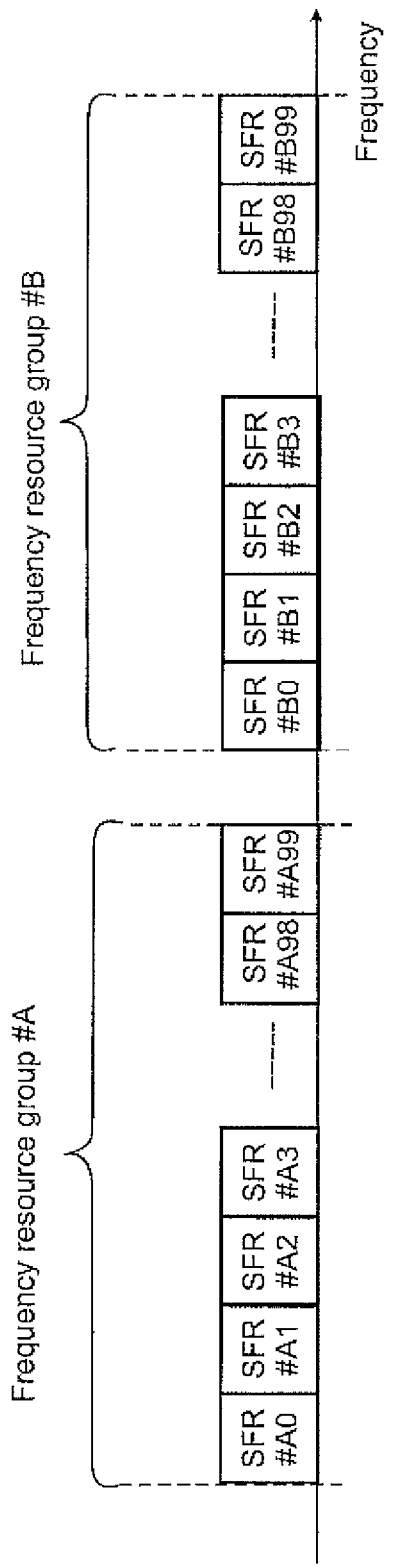
FIG. 24 illustrates the UL and DL frequency resources for the D2UE link of FIG. 23.

An example frequency resource configuration in the D2UE connection is described with reference to FIG. 24, which illustrates two frequency resource groups (#A and #B). Although the number of the frequency resource groups is two in this example, it may be more than two in alternative embodiments. For example, there may be three, four, or even more of the frequency resource groups. A frequency resource group may correspond to one of the E-UTRA Operating bands specified in TS 36.101. More specifically, it may correspond to one of the E-UTRA TDD operating bands. Alternatively, it may correspond to one of the E-UTRA FDD UL operating bands. In yet another alternative, a frequency resource group may correspond to one of the E-UTRA FDD DL operating bands.

Only UL transmission may take place in frequency resource group #A for the D2UE link Conversely, only DL transmission may take place in frequency resource group #B for the D2DUE connection. Furthermore, multiple small frequency resources may be defined in each frequency resource group. For example, one hundred small frequency resources, SFR #A0, SFR #A1, . . . , SFR #A99, are defined in frequency resource group #A, and one hundred small frequency resources, SFR #B0, SFR #B1, . . . , SFR #B99, are defined in frequency resource group #B. It will be appreciated that the number of small frequency resources may vary in alternative embodiments. For example, there may be fifty, twenty-five, or seventy-five small resource groups within each larger frequency resource group. In one embodiment, a small frequency resource may correspond to a resource block in LTE. In that regard, an LTE resource block has 180 kHz of frequency resources. Alternatively, a small frequency resource may correspond to a resource block group, which consists of multiple resource blocks.

Referring back to FIG. 14a (which was discussed in the context of the base station controlling the establishment of the D2UE link), the carrier frequency information of step A804c may identify the carrier frequencies of frequency resource group #A and frequency resource group #B. Two frequency band indicators may thus be included in the control signaling of step A804c as applied to the embodiment shown in FIG. 24. A first indicator identifies frequency resource group #A whereas a second indicator identifies frequency resource group #B. These indicators (or through other control signaling) mays also indicate that frequency resource group #A is used for UL transmissions and that frequency resource group #B is used for DL transmissions.

The radio bearer information in the control signals transmitted to the UE may indicate what kind of radio bearers should be configured for the D2UE connection or what kind of priority should be specified for each radio bearer. At least one of parameters also discussed with regard to step A804c, such as the radio bearer information, the frequency band indicator, the system bandwidth, the identification number, the maximum transmission power, the uplink physical channel information, the downlink physical channel information, the RLC or PDCP configuration, the MAC configuration, the security information, and the like, may be indicated for each carrier. Furthermore, such parameters can be indicated for DL and UL separately.

For the data transmissions in the step A805 of FIG. 14a, radio resource assignments for the D2UE connection are conducted. For example, the small-node device may determine which radio resources should be assigned to the D2UE connection and transmits to the user equipment control signaling to assign the radio resources. The frequency radio resources can be assigned through the identifier of the small frequency resources. In such an embodiment, the small-node device transmits to the user equipment control signaling which indicates identifiers of the small frequency resources. These small frequency resources are then used for the data transmissions in the D2UE connection. As discussed above, the small frequency resources in frequency resource group #A are utilized for UL data transmissions whereas the small frequency resources in frequency resource group #B are utilized for DL data transmissions. Furthermore, within a single D2UE connection, the UL data transmissions do not occur simultaneously with the DL data transmissions.

Figure 25:
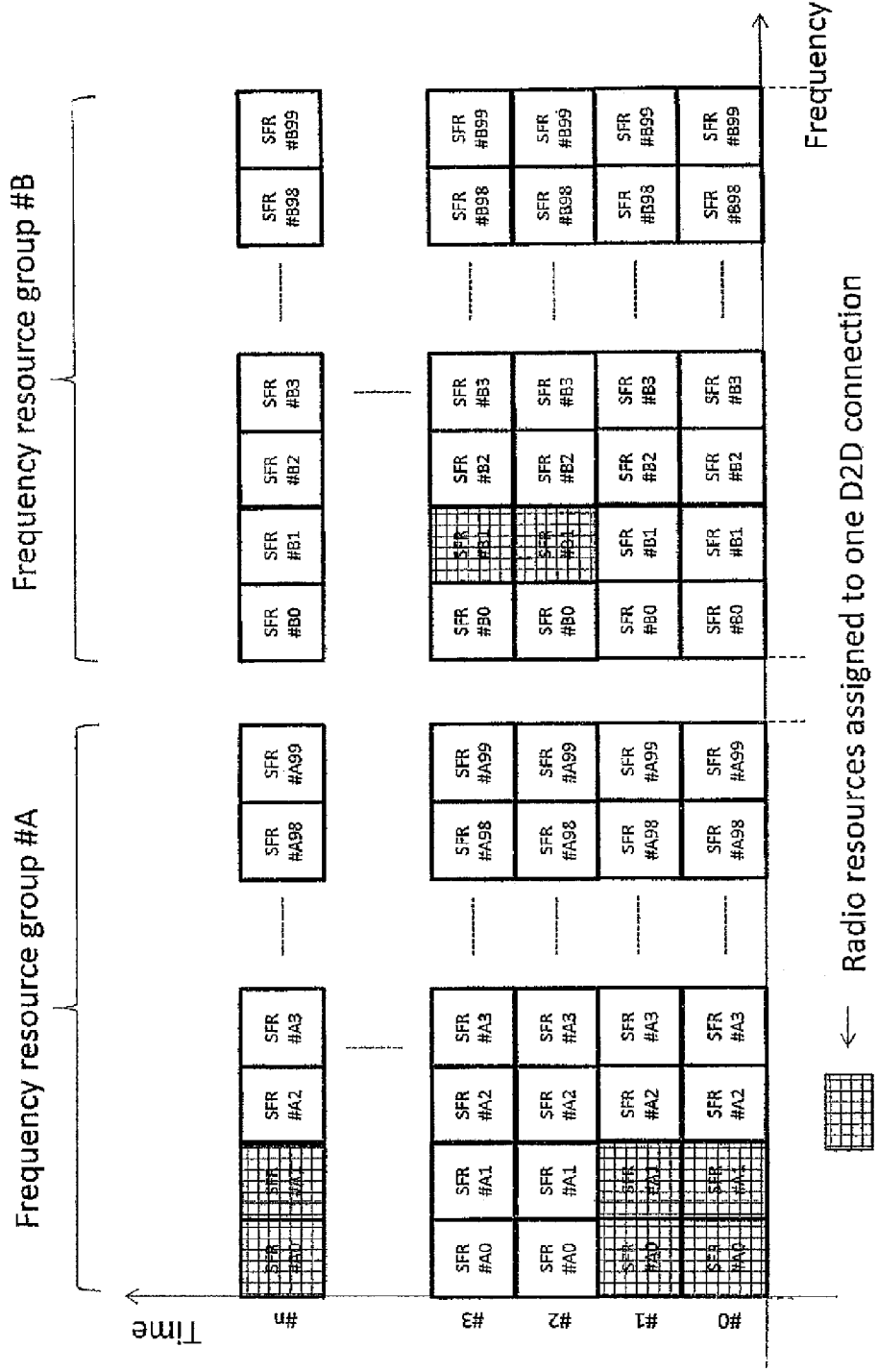
FIG. 25 illustrates the time slot and frequency resource allocation for another example D2UE link with half-duplex FDD radio resource allocation.

FIG. 25 illustrates an example radio resource assignment using two frequency resource groups #A and #B. In this embodiment, the DL and UL transmissions alternate every two time slots. Small frequency resources (SFRs) #A0 and #A1 within frequency group #A are assigned to DL transmissions in the D2UE link. In frequency group #B, SFR #B1 is assigned to UL transmissions in the D2UE link.

Figure 26:
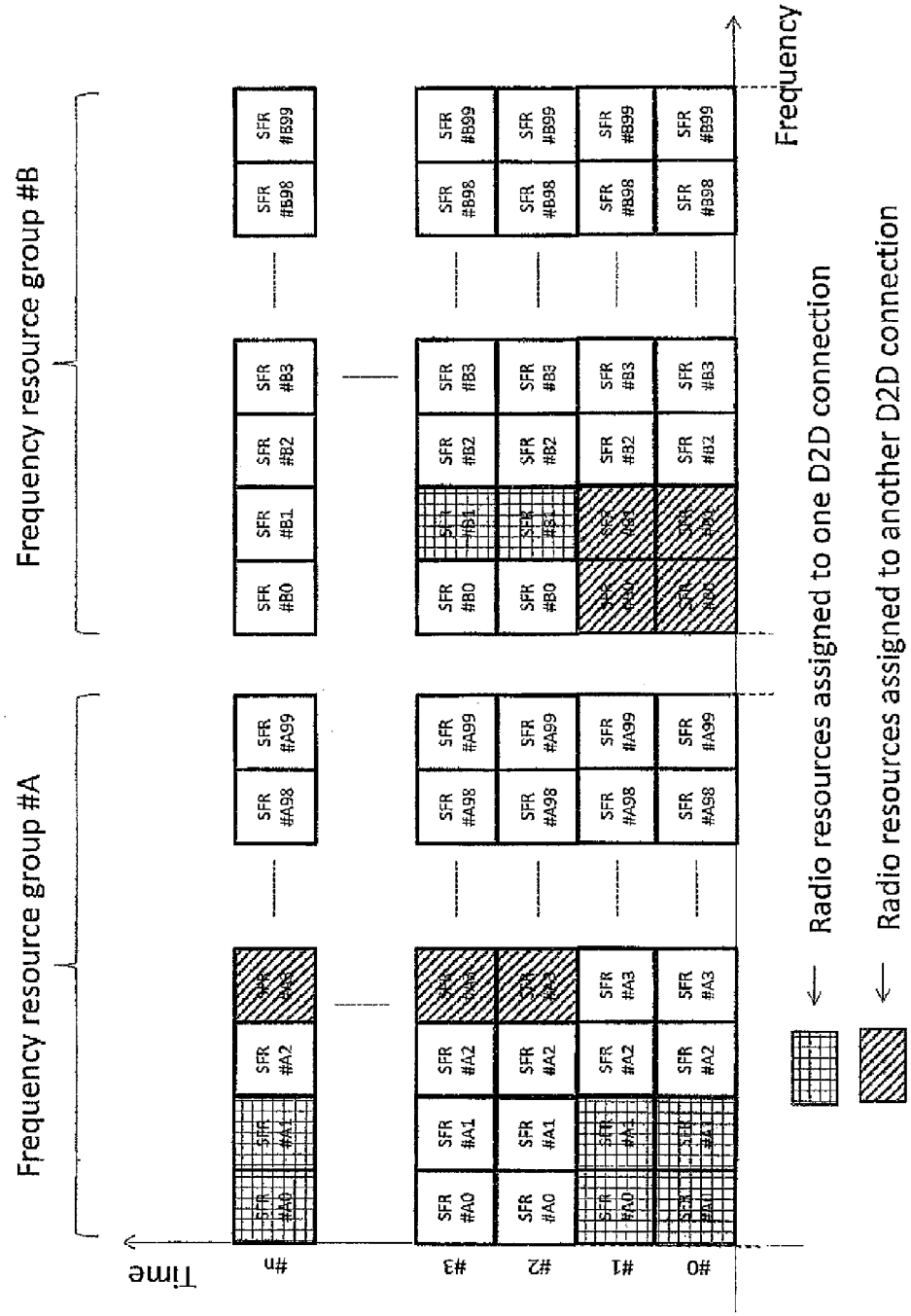
FIG. 26 illustrates the time slot and frequency resource allocation for an example pair of D2UE links each having half-duplex FDD radio resource allocation.

Note, however, that the UL data transmissions for one D2UE connection may occur simultaneously with the DL data transmissions for another D2UE connection. Thus, the radio resource assignments shown in FIG. 25 (which apply to a single D2UE connection) may be supplemented with regard to another D2UE connection assignment as illustrated in FIG. 26. This other D2UE assignment also alternates every two time slot between UL and DL. But in this second D2UE link, SFRs #B0 and B1 are assigned to UL from resource group #B. Similarly, SFR #A3 in frequency group #A is assigned to DL for this second D2UE link. But notice that the DL transmissions for the first D2UE link occur in the same time slots as used by the UL transmission for the second D2UE link. Similarly, the UL transmissions from the first D2UE link occur in the same time slots as the DL transmission for the second D2UE link. The guard band between the UL and DL frequency resource groups ensures that such conflicting transmissions in different D2UE connections do not cause interference with each other. Moreover, no time synchronization between the DL slots and UL slots is needed in each D2UE link.

In the embodiment described above, a half-duplex FDD radio resource assignment is conducted for the UE whereas a full-duplex FDD radio resource assignment is conducted for the small-node device. The small-node device is full-duplex because it accommodates DL data transmissions for one D2UE connection and UL data transmission for another D2UE connection in one time slot as shown in FIG. 26. However, in alternative embodiments, a half-duplex FDD radio resource assignment is conducted for both the UE and the small-node device so that the small-node device does not need a duplexer for the D2UE links.

In one embodiment, the base station (instead of the small-node device or the advanced user equipment) may determine which radio resources should be assigned to the D2UE connection. The base station would then transmit to the user equipment control signaling to assign the radio resources. In such an embodiment, the base station may transmit the control signaling to assign the radio resources to the small-node device as well. The assignment of the radio resource is analogous to that already described with regard to the small-node device.

Referring again to FIG. 13, the identity of frequency resource group #A and frequency resource group #B may be determined in D2UE communication control section 204 within the base station. This information may be transmitted using control signaling to BS2UE communication section 102 within the user equipment (FIG. 12) and also transmitted to BS2D communication section 502 in the small-node device. Within the user equipment, this information may then be transferred to D2UE communication section 104. Similarly, within the small-node device, this information may then be transferred to D2UE communication section 504.

In an embodiment in which the D2UE radio resource assignment is made by the small-node device, D2UE communication section 504 makes such a determination and transmits control signaling to the user equipment to assign the radio resources. With the radio resources thus determined, D2UE communication section 504 in the small-node device communicates with D2UE communication section 104 in the user equipment based on the data carried by frequency resource group #A and frequency resource group #B and based on the control signaling on which radio resources within these groups should be assigned to UL and DL paths.

Figure 27:
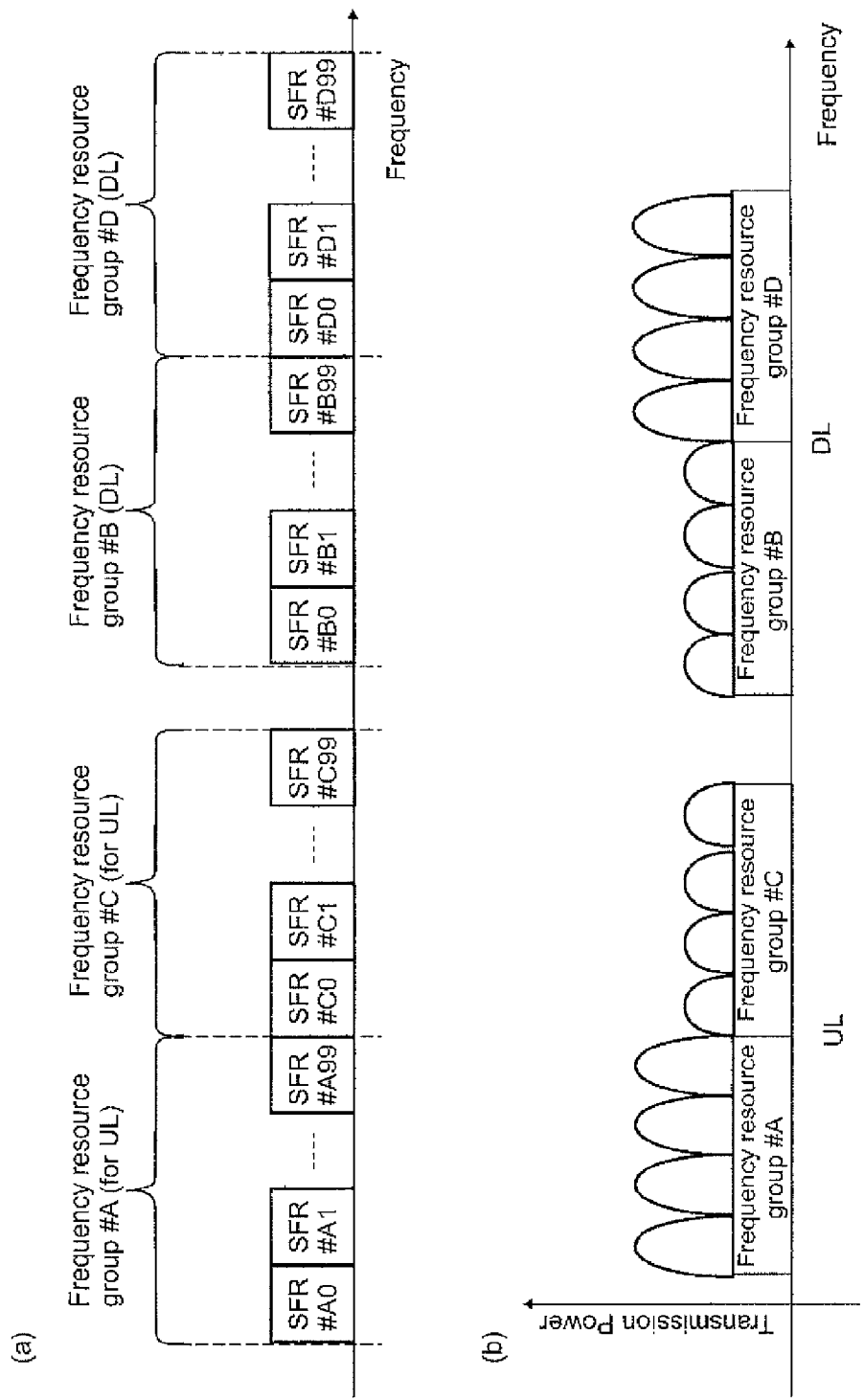
FIG. 27(*a*) illustrates the UL and DL frequency resources for a D2UE link in which four frequency resource groups are used for half-duplex FDD radio resource allocation.
Figure 28:
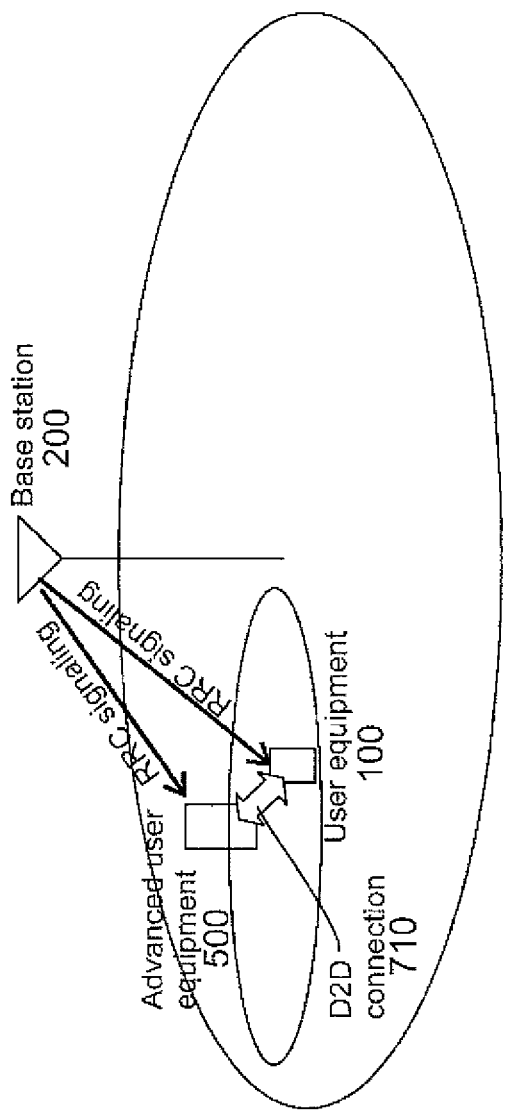
FIG. 28 illustrates a network in which the base station controls the half-duplex FDD radio resource allocation in the D2UE link using RRC signaling.
Figure 29:
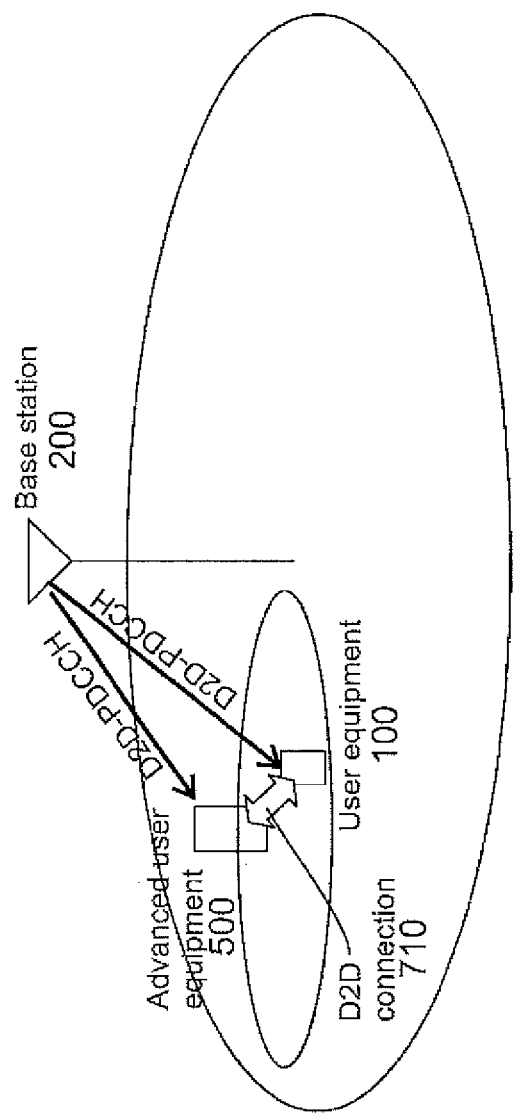
FIG. 29 illustrates a network in which the base station controls the half-duplex FDD radio resource allocation in the D2UE link using a PDDCH signal.
Figure 29A:
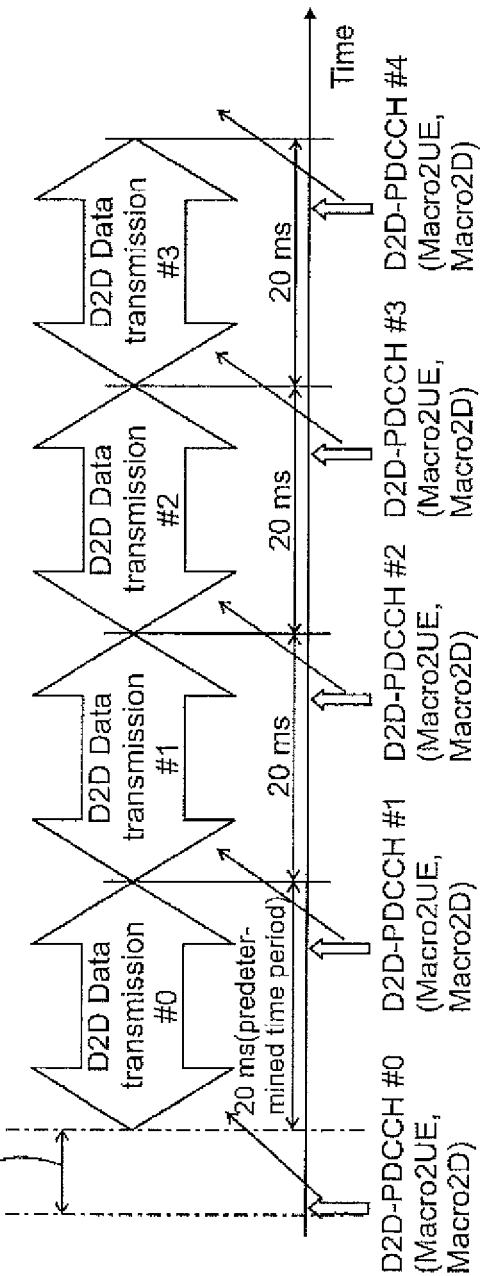
FIG. 29A is a time-domain representation of the D2UE link controlled according to the network of FIG. 29.

With reference to FIGS. 27(*a*) through 30, more examples for the half-duplex FDD radio resource assignments are explained herein. As illustrated in FIG. 28, the base station 200 may assign the radio resources for the D2UE connection by sending RRC signaling to the user equipment and the advanced user equipment/small-node device. In this scenario, the RRC signaling may include the control signaling to assign the frequency groups within the D2UE as discussed above. Alternatively, as illustrated in FIG. 29, the base station may assign the radio resources for the D2UE connection 710 by sending a D2D Physical Downlink Control Channel (PDDCH) signal to the advanced user equipment and to the user equipment. The D2D-PDCCH signal may be transmitted periodically according to a predetermined time period. For example, the predetermined time period may be 20 msec as illustrated in FIG. 29A. In alternative embodiments, the predetermined time period may be a value other than 20 ms such as 40 ms, 80 ms and the like. The D2D-PDCCH signal notifies the user equipment and the advanced user equipment of the radio resource for a D2UE data transmission time duration following the sub-frame when the D2D-PDCCH signal is transmitted as illustrated in FIG. 29A. For example, a D2D-PDCCH #0 signal assigns the radio resources for the D2UE data transmission in a time period #0, a D2D-PDCCH #1 signal assigns the radio resources for the D2UE data transmission in a time period #1, and so on.

Figure 30:
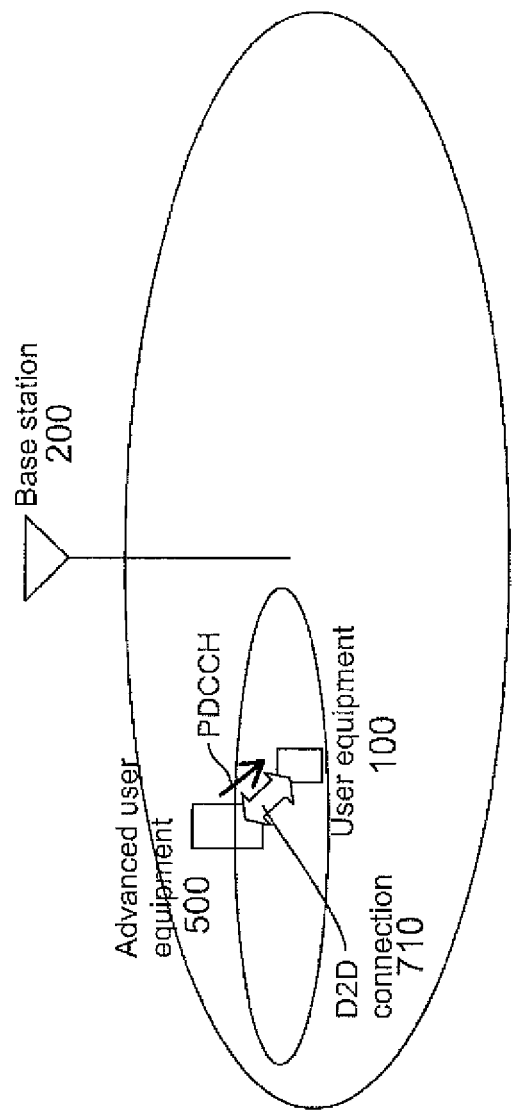
FIG. 30 illustrates a network in which the advanced user equipment controls the half-duplex FDD radio resource allocation in the D2UE link using a PDDCH signal.

Alternatively, as illustrated in FIG. 30, the advanced user equipment (small-node device) may assign the radio resources for the D2UE connection by sending a Physical Downlink Control Channel (PDCCH) signal to the user equipment. In this embodiment, the PDCCH may be transmitted every 1 msec similarly to a conventional LTE connection. Alternatively, the advanced user equipment may assign the radio resource for the D2UE connection by utilizing other radio resource assignment methods. For example, the advanced user equipment may transmit the PDCCH periodically to indicate the radio resources assigned for a D2UE sub-frame following each periodic transmission. In yet another alternative embodiment, the advanced user equipment can assign the radio resources using Carrier Sense Multiple Access with Collision Detection.

In general, if the guard band between frequency resource group #A and frequency resource group #B is large, the interference between the DL time slots and the UL time slots is small. Therefore, size of the guard band may be adjusted based on the maximum transmission power in the D2UE connection. Alternatively, the maximum transmission power in the D2UE connection may be set based on the size of the guard band. For example, if the size of the guard band is larger than a guard band threshold value, the maximum transmission power in the D2UE connection may be set to 23 dBm. Conversely, if the size of the guard band is smaller than or equal to the guard band threshold value, the maximum transmission power in the D2UE connection may be set to 10 dBm. In the above examples, the transmission power of 23 dBm or 10 dBm is just an example such that other values may also be implemented.

As discussed above, the number of frequency groups may be larger than two. For example, FIGS. 27(*a*) and 27(*b*) illustrate the spectrums for four frequency groups. The UL is conducted in frequency groups #A and #C whereas the DL uses two frequency resource groups #B and #D. FIG. 27(*a*) shows the small frequency groups within these four frequency resource groups. In contrast, FIG. 27(*b*) illustrates the maximum transmission power for each DL and UL frequency resource group. In this example, the maximum transmission power in frequency resource group #C is set lower than that in frequency resource group #A. Similarly, the maximum transmission power in frequency resource group #B is lower than that in the frequency resource group #D.

Such a maximum power assignment is advantageous in that both frequency groups #A and #D are relatively far from the guard band such that the possibility of interference is greatly reduced. Given this probability of interference, frequency groups #A and # D may operate at high power. These groups may thus be assigned to a D2UE connection with a higher path loss. In contrast, frequency groups #C and #B are adjacent to the guard band. The possibility of interference is thus higher such that these bands operate at lower power. These frequency groups may thus be assigned to a D2UE connection with a lower path loss. As a result, large coverage can be achieved using frequency resource groups

A and #D while mitigating interference between DL transmissions and UL transmissions.

In the embodiments described above, an Architecture 1 network or an Architecture 2 network is assumed. However, the above described half-duplex FDD operation may be conducted in others types of networks. For example, the above described half-duplex FDD operation may be conducted in a secondary cell in the 3GPP carrier aggregation system.

The above described apparatuses may be implemented using hardware, software, or a combination of both. The software module may be arranged in a storage medium of an arbitrary format such as RAM (Random Access Memory), a flash memory, ROM (Read Only Memory), EPROM (Erasable Programmable ROM), EEPROM (Electronically Erasable and Programmable ROM), a register, a hard disk, a removable disk, and CD-ROM.

Embodiments described above illustrate but do not limit the disclosure. It should also be understood that numerous modifications and variations are possible in accordance with the principles of the present disclosure. Accordingly, the scope of the disclosure is defined only by the following claims.

I claim:

1. A small-node device for offloading data traffic in a cellular telecommunications system, comprising:
    a base-station-to-the-small-node-device (BS2D) communication section configured to receive a first control-plane message from the base station over a BS2D link;
    a small-node-device-to-user-equipment (D2UE) communication section configured to transmit downlink (DL) user-plane data in a first set of time slots over a first frequency resource to a user equipment using a wireless D2UE link established responsive to the first control-plane message, wherein the D2UE communication section is further configured to receive uplink (UL) user-plane data from the user equipment over the D2UE link in a second set of time slots over a second frequency resource group, and wherein the time slots in the second set alternate with the time slots in the first set such that the UL and DL transmissions over the D2UE link do not occur simultaneously; and
    a backhaul communication section configured to receive the user-plane traffic data from a server over a backhaul link.

2. The small-node device of claim 1, wherein the first frequency resource group and the second frequency resource group are separated by a guard band.

3. The small-node device of claim 2, wherein the D2UE communication section is further configured to transmit a control signal to the user equipment to identify the first and second frequency resource groups and to identify whether these groups are assigned to UL or DL transmissions.

4. The small-node device of claim 3, wherein the first and second frequency resource groups are each divided into a plurality of small frequency resources (SFRs), and wherein the D2UE communication section is further configured to transmit the DL user-plane data in just a subset of the SFRs within the first frequency resource group.

5. The small-node device of claim 4, wherein the D2UE communication section is further configured to transmit a control signal to the user equipment to assign a subset of the SFRs within the second frequency resource group such that the received UL user-plane data is received only in the assigned subset of SFRs within the second frequency group.

6. The small-node device of claim 1, wherein the BS2D link is a modified X2 interface having a master-slave relationship between the base station and the small-node device.

7. The small-node device of claim 1, wherein the BS2D link is an LTE link.

8. The small-node device of claim 5, wherein the D2UE communication section is further configured to transmit a control signal to the user equipment to assign a transmit power for the UL user-plane data transmission.

9. The small-node device of claim 3, wherein the D2UE link supports a plurality of more than two frequency resource groups, and wherein the control signal that identifies the first and second resource groups identifies these groups with regard to the plurality of more than two frequency resource groups.

10. A user equipment (UE) configured to receive offloaded data from a small-node device in a cellular telecommunication system, comprising:
    a macro-base-station-to-the-user-equipment (BS2UE) communication section configured to receive a first control-plane message and user-plane data from the base station over a wireless BS2UE link; and
    a small-node-device-to-the-user-equipment (D2UE) communication section configured to configured to transmit uplink (UL) user-plane data in a first set of time slots and in a first frequency resource to a small-node device using a wireless D2UE link established responsive to the first control-plane message,
    wherein the D2UE communication section is further configured to receive downlink (DL) user-plane data from the small-node device over the D2UE link in a second set of time slots and in a second frequency resource group, and
    wherein the time slots in the second set alternate with the time slots in the first set such that the UL and DL transmissions over the D2UE link do not occur simultaneously.

11. The UE of claim 10, wherein the first frequency resource group and the second frequency resource group are separated by a guard band.

12. The UE of claim 11, wherein the BS2UE communication section is further configured to receive a second control signal from the base station to identify the first and second frequency resource groups and to identify whether these groups are assigned to UL or DL transmissions.

13. The UE of claim 12, wherein the D2UE link supports a plurality of more than two frequency resource groups, and wherein the control signal that identifies the first and second resource groups identifies these groups with regard to the plurality of more than two frequency resource groups.

14. The UE of claim 11, wherein the first and second frequency resource groups are each divided into a plurality of small frequency resources (SFRs), and wherein the D2UE communication section is further configured to transmit the UL user-plane data in just a subset of the SFRs within the first frequency resource group.

15. The UE of claim 14, wherein the BS2UE link is an LTE link.

16. The UE of claim 14, wherein the D2UE communication section is further configured to receive a control signal from the small-node device to identify the first and second frequency resource groups and to identify whether these groups are assigned to UL or DL transmissions.

17. A base station for controlling a user equipment (UE) and a small-node device in a cellular telecommunications network, comprising:

a base-station-to-the-UE (BS2UE) communication section configured to exchange user-plane and control-plane data with the UE using a wireless BS2UE link;

a base-station-to-the-small-node-device (BS2D) communication section configured to exchange control-plane data with the small-node device using a BS2D link; and a D2UE control unit configured to control an establishment and also a release/reconfiguration/handover of a small-node-device-to-the-UE (D2UE) link through a first control-plane message transmitted to at least one of the UE and the small-node device using a respective one of the BS2UE and BS2D links, wherein the D2UE control unit is further configured to control a half-duplex FDD radio resource allocation within the D2UE link using a second control-plane message, and wherein the user equipment communicates with the base station and the small-node device simultaneously at a predetermined time.

18. The base station of claim 17, wherein the D2UE control unit is further configured to control the half-duplex FDD radio resource allocation using the second control-plane message such that the UE transmits uplink (UL) user-plane data in a first set of time slots and in a first frequency resource in the D2UE link and such that the UE receives downlink (DL) user-plane data in a second set of time slots and in a second frequency resource group in the D2UE link, and wherein the time slots in the second set alternate with the time slots in the first set such that the UL and DL transmissions over the D2UE link do not occur simultaneously.

19. The base station of claim 18, wherein the D2UE control unit is further configured to control the half-duplex FDD radio resource allocation such that the first and second frequency resource groups are separated by a guard band.

20. The base station of claim 18, wherein the first and second frequency groups are each divided into a plurality of small frequency resources (SFRs), and wherein the D2UE control unit is further configured to control the half-duplex FDD radio resource allocation such that the UE transmits in a subset of the SFRs in the first frequency group and such that the small-node device transmits in a subset of the SFRs in the second frequency group.

21. A method of communicating using a small-node device in a cellular telecommunication system, comprising:

at the small-node device, receiving a first control-plane message from a base station over a base-station-to-the-small-node-device (BS2D) link;

at the small-node device, establishing a small-node-device-to-a-user-equipment (D2UE) link responsive to the first control-plane message at the small-node device, receiving downlink user-plane data from a server over a backhaul link; and from the small-node device, transmitting the downlink user-plane data over the D2UE link according to a half-duplex FDD radio resource assignment for the D2UE link, wherein the user equipment communicates with the base station and the small-node device simultaneously at a predetermined time.

22. A method of communicating using a user equipment in a cellular telecommunication system, comprising:

at the user equipment, receiving a first control-plane message from a base station over a macro-base-station-to-the-user-equipment (BS2UE) link;

at the user equipment, establishing a small-node-device-to-the-user-equipment (D2UE) link responsive to the first control-plane message;

at the user equipment, receiving downlink user-plane data from the small-node device over the D2UE link according to a half-duplex FDD radio resource assignment for the D2UE link, wherein the user equipment communicates with the base station and the small-node device simultaneously at a predetermined time.

23. A method of communicating using a base station for controlling a user equipment (UE) and a small-node device in a cellular telecommunication system, comprising:

at the base station, exchanging user-plane data and control-plane messages with the UE using a wireless macro-base-station-to-the-UE (BS2UE) link and exchanging control-plane messages with the small-node device using a macro-base-station-to-the-small-node device (BS2D) link;

at the base station, controlling an establishment and also a release/reconfiguration/handover of a small-node-device-to-UE (D2UE) communication link through a first control-plane message transmitted to at least one of the UE and the small-node device through a corresponding one of the BS2UE and BS2D links; and at the base station, identifying user-plane data to be exchanged between the UE and the small-node device using the D2UE link according to a half-duplex FDD radio resource assignment in the D2UE link, wherein the user equipment communicates with the base station and the small-node device simultaneously at a predetermined time.

* * * * *

UNITED STATES PATENT AND TRADEMARK OFFICE
CERTIFICATE OF CORRECTION

| | |
|---|---|
| PATENT NO. | : 9,544,827 B2 |
| APPLICATION NO. | : 14/344492 |
| DATED | : January 10, 2017 |
| INVENTOR(S) | : Hiroyuki Ishii |

It is certified that error appears in the above-identified patent and that said Letters Patent is hereby corrected as shown below:

In the Claims

At Column 38, Claim number 10, Line number 25, "configured to configured to" should read -- configured to --.

Signed and Sealed this
Fifth Day of September, 2017

Joseph Matal
*Performing the Functions and Duties of the*
*Under Secretary of Commerce for Intellectual Property and*
*Director of the United States Patent and Trademark Office*